US012782892B2

(12) United States Patent
Abbott et al.

(10) Patent No.: US 12,782,892 B2
(45) **Date of Patent: *Nov. 3, 2026**

(54) POWER TOOL INCLUDING A MACHINE LEARNING BLOCK FOR CONTROLLING A SEATING OF A FASTENER

(71) Applicant: MILWAUKEE ELECTRIC TOOL CORPORATION, Brookfield, WI (US)

(72) Inventors: Jonathan E. Abbott, Milwaukee, WI (US); Justin A. Evankovich, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 250 days.

This patent is subject to a terminal disclaimer.

(21) Appl. No.: 18/813,450

(22) Filed: Aug. 23, 2024

(65) Prior Publication Data

US 2025/0028289 A1 Jan. 23, 2025

Related U.S. Application Data

(63) Continuation of application No. 17/056,489, filed as application No. PCT/US2020/043231 on Jul. 23, 2020, now Pat. No. 12,111,621.

(Continued)

(51) Int. Cl.

*G05B 13/02* (2006.01)
*B25B 23/147* (2006.01)
*B25F 5/00* (2006.01)

(52) U.S. Cl.

CPC .......... *G05B 13/027* (2013.01); *B25B 23/147* (2013.01); *B25F 5/00* (2013.01)

(58) Field of Classification Search

CPC .......... F24F 11/46; F24F 11/523; F24F 11/54; F24F 11/63; F24F 11/65; F24F 2110/10; F24F 2110/12; F24F 2120/10; F24F 3/065

See application file for complete search history.

(56) References Cited

U.S. PATENT DOCUMENTS 5,914,882 A 6/1999 Yeghiazarins
6,260,427 B1 7/2001 Jones et al.

(Continued)

FOREIGN PATENT DOCUMENTS

CN 105880685 A 8/2016
CN 105880685 B 4/2018

(Continued)

OTHER PUBLICATIONS

Rong, Xie, et al., "Introduction to Advanced Control Theory and Applications", Northwestern Polytechnical University Press, p. 174, published Aug. 15, 2018.

(Continued)

*Primary Examiner* — Kidest Worku
(74) *Attorney, Agent, or Firm* — Quarles & Brady LLP

(57) ABSTRACT

A power tool is provided including a housing a motor supported by the housing, a sensor supported by the housing, and an electronic controller. The sensor is configured to generate sensor data indicative of an operational parameter of the power tool. The electronic controller includes an electronic processor, and a memory. The memory includes a machine learning control program for execution by the electronic processor. The electronic processor is configured to receive the sensor data, and process the sensor data, using the machine learning control program. The electronic processor is further configured to generate, using the machine learning control program, an output based on the sensor data, the output indicating a seating value associated with a fastening operation of the power tool. The electronic processor is further configured to control the motor based on the generated output.

22 Claims, 32 Drawing Sheets

Related U.S. Application Data

(60) Provisional application No. 62/877,489, filed on Jul. 23, 2019.

(56) References Cited

U.S. PATENT DOCUMENTS 6,308,138 B1 10/2001 Jones et al.
6,336,931 B1 1/2002 Hsu et al.
7,372,226 B2 5/2008 Wilker et al.
7,699,118 B2 4/2010 Setter et al.
9,537,335 B2 1/2017 Furui et al.
9,652,217 B2 5/2017 Winkler et al.
9,707,671 B2 7/2017 Shi
9,908,182 B2 3/2018 Phillips et al.
10,011,006 B2 7/2018 Sergyeyenko et al.
10,131,042 B2 11/2018 Mergener et al.
10,295,990 B2 5/2019 Dey, IV et al.
10,331,088 B2 6/2019 Boeck et al.
10,562,116 B2 2/2020 Dey, IV et al.
10,589,413 B2 3/2020 Goble
11,221,611 B2 1/2022 Abbott et al.
11,366,457 B1 6/2022 George, Sr. et al.
11,426,848 B2 8/2022 Alberding et al.
12,053,863 B2 8/2024 Nakahara et al.
12,059,792 B2 8/2024 Abbott et al.
12,124,226 B2 10/2024 Abbott
2003/0037423 A1 2/2003 Siegel et al.
2004/0045729 A1 3/2004 Lehnert et al.
2004/0182588 A1 9/2004 Tokunaga et al.
2005/0127862 A1 6/2005 Glasgow et al.
2005/0167130 A1 8/2005 Setter et al.
2006/0155582 A1 7/2006 Brown
2006/0289183 A1 12/2006 Schreiber
2008/0021590 A1 1/2008 Forster et al.
2010/0114358 A1 5/2010 Mahler et al.
2012/0074881 A1 3/2012 Pant
2013/0138465 A1* 5/2013 Kahle ............ G06Q 10/063114 705/7.17
2013/0187587 A1* 7/2013 Knight ...................... H02P 6/16 318/400.37
2013/0327552 A1 12/2013 Lovelass et al.
2014/0107853 A1 4/2014 Ashinghurst et al.
2014/0158390 A1* 6/2014 Mashiko ............... B25B 23/147 173/217
2014/0338939 A1 11/2014 Shi
2014/0367134 A1 12/2014 Phillips et al.
2015/0101835 A1 4/2015 Nitsche et al.
2015/0178620 A1 6/2015 Ascari et al.
2015/0217449 A1 8/2015 Meier et al.
2016/0167186 A1 6/2016 Chan et al.
2016/0187861 A1 6/2016 Chen et al.
2016/0342142 A1 11/2016 Boeck et al.
2016/0342151 A1 11/2016 Dey, IV et al.
2016/0354848 A1 12/2016 Myrfield, Jr.
2016/0361069 A1 12/2016 Ardel et al.
2016/0361070 A1 12/2016 Ardel et al.
2016/0375570 A1* 12/2016 Boeck ................ G05B 19/4062 700/169
2017/0028521 A1 2/2017 Yamamoto
2017/0032281 A1 2/2017 Hsu
2017/0036315 A1 2/2017 Wimitzer et al.
2017/0090430 A1 3/2017 Nakazawa
2017/0232597 A1 8/2017 Gaul
2018/0000025 A1 1/2018 He et al.
2018/0065232 A1* 3/2018 Mueckl ................... B25B 21/00
2018/0164756 A1 6/2018 Yamaguchi et al.
2018/0165756 A1 6/2018 Cheng
2018/0328797 A1 11/2018 Gwon et al.
2019/0187659 A1 6/2019 Li et al.
2019/0205950 A1 7/2019 Balasubramanian et al.
2019/0227528 A1 7/2019 Abbott et al.
2020/0156210 A1 5/2020 Sullivan et al.
2020/0160152 A1 5/2020 Büttner et al.
2020/0267903 A1 8/2020 Gao et al.
2020/0276680 A1 9/2020 Green et al.
2020/0326718 A1 10/2020 Kandemir et al.
2020/0338677 A1 10/2020 Ozeki
2020/0384618 A1 12/2020 Tanji et al.
2021/0053212 A1 2/2021 Haetty
2021/0101263 A1 4/2021 Hwang et al.
2021/0101304 A1 4/2021 Green et al.
2021/0104006 A1 4/2021 Green
2021/0116894 A1 4/2021 Wichern et al.
2021/0157297 A1 5/2021 Kaiser et al.
2021/0166154 A1 6/2021 Ogino
2021/0192386 A1 6/2021 Cabrita Condessa et al.
2021/0205976 A1 7/2021 Matei
2021/0240145 A1 8/2021 Abbott
2021/0302921 A1 9/2021 Kolter et al.
2021/0312262 A1 10/2021 Postel
2021/0326663 A1 10/2021 Winston et al.
2021/0328399 A1 10/2021 Radtke et al.
2021/0374549 A1 12/2021 Willmott et al.
2021/0383234 A1 12/2021 Bai et al.
2021/0393337 A1 12/2021 Zucker
2021/0394344 A1 12/2021 Mueckl et al.
2022/0001526 A1 1/2022 Wang et al.
2022/0019900 A1 1/2022 Wong et al.
2022/0197227 A1 6/2022 Woehlke et al.
2022/0266429 A1 8/2022 Erbele et al.
2022/0281082 A1 9/2022 Blum et al.
2022/0292349 A1 9/2022 Stoll et al.
2022/0299946 A1 9/2022 Abbott et al.
2022/0410360 A1 12/2022 Erbele et al.
2023/0115521 A1 4/2023 Kupcsik et al.
2023/0141816 A1 5/2023 Butzerin et al.
2023/0219204 A1 7/2023 Dieter et al.
2023/0251614 A1 8/2023 Lutz et al.

FOREIGN PATENT DOCUMENTS

CN 110078722 A 7/2019
CN 113642743 A 11/2021
DE 102019131627 A1 5/2021
DE 102020205165 A1 10/2021
EP 1398119 A1 3/2004
EP 3623108 A1 3/2020
EP 3716160 A1 9/2020
EP 3770820 A1 1/2021
EP 3772398 A1 2/2021
EP 3913547 A1 11/2021
JP H04336979 A 11/1992
JP H07186060 A 7/1995
JP 2012200807 A 10/2012
WO 2009138268 A1 11/2009
WO WO-2017162130 A1 * 9/2017 ............. B25B 23/14
WO 2020073955 A1 4/2020
WO 2021042233 A1 3/2021
WO 2021060090 A1 4/2021
WO 2021241111 A1 12/2021

OTHER PUBLICATIONS

Chinese Patent Office Action for Application No. 202080064439.4 dated May 20, 2024 (14 pages including machine English translation).

Chinese Patent Office Action for Application No. 202080064439.4 dated Sep. 22, 2023 (21 pages including machine English translation).

Extended European Search Report for Application No. 20844619.5 dated Jun. 23, 2023 (6 pages).

Sense, "The Sense Home Energy Monitor," <https://sense.com/>, website publicly available as early as Oct. 1, 2015 (9 pages).

International Search Report and Written Opinion for Application No. PCT/US2020/043231 dated Oct. 30, 2020 (11 pages).

* cited by examiner

2300

POWER TOOL INCLUDING A MACHINE LEARNING BLOCK FOR CONTROLLING A SEATING OF A FASTENER

RELATED APPLICATIONS

This application is a continuation of U.S. application Ser. No. 17/056,489, filed Nov. 18, 2020, which is a 371 national phase application of PCT/US2020/043231, filed Jul. 23, 2020, which claims the benefit of U.S. Provisional Patent Application No. 62/877,489, filed Jul. 23, 2019, the entire content of each of which is incorporated herein by reference.

FIELD

Embodiments described herein relate to power tools that control the seating of fasteners based on one or more received inputs.

SUMMARY

In one embodiment, a power tool is provided including a housing a motor supported by the housing, a sensor supported by the housing, and an electronic controller. The sensor is configured to generate sensor data indicative of an operational parameter of the power tool. The electronic controller includes an electronic processor and a memory. The memory includes a machine learning control program for execution by the electronic processor. The electronic controller is configured to receive the sensor data, and process the sensor data, using the machine learning control program. The electronic processor is further configured to generate, using the machine learning control program, an output based on the sensor data, the output indicating a seating value associated with a fastening operation of the power tool. The electronic processor is further configured to control the motor based on the generated output.

In some embodiments of the power tool, the machine learning control program is generated on an external system device through training based on example sensor data and associated outputs and is received by the power tool from the external system device.

In some embodiments of the power tool, the machine learning control program is one of a static machine learning control program and a trainable machine learning control program.

In some embodiments of the power tool, the seating value indicates that the fastener has started seating.

In some embodiments of the power tool and method, the electronic controller is configured to reduce the speed of the motor based on the seating value indicating that the fastener has started seating.

In some embodiments of the power tool and method, the electronic controller is configured to stop the motor of the power tool based on the seating value indicating that the fastener is fully seated.

In another embodiment, a method of operating a power tool to control fastener seating is provided. The method includes generating, by a sensor of the power tool, sensor data indicative of an operational parameter of the power tool. The method further includes receiving, by an electronic controller of the power tool, the sensor data. The controller includes an electronic processor and a memory. The memory includes a machine learning control program for execution by the electronic processor. The method further includes processing the sensor data, using a machine learning control program of the machine learning controller, and generating, using the machine learning control program, an output based on the sensor data. The output indicates a fastening value associated with a fastening operation of the power tool. The method also includes controlling, by the electronic controller, a motor of the power tool based on the output.

In some embodiments of the power tool and method, the machine learning control program is generated on an external system device through training based on example sensor data and associated outputs and is received by the power tool from the external system device.

In some embodiments of the method, the machine learning control program is one of a static machine learning control program and a trained machine learning control program.

In some embodiments of the method, the fastening value indicates a level at which the fastener is fastened.

In some embodiments of the method, the electronic controller is configured to reduce the speed of the motor based on the fastening value indicating that the fastener is approaching a target fastening torque.

In some embodiments of the method, the electronic controller is configured to stop the motor of the power tool based on the fastening value indicating that the fastener is torqued to the target fastening torque.

In some embodiments of the method, the operational parameters include one or more of a number of fastener rotations, a measured torque, a characteristic speed, a voltage of the power tool, a current of the power tool, a selected operating mode, a fluid temperature, and a tool movement information.

In some embodiments of the method, the power tool includes a gyroscope configured to provide data indicative of a tool movement.

In one embodiment, a power tool is provided including a housing a motor supported by the housing, a sensor supported by the housing, and an electronic controller. The sensor is configured to generate sensor data indicative of an operational parameter of the power tool. The electronic controller includes an electronic processor, and a memory. The memory includes a machine learning control program for execution by the electronic processor. The electronic controller is configured to receive the sensor data and process the sensor data, using the machine learning control program. The electronic processor is further configured to generate, using the machine learning control program, an output based on the sensor data, the output associated with one or more operational functions of the power tool. The electronic processor is further configured to control a speed, power, or other output of the motor based on the generated output.

In some embodiments of the power tool, the one or more operational functions include a torqueing operation.

In some embodiments of the power tool, the electronic controller is configured to reduce the speed, power, or other output of the motor based on the seating value indicating that the fastener is approaching a specified torque value.

In some embodiments of the power tool, the machine learning control program is configured to process the sensor data using a neural network.

In some embodiments of the power tool, the neural network is configured to generate multiple outputs corresponding to a desired speed of the motor.

In some embodiments of the power tool, the machine learning control program is generated on an external system device through training based on example sensor data and associated outputs, and is received by the power tool from the external system device.

In some embodiments of the power tool, the machine learning control program is one of a static machine learning control program, and a trained machine learning control program.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Some power tools include sensors and a control system that uses hard-corded thresholds to, for example, change or adjust the operation of the tool. For example, a sensor may detect that a battery voltage is below a predetermined, hard-coded threshold. The power tool may then cease operation of the motor to protect the battery pack. While these type of thresholds may be simple to implement and provide some benefit to the operation of a power tool, these type of hard-coded thresholds cannot adapt to changing conditions or applications during which the power tool is operated, and may not ultimately be helpful in detecting and responding to more complicated conditions such as, for example, when the power tool experiences kickback.

The present application describes various systems in which a machine learning controller is utilized to control a feature or function of the power tool. For example, the machine learning controller, instead of implementing hard-coded thresholds determined and programmed by, for example, an engineer, detects conditions based on data collected during previous operations of the power tool. In some embodiments, the machine learning controller determines adjustable thresholds that are used to operate the tool based on, for example, a particular application of the power tool or during a particular mode of the power tool. Accordingly, the thresholds, conditions, or combinations thereof are based on previous operation of the same type of power tool and may change based on input received from the user and further operations of the power tool.

Figure 1:
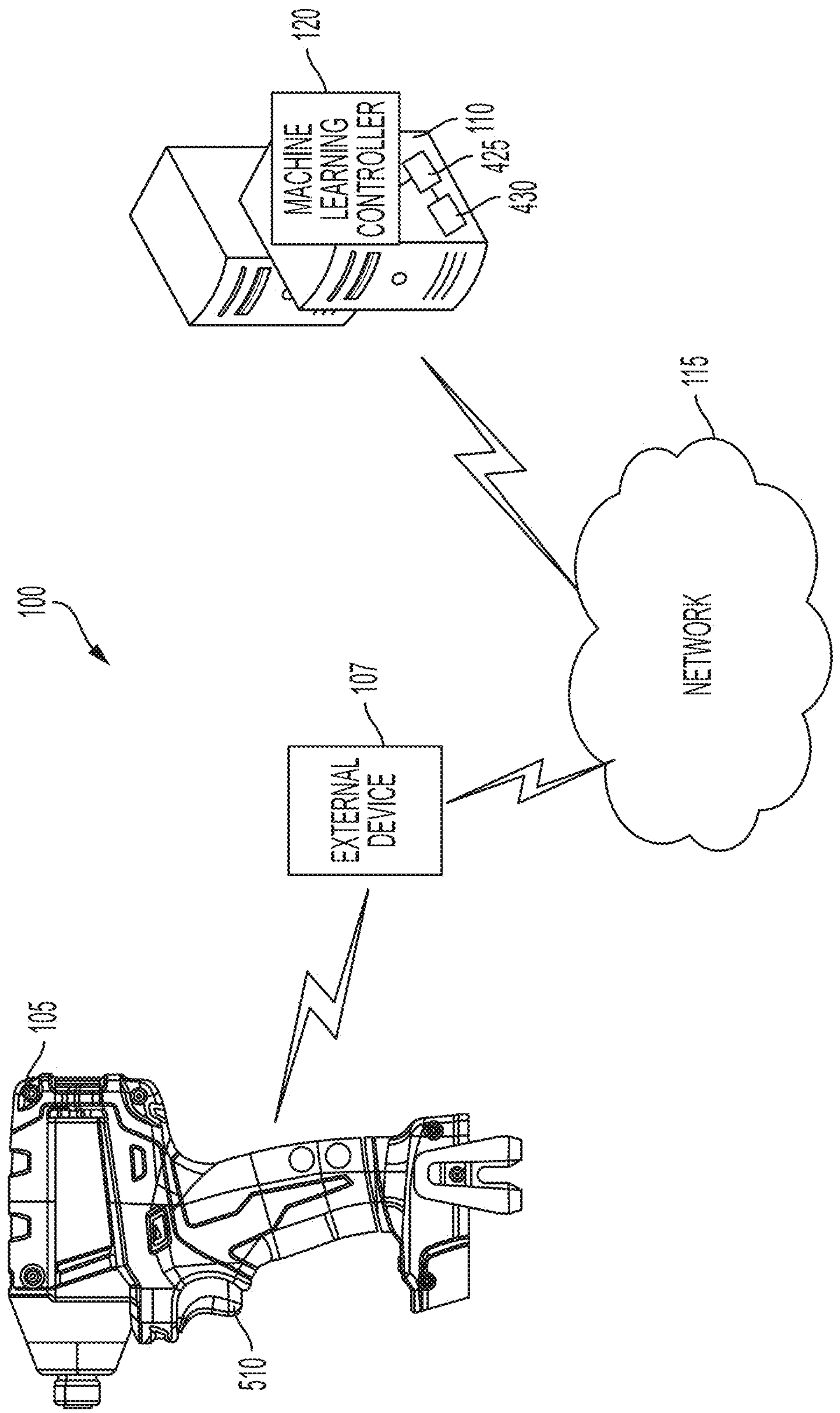
FIG. 1 illustrates a first power tool system.

FIG. 1 illustrates a first power tool system 100. The first power tool system 100 includes a power tool 105, an external device 107, a server 110, and a network 115. The power tool 105 includes various sensors and devices that collect usage information during the operation of the power tool 105. The usage information may alternatively be referred to as operational information of the power tool 105, and refers to, for example, data regarding the operation of the motor (e.g., speed, position, acceleration, temperature, usage time, and the like), the operating mode of the power tool 105 (e.g., driving mode, impact mode, operation time in each mode, frequency of operation in each mode, and the like), conditions encountered during operation (e.g., overheating of the motor, and the like), and other aspects (e.g., state of charge of the battery, rate of discharge, and the like).

In the illustrated embodiment, the power tool 105 communicates with the external device 107. The external device 107 may include, for example, a smart telephone, a tablet computer, a cellular phone, a laptop computer, a smart watch, and the like. The power tool 105 communicates with the external device 107, for example, to transmit at least a portion of the usage information for the power tool 105, to receive configuration information for the power tool 105, or a combination thereof. In some embodiments, the external device may include a short-range transceiver to communicate with the power tool 105, and a long-range transceiver to communicate with the server 110. In the illustrated embodiment, the power tool 105 also includes a transceiver to communicate with the external device via, for example, a short-range communication protocol such as BLUETOOTH®. In some embodiments, the external device 107 bridges the communication between the power tool 105 and the server 110. That is, the power tool 105 transmits operational data to the external device 107, and the external device 107 forwards the operational data from the power tool 105 to the server 110 over the network 115. The network 115 may be a long-range wireless network such as the Internet, a local area network ("LAN"), a wide area network ("WAN"), or a combination thereof. In other embodiments, the network 115 may be a short-range wireless communication network, and in yet other embodiments, the network 115 may be a wired network using, for example, serial protocols (e.g., USB, USB-C, Firewire, and the like). Similarly, the server 110 may transmit information to the external device 107 to be forwarded to the power tool 105. In some embodiments, the power tool 105 is equipped with a long-range transceiver instead of or in addition to the short-range transceiver. In such embodiments, the power tool 105 communicates directly with the server 110. In some embodiments, the power tool 105 may communicate directly with both the server 110 and the external device 107. In such embodiments, the external device 107 may, for example, generate a graphical user interface to facilitate control and programming of the power tool 105, while the server 110 may store and analyze larger amounts of operational data for future programming or operation of the power tool 105. In other embodiments, however, the power tool 105 may communicate directly with the server 110 without utilizing a short-range communication protocol with the external device 107.

The server 110 includes a server electronic control assembly having a server electronic processor 425, a server memory 430, a transceiver, and a machine learning controller 120. The transceiver allows the server 110 to communicate with the power tool 105, the external device 107, or both. The server electronic processor 425 receives tool usage data from the power tool 105 (e.g., via the external device 107), stores the received tool usage data in the server memory 430, and, in some embodiments, uses the received tool usage data for building or adjusting a machine learning controller 120.

The machine learning controller 120 implements a machine learning program. The machine learning controller 120 is configured to construct a model (e.g., building one or more algorithms) based on example inputs. Supervised learning involves presenting a computer program with example inputs and their actual outputs (e.g., categorizations). The machine learning controller 120 is configured to learn a general rule or model that maps the inputs to the outputs based on the provided example input-output pairs. The machine learning algorithm may be configured to perform machine learning using various types of methods. For example, the machine learning controller 120 may implement the machine learning program using decision tree learning, associates rule learning, artificial neural networks, recurrent artificial neural networks, long short term memory neural networks, inductive logic programming, support vector machines, clustering, Bayesian networks, reinforcement learning, representation learning, similarity and metric learning, sparse dictionary learning, genetic algorithms, k-nearest neighbor (KNN), attention networks/transformers, and others, such as those listed in Table 1 below.

TABLE 1

| | |
|---|---|
| Recurrent Models | Recurrent Neural Networks ["RNNs"], Long Short-Term Memory ["LSTM"] models, Gated Recurrent Unit ["GRU"] models, Markov Processes, Reinforcement learning |
| Non-Recurrent Models | Deep Neural Network ["DNN"], Convolutional Neural Network ["CNN"], Support Vector Machines ["SVM"], Anomaly detection (ex: Principle Component Analysis ["PCA"]), logistic regression, decision trees/forests, ensemble methods (combining models), polynomial/Bayesian/other regressions, Stochastic Gradient Descent ["SGD"], Linear Discriminant Analysis ["LDA"], Quadratic Discriminant Analysis ["QDA"], Nearest neighbors classifications/regression, naïve Bayes, etc. |

The machine learning controller 120 is programmed and trained to perform a particular task. For example, in some embodiments, the machine learning controller 120 is trained to identify an application for which the power tool 105 is used (e.g., seating fasteners). The task for which the machine learning controller 120 is trained may vary based on, for example, the type of power tool, a selection from a user, typical applications for which the power tool is used, and the like. Analogously, the way in which the machine learning controller 120 is trained also varies based on the particular task. In particular, the training examples used to train the machine learning controller may include different information and may have different dimensions based on the task of the machine learning controller 120. In the example mentioned above in which the machine learning controller 120 is configured to identify a use application of the power tool 105, each training example may include a set of inputs such as motor speed, motor current and voltage, an operating mode currently being implemented by the power tool 105, and movement of the power tool 105 (e.g., from an accelerometer). Each training example also includes a specified output. For example, when the machine learning controller 130 identifies the use application of the power tool 105, a training example may have an output that includes a particular use application of the power tool 105, such as seating fasteners. Other training examples, including different values for each of the inputs and an output indicating that the use application is, for example, installing screws on a wooden workpiece. The training examples may be previously collected training examples, from for example, a plurality of the same type of power tools. For example, the training examples may have been previously collected from, for example, two hundred power tools of the same type (e.g., drills) over a span of, for example, one year.

A plurality of different training examples is provided to the machine learning controller 120. The machine learning controller 120 uses these training examples to generate a model (e.g., a rule, a set of equations, and the like) that helps categorize or estimate the output based on new input data. The machine learning controller 120 may weigh different training examples differently to, for example, prioritize different conditions or outputs from the machine learning controller 120. For example, a training example corresponding to a kickback condition may be weighted more heavily than a training example corresponding to a stripping condition to prioritize the correct identification of the kickback condition relative to the stripping condition. In some embodiments, the training examples are weighted differently by associating a different cost function or value to specific training examples or types of training examples.

In one example, the machine learning controller 120 implements an artificial neural network. The artificial neural network typically includes an input layer, a plurality of hidden layers or nodes, and an output layer. Typically, the input layer includes as many nodes as inputs provided to the machine learning controller 120. As described above, the number (and the type) of inputs provided to the machine learning controller 120 may vary based on the particular task for the machine learning controller 120. Accordingly, the input layer of the artificial neural network of the machine learning controller 120 may have a different number of nodes based on the particular task for the machine learning controller 120. The input layer connects to the hidden layers. The number of hidden layers varies and may depend on the particular task for the machine learning controller 120. Additionally, each hidden layer may have a different number of nodes and may be connected to the next layer differently. For example, each node of the input layer may be connected to each node of the first hidden layer. The connection between each node of the input layer and each node of the first hidden layer may be assigned a weight parameter. Additionally, each node of the neural network may also be assigned a bias value. However, each node of the first hidden layer may not be connected to each node of the second hidden layer. That is, there may be some nodes of the first hidden layer that are not connected to all of the nodes of the second hidden layer. The connections between the nodes of the first hidden layers and the second hidden layers are each assigned different weight parameters. Each node of the hidden layer is associated with an activation function. The activation function defines how the hidden layer is to process the input received from the input layer or from a previous input layer. These activation functions may vary and be based on not only the type of task associated with the machine learning controller 120 but may also vary based on the specific type of hidden layer implemented.

Each hidden layer may perform a different function. For example, some hidden layers can be convolutional hidden layers which can, in some instances, reduce the dimensionality of the inputs, while other hidden layers can perform more statistical functions such as max pooling, which may reduce a group of inputs to the maximum value, an averaging layer, among others. In some of the hidden layers (also referred to as "dense layers"), each node is connected to each node of the next hidden layer. Some neural networks including more than, for example, three hidden layers may be considered deep neural networks. The last hidden layer is connected to the output layer. Similar to the input layer, the output layer typically has the same number of nodes as the possible outputs. In the example above in which the machine learning controller 120 identifies a use application of the power tool 105, the output layer may include, for example, four nodes. A first node may indicate that the use application corresponds to installing drywall, a second node may indicate that the use application corresponds to installing a screw on a wooden workpiece, a third node may indicate that the use application corresponds to removing a screw, and the fourth node may indicate that the use application corresponds to an unknown (or unidentifiable) task. In some embodiments, the machine learning controller 120 then selects the output node with the highest value and indicates to the power tool 105 or to the user the corresponding use application. In some embodiments, the machine learning controller 120 may also select more than one output node. The machine learning controller 120 or the electronic processor 550 may then use the multiple outputs to control the power tool 500. For example, the machine learning controller 120 may identify the type of fastener and select a self-drilling screw (e.g., a TEK screw) and a sheet metal screw as the most likely candidates for the fastener. The machine learning controller 120 or the electronic processor 550 may then, for example, control the motor according to the ramp up speed for a self-drilling screw, but adopt the kickback detection from the sheet metal screw. The machine learning controller 120 and the electronic processor 550 may implement different methods of combining the outputs from the machine learning controller 120.

During training, the artificial neural network receives the inputs for a training example and generates an output using the bias for each node, and the connections between each node and the corresponding weights. The artificial neural network then compares the generated output with the actual output of the training example. Based on the generated output and the actual output of the training example, the neural network changes the weights and/or biases associated with each node connection. In some embodiments, the neural network also changes the weights associated with each node during training. The training continues until a training condition is met. The training condition may correspond to, for example, a predetermined number of training examples being used, a minimum accuracy threshold being reached during training and validation, a predetermined number of validation iterations being completed, an optimized train vs. testing test, and the like. Different types of training algorithms can be used to adjust the bias values and the weights of the node connections based on the training examples. The training algorithms may include, for example, gradient descent, newton's method, conjugate gradient, quasi newton, levenberg marquardt, among others, see again Table 1.

In another example, the machine learning controller 120 implements a support vector machine to perform classification. The machine learning controller 120 may, for example, classify whether a fastener is stripping. In such embodiments, the machine learning controller 120 may receive inputs such as motor speed, output torque, and operation time (e.g., how long the power tool 105 has been working on the same fastener). The machine learning controller 120 then defines a margin using combinations of some of the input variables (e.g., motor speed, output torque, operation time, and the like) as support vectors to maximize the margin. In some embodiments, the machine learning controller 120 defines a margin using combinations of more than one of similar input variables (e.g., motion of a tool along different axes). The margin corresponds to the distance between the two closest vectors that are classified differently. For example, the margin corresponds to the distance between a vector representing a fastener that is stripping and a vector that represents a fastener that is not stripping. In some embodiments, the machine learning controller 120 uses more than one support vector machine to perform a single classification. For example, when the machine learning controller 120 classifies whether a fastener is stripping, a first support vector machine may determine whether the fastener is stripping based on the motor speed and the operation time, while a second support vector machine may determine whether the fastener is stripping based on the motor speed and the output torque. The machine learning controller 120 may then determine whether the fastener is stripping when both support vector machines classify the fastener as stripping. In other embodiments, a single support vector machine can use more than two input variables and define a hyperplane that separates those fasteners that are stripping from the fasteners that are not stripping.

The training examples for a support vector machine include an input vector including values for the input variables (e.g., motor speed, operation time, output torque, and the like), and an output classification indicating whether the fastener represents a fastener that is stripping. During training, the support vector machine selects the support vectors (e.g., a subset of the input vectors) that maximize the margin. In some embodiments, the support vector machine may be able to define a line or hyperplane that accurately separates the fasteners that are stripping from those that are not stripping. In other embodiments (e.g., in a non-separable case), however, the support vector machine may define a line or hyperplane that maximizes the margin and minimizes the slack variables, which measure the error in a classification of a support vector machine. After the support vector machine has been trained, new input data can be compared to the line or hyperplane to determine how to classify the new input data (e.g., to determine whether the fastener is stripping). In other embodiments, as mentioned above, the machine learning controller 120 can implement different machine learning algorithms to make an estimation or classification based on a set of input data.

Some examples of input data, processing technique, and machine learning algorithm pairings are listed below in Table 2. The input data, listed as time series data in the below table, includes, for example, one or more of the various examples of time-series tool usage information described herein.

TABLE 2

| Input Data | Data Processing | Exemplary Model |
|---|---|---|
| Time Series Data | N/A | RNN (using LSTM) (e.g., for screw stripping indication); DNN/CNN/RNN (e.g. LSTM, GRU) |
| Time Series Data | Filtering (e.g., low-pass filters) | DNN/CNN/RNN (e.g. STM, GRU) classifier/regression (e.g., for screw seating detection), or another non-recurrent algorithm |
| Time Series Data | Sliding window, padding, or data subset | DNN classifier/regression (e.g., for screw seating detection), or another non-recurrent algorithm |
| Time Series Data | Make features (e.g., summarize analysis of runtime data) | KNN or another non-recurrent or recurrent algorithm |
| Time Series Data | Initial (e.g., pre-trained) model | Model adaptation |
| Time Series Data | Initial RNN or DNN analysis for classification | Markov Model (for likely tool application determination during or between tool operations) |

TABLE 2-continued

| Input Data | Data Processing | Exemplary Model |
|---|---|---|
| Time Series Data | Segmented Time and/or Features of Impacts or Pulses | DNN, CNN, RNN, Recurrent Regression, Attention Network (e.g. for use in torque prediction) |

In the example of FIG. 1, the server 110 receives usage information from the power tool 105. In some embodiments, the server 110 uses the received usage information as additional training examples (e.g., when the actual value or classification is also known). In other embodiments, the server 110 sends the received usage information to the trained machine learning controller 120. The machine learning controller 120 then generates an estimated value or classification based on the input usage information. The server electronic processor 425 then generates recommendations for future operations of the power tool 105. For example, the trained machine learning controller 120 may determine that the fastener is seating. The server electronic processor 425 may then determine that a slower motor speed for the selected operating mode may be used to prevent the fastener from being over tightened or seated. The server 110 may then transmit the suggested operating parameters to the external device 107. The external device 107 may display the suggested changes to the operating parameters and request confirmation from the user to implement the suggested changes before forwarding the changes on to the power tool 105. In other embodiments, the external device 107 forwards the suggested changes to the power tool 105 and displays the suggested changes to inform the user of changes implemented by the power tool 105.

In particular, in the embodiment illustrated in FIG. 1, the server electronic control assembly generates a set of parameters and updated thresholds recommended for the operation of the power tool 105 in particular modes. For example, the machine learning controller 120 may detect that, during various operations of the power tool 105 in the impacting mode, the power tool 105 could have benefitted from a faster average rotation speed of the motor during the first ten seconds of operation. The machine learning controller 120 may then adjust a motor speed threshold of an impacting mode such that the motor speed during the first ten seconds of the impacting mode of the power tool 105 is increased. The server 110 then transmits the updated motor speed threshold to the power tool 105 via the external device 107.

The power tool 105 receives the updated motor speed threshold, updates the impacting mode according to the updated motor speed threshold, and operates according to the updated motor speed threshold when in the impacting mode. In some embodiments, the power tool 105 periodically transmits the usage data to the server 110 based on a predetermined schedule (e.g., every eight hours). In other embodiments, the power tool 105 transmits the usage data after a predetermined period of inactivity (e.g., when the power tool 105 has been inactive for two hours), which may indicate that a session of operation has been completed. In some embodiments, the power tool 105 transmits the usage data in real time to the server 110 and may implement the updated thresholds and parameters in subsequent operations.

Figure 2:
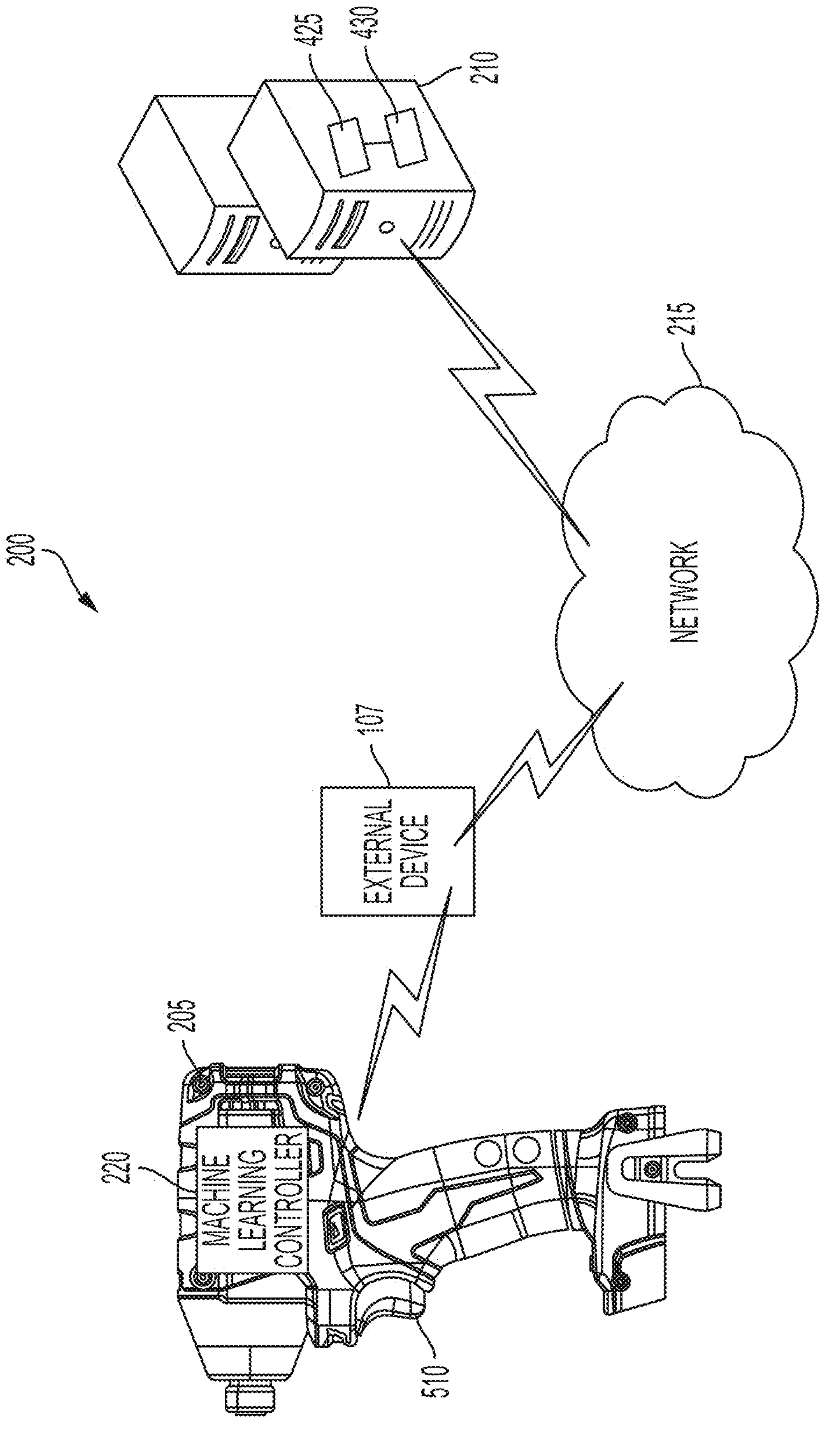
FIG. 2 illustrates a second power tool system.

FIG. 2 illustrates a second power tool system 200. The second power tool system 200 includes a power tool 205, the external device 107, a server 210, and a network 215. The power tool 205 is similar to that of the power tool system 100 of FIG. 1 and collects similar usage information as that described with respect to FIG. 1. Unlike the power tool 105 of the first power tool system 100, the power tool 205 of the second power tool system 200 includes a static machine learning controller 220. In the illustrated embodiment, the power tool 205 receives the static machine learning controller 220 from the server 210 over the network 215. In some embodiments, the power tool 205 receives the static machine learning controller 220 during manufacturing, while in other embodiments, a user of the power tool 205 may select to receive the static machine learning controller 220 after the power tool 205 has been manufactured and, in some embodiments, after operation of the power tool 205. The static machine learning controller 220 is a trained machine learning controller similar to the trained machine learning controller 120 in which the machine learning controller 120 has been trained using various training examples, and is configured to receive new input data and generate an estimation or classification for the new input data.

The power tool 205 communicates with the server 210 via, for example, the external device 107 as described above with respect to FIG. 1. The external device 107 may also provide additional functionality (e.g., generating a graphical user interface) to the power tool 205. The server 210 of the power tool system 200 may utilize usage information from power tools similar to the power tool 205 (for example, when the power tool 205 is a drill, the server 210 may receive usage information from various other drills) and trains a machine learning program using training examples from the received usage information from the power tools. The server 210 then transmits the trained machine learning program to the machine learning controller 220 of the power tool 205 for execution during future operations of the power tool 205.

Accordingly, the static machine learning controller 220 includes a trained machine learning program provided, for example, at the time of manufacture. During future operations of the power tool 205, the static machine learning controller 220 analyzes new usage data from the power tool 205 and generates recommendations or actions based on the new usage data. As discussed above with respect to the machine learning controller 120, the static machine learning controller 220 has one or more specific tasks such as, for example, determining a current application of the power tool 205. In other embodiments, the task of the static machine learning controller 220 may be different. In some embodiments, a user of the power tool 205 may select a task for the static machine learning controller 220 using, for example, a graphical user interface generated by the external device 107. The external device 107 may then transmit the target task for the static machine learning controller 220 to the server 210. The server 210 then transmits a trained machine learning program, trained for the target task, to the static machine learning controller 220. Based on the estimations or classifications from the static machine learning controller 220, the power tool 205 may change its operation, adjust one of the operating modes of the power tool 205, and/or adjust a different aspect of the power tool 205. In some embodiments, the power tool 205 may include more than one static machine learning controller 220, each having a different target task.

Figure 3:
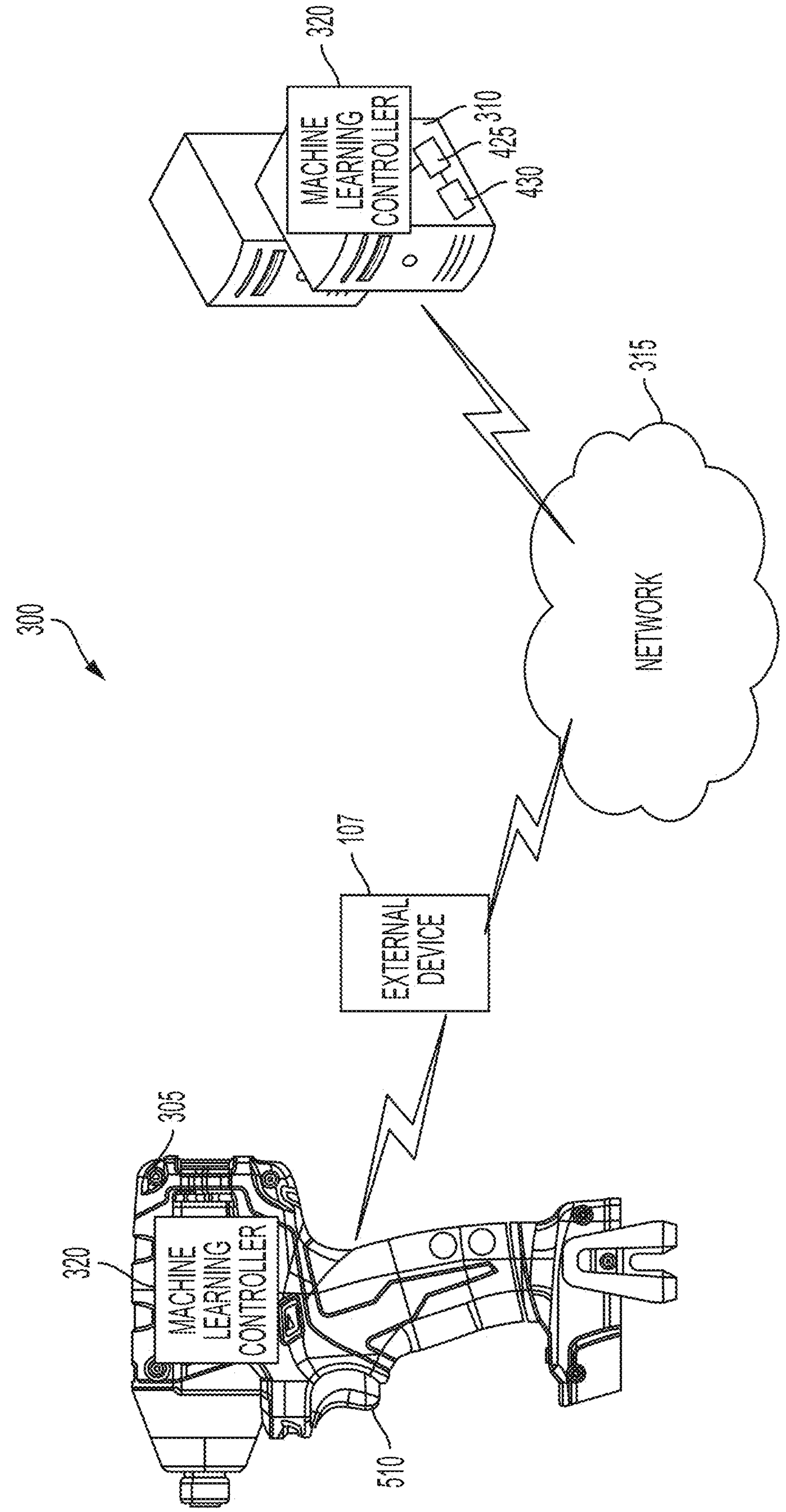
FIG. 3 illustrates a third power tool system.

FIG. 3 illustrates a third power tool system 300. The third power tool system 300 also includes a power tool 305, an external device 107, a server 310, and a network 315. The power tool 305 is similar to the power tools 105, 205 described above and includes similar sensors that monitor various types of usage information of the power tool 305 (e.g., motor speed, output torque, type of battery pack, state of charge of battery pack, and the like). The power tool 305 of the third power tool system 300, however, includes an adjustable machine learning controller 320 instead of the static machine learning controller 220 of the second power tool 205. In the illustrated embodiment, the adjustable machine learning controller 320 of the power tool 305 receives the machine learning program from the server 310 over the network 315. Unlike the static machine learning controller 220 of the second power tool 205, the server 310 may transmit updated versions of the machine learning program to the adjustable machine learning controller 320 to replace previous versions.

The power tool 305 of the third power tool system 300 transmits feedback to the server 310 (via, for example, the external device 107) regarding the operation of the adjustable machine learning controller 320. The power tool 305, for example, may transmit an indication to the server 310 regarding the number of operations that were incorrectly classified by the adjustable machine learning controller 320. The server 310 receives the feedback from the power tool 305, updates the machine learning program, and provides the updated program to the adjustable machine learning controller 320 to reduce the number of operations that are incorrectly classified. Thus, the server 310 updates or re-trains the adjustable machine learning controller 320 in view of the feedback received from the power tool 305. In some embodiments, the server 310 also uses feedback received from similar power tools to adjust the adjustable machine learning controller 320. In some embodiments, the server 310 updates the adjustable machine learning controller 320 periodically (e.g., every month). In other embodiments, the server 310 updates the adjustable machine learning controller 320 when the server 310 receives a predetermined number of feedback indications (e.g., after the server 310 receives two feedback indications). The feedback indications may be positive (e.g., indicating that the adjustable machine learning controller 320 correctly classified a condition, event, operation, or combination thereof), or the feedback may be negative (e.g., indicating that the adjustable machine learning controller 320 incorrectly classified a condition, event, operation, or combination thereof). In some examples, the feedback indications may be numerical (e.g. achieved torque value) or categorical (unseated, seated, stripped).

In some embodiments, the server 310 also utilizes usage data and/or sensor data (raw or processed) received from the power tool 305 and other similar power tools to update the adjustable machine learning controller 320. For example, the server 310 may periodically re-train (or adjust the training) of the adjustable machine learning controller 320 based on the newly received usage data. The server 310 then transmits an updated version of the adjustable machine learning controller 320 to the power tool 305.

When the power tool 305 receives the updated version of the adjustable machine learning controller 320 (e.g., when an updated machine learning program is provided to and stored on the machine learning controller 320), the power tool 305 replaces the current version of the adjustable machine learning controller 320 with the updated version. In some embodiments, the power tool 305 is equipped with a first version of the adjustable machine learning controller 320 during manufacturing. In such embodiments, the user of the power tool 305 may request newer versions of the adjustable machine learning controller 320. In some examples, implementation of updates, and/or use of the machine learning functionality may be provided via a subscription, purchase, and/or lease. In some embodiments, the user may select a frequency with which the adjustable machine learning controller 320 is transmitted to the power tool 305. In other examples, the operation or mode use of the power tool 305 may be disabled until a newer version of the machine learning controller 320 has been established on the power tool 305, and/or a calibration step of the machine learning controller 320 and/or power tool 305 is performed.

Figure 4A:
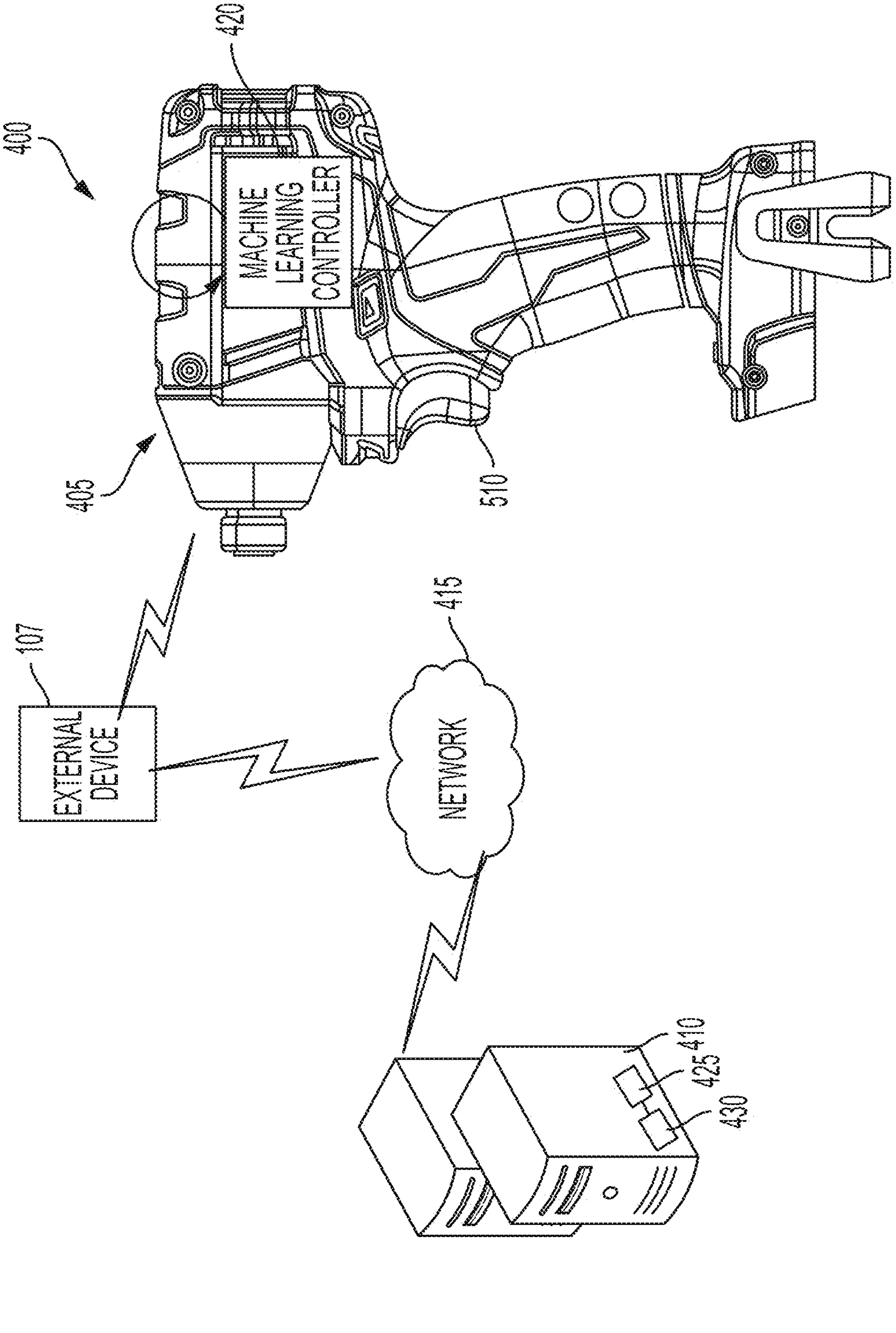
FIGS. 4A-B illustrate a fourth power tool system.

FIG. 4A illustrates a fourth power tool system 400. The fourth power tool system 400 includes a power tool 405, an external device 107, a network 415, and a server 410. The power tool 405 includes a self-updating machine learning controller 420. The self-updating machine learning controller 420 is first loaded on the power tool 405 during, for example, manufacturing. The self-updating machine learning controller 420 updates itself. In other words, the self-updating machine learning controller 420 receives new usage information from the sensors in the power tool 405, feedback information indicating desired changes to operational parameters (e.g., user wants to increase motor speed or output torque), feedback information indicating whether the classification made by the machine learning controller 420 is incorrect, or a combination thereof. The self-updating machine learning controller 420 then uses the received information to re-train the self-updating machine learning controller 420.

In some embodiments, the power tool 405 re-trains the self-updating machine learning controller 420 when the power tool 405 is not in operation. For example, the power tool 405 may detect when the motor has not been operated for a predetermined time period and start a re-training process of the self-updating machine learning controller 420 while the power tool 405 remains non-operational. Training the self-updating machine learning controller 420 while the power tool 405 is not operating allows more processing power to be used in the re-training process instead of competing for computing resources typically used to operate the power tool 405.

As shown in FIG. 4A, in some embodiments, the power tool 405 also communicates with the external device 107 and a server 410. For example, the external device 107 communicates with the power tool 405 as described above with respect to FIGS. 1-3. The external device 107 generates a graphical user interface to facilitate the adjustment of operational parameters of the power tool 405. The external device 107 may also bridge the communication between the power tool 405 and the server 410. For example, as described above with respect to FIG. 2, in some embodiments, the external device 107 receives a selection of a target task for the machine learning controller 420. The external device 107 may then request a corresponding machine learning program from the server 410 for transmitting to the power tool 405. The power tool 405 also communicates with the server 410 (e.g., via the external device 107). In some embodiments, the server 410 may also re-train the self-updating machine learning controller 420, for example, as described above with respect to FIG. 3. The server 410 may use additional training examples from other similar power tools. Using these additional training examples may provide greater variability and ultimately make the machine learning controller 420 more reliable. In some embodiments, the power tool 405 re-trains the self-updating machine learning controller 420 when the power tool 405 is not in operation, and the server 410 may re-train the machine learning controller 420 when the power tool 405 remains in operation (for example, while the power tool 405 is in operation during a scheduled re-training of the machine learning controller 420). Accordingly, in some embodiments, the self-updating machine learning controller 420 may be re-trained on the power tool 405, by the server 410, or with a combination thereof. In some embodiments, the server 410 does not re-train the self-updating machine learning controller 420, but still exchanges information with the power tool 405. For example, the server 410 may provide other functionality for the power tool 405 such as, for example, transmitting information regarding various operating modes for the power tool 405.

Each of FIGS. 1-4A describes a power tool system 100, 200, 300, 400 in which a power tool 105, 205, 305, 405 communicates with a server 110, 210, 310, 410 and with an external device 107. As discussed above with respect to FIG. 1, the external device 107 may bridge communication between the power tool 105, 205, 305, 405 and the server 110, 210, 310, 410. That is, the power tool 105, 205, 305, 405 may communicate directly with the external device 107. The external device 107 may then forward the information received from the power tool 105, 205, 305, 405 to the server 110, 210, 310, 410. Similarly, the server 110, 210, 310, 410 may transmit information to the external device 107 to be forwarded to the power tool 105, 205, 305, 405. In such embodiments, the power tool 105, 205, 305, 405 may include a transceiver to communicate with the external device 107 via, for example, a short-range communication protocol such as BLUETOOTH®. The external device 107 may include a short-range transceiver to communicate with the power tool 105, 205, 305, 405, and may also include a long-range transceiver to communicate with the server 110, 210, 310, 410. In some embodiments, a wired connection (via, for example, a USB cable) is provided between the external device 107 and the power tool 105, 205, 405 to enable direct communication between the external device 107 and the power tool 105, 205, 305, 405. Providing the wired connection may provide a faster and more reliable communication method between the external device 107 and the power tool 105, 205, 305, 405.

The external device 107 may include, for example, a smart telephone, a tablet computer, a cellular phone, a laptop computer, a smart watch, and the like. The server 110, 210, 310, 410 illustrated in FIGS. 1-4A includes at least a server electronic processor 425, a server memory 430, and a transceiver to communicate with the power tool 105, 205, 305, 405 via the network 115, 215, 315, 415. The server electronic processor 425 receives tool usage data from the power tool 105, 205, 305, 405, stores the tool usage data in the server memory 430, and, in some embodiments, uses the received tool usage data for building or adjusting the machine learning controller 120, 220, 320, 420. The term external system device may be used herein to refer to one or more of the external device 107 and the server 110, 210, 310, and 410, as each are external to the power tool 105, 205, 305, 405. Further, in some embodiments, the external system device is a wireless hub, such as a beaconing device place on a jobsite to monitor tools, function as a gateway network device (e.g., providing Wi-Fi® network), or both. As described herein, the external system device includes at least an input/output unit (e.g., a wireless or wired transceiver) for communication, a memory storing instructions, and an electronic processor to execute instructions stored on the memory to carry out the functionality attributed to the external system device.

Figure 4B:
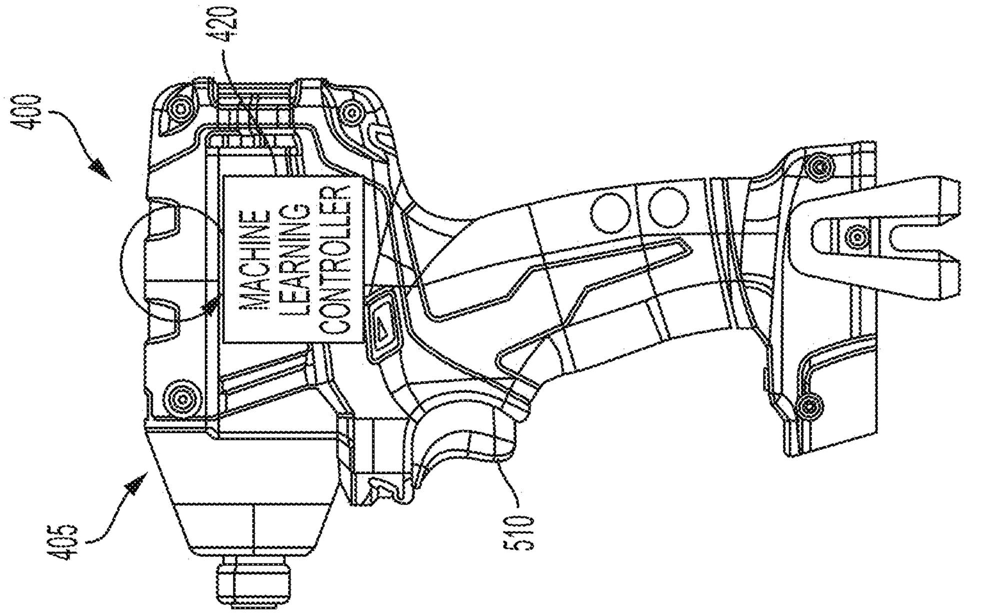

In some embodiments, the power tool 405 may not communicate with the external device 107 or the server 410. For example, FIG. 4B illustrates the power tool 405 with no connection to the external device 107 or the server 410. Rather, since the power tool 405 includes the self-updating machine learning controller 420, the power tool 405 can implement the machine learning controller 420, receive user feedback, and update the machine learning controller 420 without communicating with the external device 107 or the server 410.

Figure 4C:
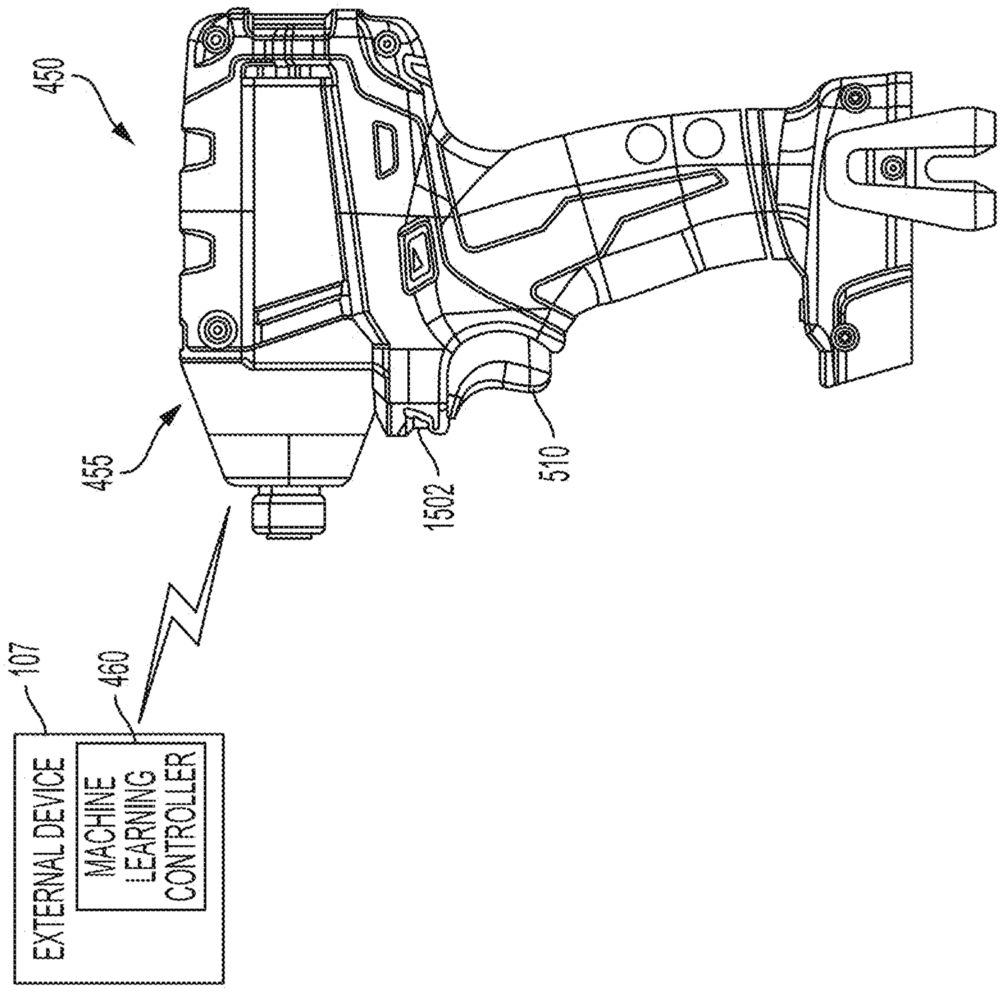
FIG. 4C illustrates a fourth power tool system.

FIG. 4C illustrates a fifth power tool system 450 including a power tool 455 and the external device 107. The external device 107 communicates with the power tool 455 using the various methods described above with respect to FIGS. 1-4A. In particular, the power tool 455 transmits operational data regarding the operation of the power tool 455 to the external device 107. The external device 107 generates a graphical user interface to facilitate the adjustment of operational parameters of the power tool 455 and to provide information regarding the operation of the power tool 455 to the user. In the illustrated embodiment of FIG. 4C, the external device 107 includes a machine learning controller 460. In some embodiments, the machine learning controller 460 is similar to the machine learning controller 120 of FIG. 1. In such embodiments, the machine learning controller 460 receives the usage information from the power tool 455 and generates recommendations for future operations of the power tool 455. The machine learning controller 460 may, in such embodiments, generate a set of parameters and updated threshold recommended for the operation of the power tool 105 in particular modes. The external device 107 then transmits the updated set of parameters and updated thresholds to the power tool 455 for implementation.

In some embodiments, the machine learning controller 460 is similar to the machine learning controller 320 of FIG. 3. In such embodiments, the external device 107 may update the machine learning controller 460 based on, for example, feedback received from the power tool 455 and/or other operational data from the power tool 455. In such embodiments, the power tool 455 also includes a machine learning controller similar to, for example, the adjustable machine learning controller 320 of FIG. 3. The external device 107 can then modify and update the adjustable machine learning controller 320 and communicate the updates to the machine learning controller 320 to the power tool 455 for implementation. For example, the external device 107 can use the feedback from the user to retrain the machine learning controller 460, to continue training a machine learning controller 460 implementing a reinforcement learning control, or may, in some embodiments, use the feedback to adjust a switching rate on a recurrent neural network for example.

In some embodiments, as discussed briefly above, the power tool 455 also includes a machine learning controller. The machine learning controller of the power tool 455 may be similar to, for example, the static machine learning controller 220 of FIG. 2, the adjustable machine learning controller 320 of FIG. 3 as described above, or the self-updating machine learning controller 420 of FIG. 4A.

Figure 4D:
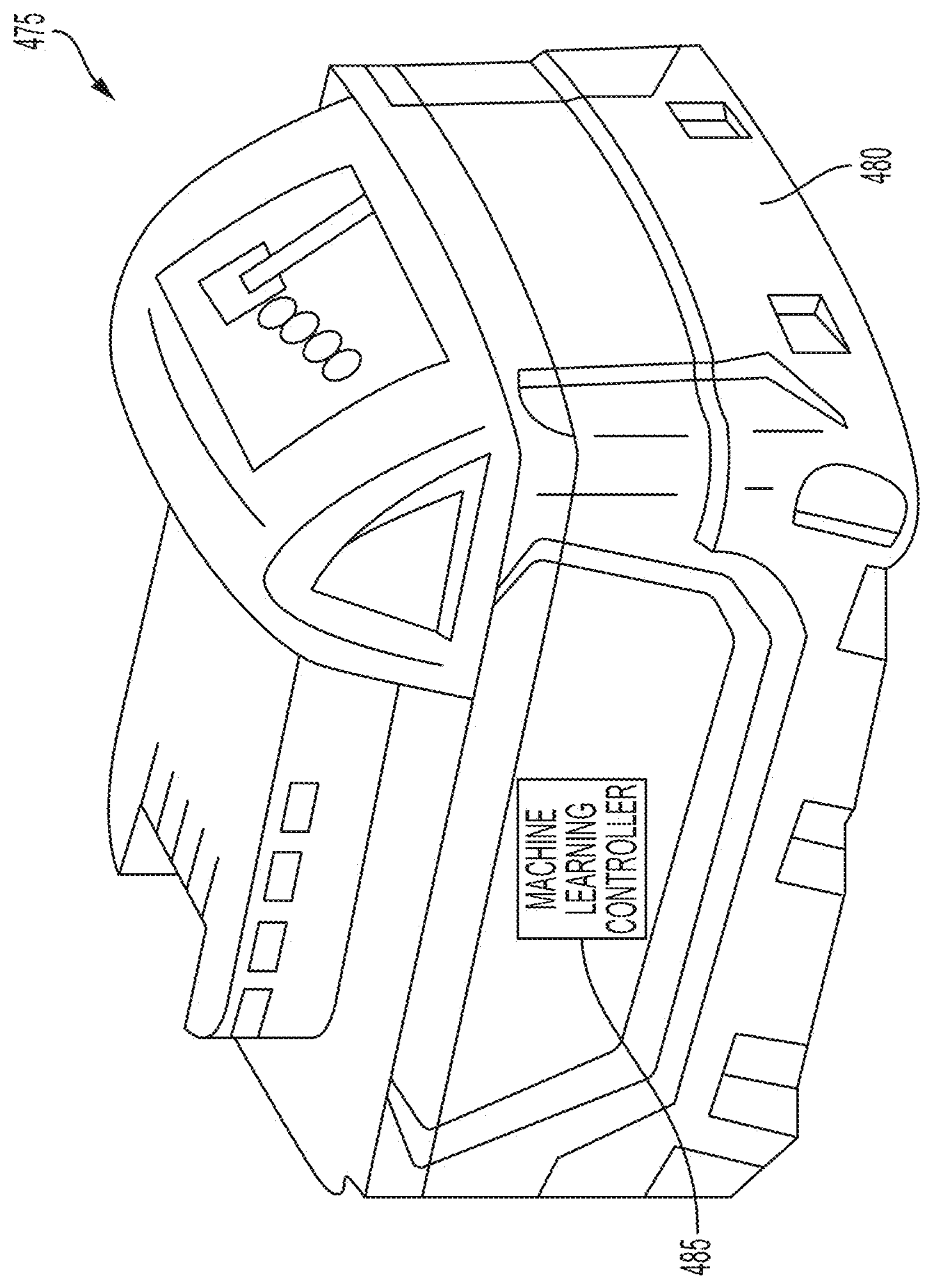
FIG. 4D illustrates a fifth power tool system.

FIG. 4D illustrates a sixth power tool system 475 including a battery pack 480. The battery pack 480 includes a machine learning controller 485. Although not illustrated, the battery pack 480 may, in some embodiments, communicate with the external device 107, a server, or a combination thereof through, for example, a network. Alternatively, or in addition, the battery pack may communicate with a power tool 455, such as a power tool 455 attached to the battery pack 480. The external device 107 and the server may be similar to the external device 107 and server 110, 210, 310, 410 described above with respect to FIGS. 1-4A. The machine learning controller 485 of the battery pack 480 may be similar to any of the machine learning controllers

220, 320, 420 described above. In one embodiment, the machine learning controller 220, 320, 420 controls operation of the battery pack 480. For example, the machine learning controller 485 may help identify different battery conditions that may be detrimental to the battery pack 480 and may automatically change (e.g., increase or decrease) the amount of current provided by the battery pack 480, and/or may change some of the thresholds that regulate the operation of the battery pack 480. For example, the battery pack 480 may, from instructions of the machine learning controller 485, reduce power to inhibit overheating of the battery cells. In some embodiments, the battery pack 480 communicates with a power tool (e.g., similar to the power tool 105, 205, 305, 405, 455) and the machine learning controller 485 controls at least some aspects and/or operations of the power tool. For example, the battery pack 480 may receive usage data (e.g., sensor data) from the power tool and generate outputs to control the operation of the power tool. The battery pack 480 may then transmit the control outputs to the electronic processor of the power tool.

In still other embodiments, a power system including a charger (e.g., for charging the battery pack 480 or a similar battery pack without a machine learning controller) is provided, wherein the charger includes a machine learning controller similar to those described herein. In some embodiments, an adapter configured to be positioned between the battery pack 480 and the power tool, such as power tool 305, can include a machine learning controller, which can control the power tool.

FIGS. 1-4C illustrate example power tools in the form of an impact driver 105, 205, 305, 405. The particular power tools 105, 205, 305, 405 illustrated and described herein, however, are merely representative. In other embodiments, the power tool systems 100, 200, 300, 400 described herein may include different types of power tools such as, for example, a power drill, a hammer drill, a powered screw driver, a screw gun, a powered ratchet, a powered torque wrench, a hydraulic pulse tool, an impact driver, an impact wrench, a reaction arm tool, a tension control gun or driver, a pipe cutter, a sander, a nailer, a grease gun, and the like. A power tool 105, 205, 305, 405 of the power tool systems 100, 200, 300, 400 is configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit), while a reciprocating saw is associated with the task of generating a reciprocating output motion (e.g., for pushing and pulling a saw blade). The task(s) associated with a particular tool may also be referred to as the primary function(s) of the tool. Each power tool includes a drive device specifically designed for the primary function of the power tool. For example, in the illustrated embodiments in which the power tool corresponds to an impact driver, the drive device is a socket. In embodiments, however, where the power tool is, for example, a power drill, the drive device may include an adjustable chuck as a bit driver.

Each of FIGS. 1-4D illustrate various embodiments in which different types of machine learning controllers 120, 220, 320, 420 are used in conjunction with the power tool 105, 205, 305, 405. In some embodiments, each power tool 105, 205, 305, 405 may include more than one machine learning controller 120, 220, 320, 420, and each machine learning controller 120, 220, 320, 420 may be of a different type. For example, a power tool 105, 205, 305, 405 may include a static machine learning controller 220 as described with respect to FIG. 2 and may also include a self-updating machine learning controller 420 as described with respect to FIG. 4A. In another example, the power tool 105, 205, 305, 405 may include a static machine learning controller 220. The static machine learning controller 220 may be subsequently removed and replaced by, for example, an adjustable machine learning controller 320. In other words, the same power tool may include any of the machine learning controllers 120, 220, 320, 420 described above with respect to FIGS. 1-4B. Additionally, a machine learning controller 540, shown in FIG. 6 and described in further detail below, is an example controller that may be used as one or more of the machine learning controllers 120, 220, 320, 420, 460, and 485.

Figure 5A:
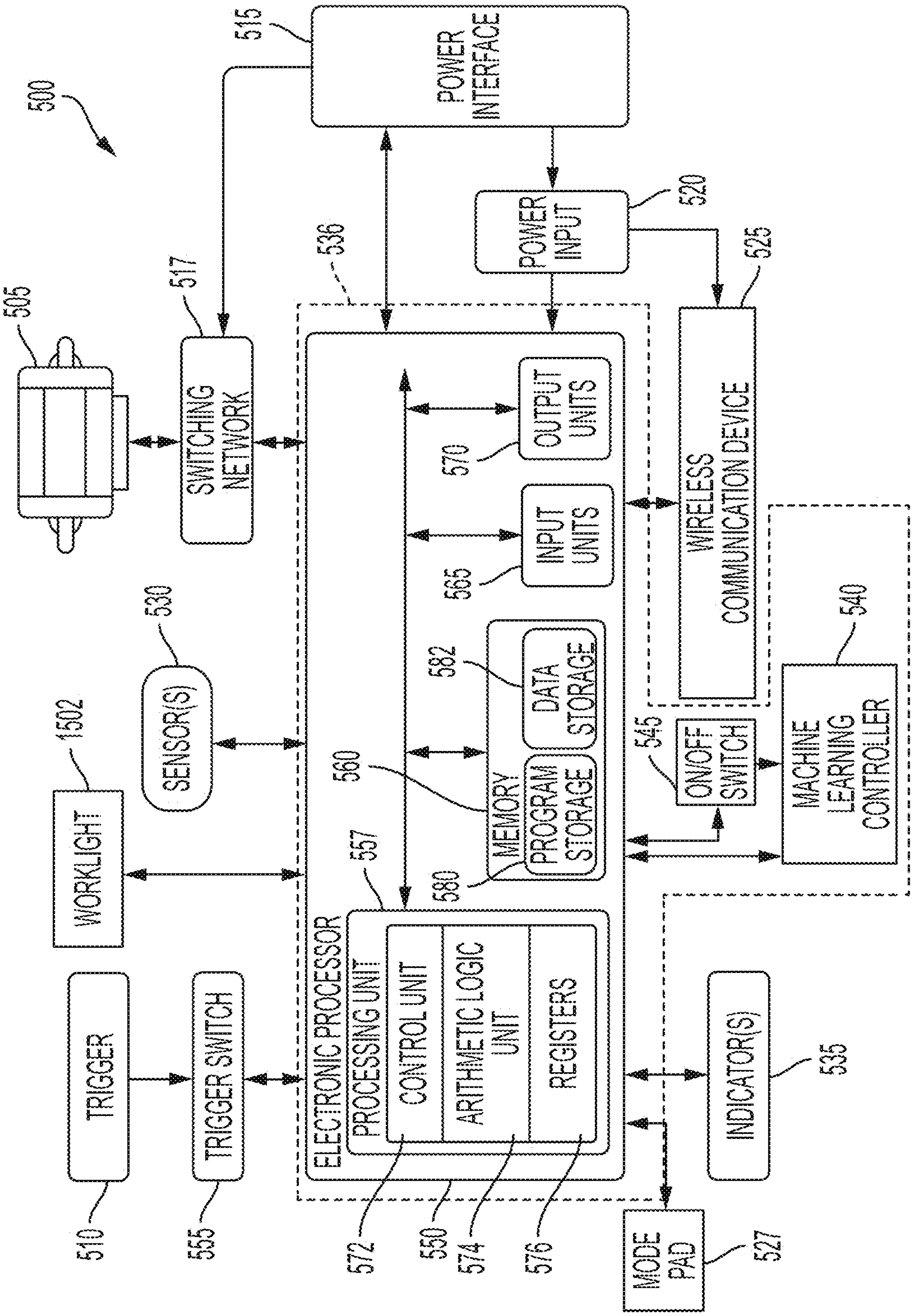
FIG. 5A is a block diagram of an example power tool of the power tool systems of FIGS. 1-4C.

FIG. 5A is a block diagram of a representative power tool 500 in the form of an impact driver and including a machine learning controller. Similar to the example power tools of FIGS. 1-4C, the power tool 500 is representative of various types of power tools. Accordingly, the description with respect to the power tool 500 is similarly applicable to other types of power tools. The machine learning controller of the power tool 500 may be a static machine learning controller similar to the static machine learning controller 220 of the second power tool 205, an adjustable machine learning controller similar to the adjustable machine learning controller 320 of the third power tool 305, or a self-updating machine learning controller similar to the self-updating machine learning controller 420 of the fourth power tool 405. Although the power tool 500 of FIG. 5A is described as being in communication with the external device 107 or with a server, in some embodiments, the power tool 500 is self-contained or closed, in terms of machine learning, and does not need to communicate with the external device 107 or the server to perform the functionality of the machine learning controller 540 described in more detail below.

As shown in FIG. 5A, the power tool 500 includes a motor 505, a trigger 510, a power interface 515, a switching network 517, a power input control 520, a wireless communication device 525, a mode pad 527, a plurality of sensors 530, a plurality of indicators 535, and an electronic control assembly 536. The electronic control assembly 536 includes a machine learning controller 540, an activation switch 545, and an electronic processor 550. The motor 505 actuates the drive device of the power tool 500 and allows the drive device to perform the particular task for the power tool 500. The motor 505 receives power from an external power source through the power interface 515. In some embodiment, the external power source includes an AC power source. In such embodiments, the power interface 515 includes an AC power cord that is connectable to, for example, an AC outlet. In other embodiments, the external power source includes a battery pack. In such embodiments, the power interface 515 includes a battery pack interface. The battery pack interface may include a battery pack receiving portion on the power tool 500 that is configured to receive and couple to a battery pack (e.g., the battery pack or a similar battery pack without machine learning controller). The battery pack receiving portion may include a connecting structure to engage a mechanism that secures the battery pack and a terminal block to electrically connect the battery pack to the power tool 500.

The motor 505 is energized based on a state of the trigger 510. Generally, when the trigger 510 is activated, the motor 505 is energized, and when the trigger 510 is deactivated, the motor is de-energized. In some embodiments, such as the power tools 105, 205, 305, 405 illustrated in FIGS. 1-4C, the trigger 510 extends partially down a length of the handle of the power tool and is moveably coupled to the handle such that the trigger 510 moves with respect to the power tool housing. In the illustrated embodiment, the trigger 510 is coupled to a trigger switch 555 such that when the trigger 510 is depressed, the trigger switch 555 is activated, and when the trigger is released, the trigger switch 555 is deactivated. In the illustrated embodiment, the trigger 510 is biased (e.g., with a biasing member such as a spring) such that the trigger 510 moves in a second direction away from the handle of the power tool 500 when the trigger 510 is released by the user. In other words, the default state of the trigger switch 555 is to be deactivated unless a user presses the trigger 510 and activates the trigger switch 555.

The switching network 517 enables the electronic processor 550 to control the operation of the motor 505. The switching network 517 includes a plurality of electronic switches (e.g., FETs, bipolar transistors, and the like) connected together to form a network that controls the activation of the motor 505 using a pulse-width modulated (PWM) signal. For instance, the switching network 217 may include a six-FET bridge that receives pulse-width modulated (PWM) signals from the electronic processor 550 to drive the motor 505. Generally, when the trigger 510 is depressed as indicated by an output of the trigger switch 555, electrical current is supplied from the power interface 515 to the motor 505 via the switching network 517. When the trigger 510 is not depressed, electrical current is not supplied from the power interface 515 to the motor 505. As discussed in more detail below, in some embodiments, the amount of trigger pull detected by the trigger switch 555 is related to or corresponds to a desired speed of rotation of the motor 505. In other embodiments, the amount of trigger pull corresponds to a desired torque.

In response to the electronic processor 550 receiving the activation signal from the trigger switch 555, the electronic processor 550 activates the switching network 517 to provide power to the motor 505. The switching network 517 controls the amount of current available to the motor 505 and thereby controls the speed and torque output of the motor 505. The mode pad 527 allows a user to select a mode of the power tool 500 and indicates to the user the currently selected mode of the power tool 500. In some embodiments, the mode pad 527 includes a single actuator. In such embodiments, a user may select an operating mode for the power tool 500 based on, for example, a number of actuations of the mode pad 527. For example, when the user activates the actuator three times, the power tool 500 may operate in a third operating mode. In other embodiments, the mode pad 527 includes a plurality of actuators, each actuator corresponding to a different operating mode. For example, the mode pad 527 may include four actuators, when the user activates one of the four actuators, the power tool 500 may operate in a first operating mode. The electronic processor 550 receives a user selection of an operating mode via the mode pad 527 and controls the switching network 517 such that the motor 505 is operated according to the selected operating mode. In some embodiments, the power tool 500 does not include a mode pad 527. In such embodiments, the power tool 500 may operate in a single mode or may include a different selection mechanism for selecting an operation mode for the power tool 500. In some embodiments, as described in more detail below, the power tool 500 (e.g., the electronic control assembly 536) automatically selects an operating mode for the power tool 500 using, for example, the machine learning controller 540.

The sensors 530 are coupled to the electronic processor 550 and communicate to the electronic processor 550 various output signals indicative of different parameters of the power tool 500 or the motor 505. The sensors 530 include, for example, Hall Effect sensors, motor current sensors, motor voltage sensors, temperature sensors, torque sensors, position or movement sensors such as accelerometers or gyroscopes, and the like. The Hall Effect sensors output motor feedback information to the electronic processor 550 such as an indication (e.g., a pulse) related to the motor's position, velocity, and acceleration of the rotor of the motor 505. In some embodiments, the electronic processor 550 uses the motor feedback information from the Hall Effect sensors to control the switching network 517 to drive the motor 505. For example, by selectively enabling and disabling the switching network 517, power is selectively provided to the motor 505 to cause rotation of the motor at a specific speed, a specific torque, or a combination thereof. The electronic processor 550 may also control the operation of the switching network 517 and the motor 505 based on other sensors included in the power tool 500. For example, in some embodiments, the electronic processor 550 changes the control signals based on a sensor output signal indicating a number of impacts delivered by the power tool 500, a sensor output signal indicating a speed of the anvil of the power tool 500, and the like. The output signals from the sensors are used to ensure proper timing of control signals to the switching network 517 and, in some instances, to provide closed-loop feedback to control the speed of the motor 505 to be within a target range or at a target level.

The indicators 535 are also coupled to the electronic processor 550. The indicators 535 receive control signals from the electronic processor 500 to generate a visual signal to convey information regarding the operation or state of the power tool 500 to the user. The indicators 535 may include, for example, LEDs or a display screen and may generate various signals indicative of, for example, an operational state or mode of the power tool 500, an abnormal condition or event detected during the operation of the power tool 500, and the like. For example, the indicators 535 may indicate measured electrical characteristics of the power tool 500, the state or status of the power tool 500, an operating mode of the power tool 500 (discussed in further detail below), and the like. In some embodiments, the indicators 535 include elements to convey information to a user through audible or tactile outputs. In some embodiments, the power tool 500 does not include the indicators 535. In some embodiments, the operation of the power tool 500 alerts the user regarding a power tool condition. For example, a fast deceleration of the motor 505 may indicate that an abnormal condition is present. In some embodiments, the power tool 500 communicates with the external device 107, and the external device 107 generates a graphical user interface that conveys information to the user without the need for indictors 535 on the power tool 500 itself.

The power interface 515 is coupled to the power input control 520. The power interface 515 transmits the power received from the external power source to the power input control 520. The power input control 520 includes active and/or passive components (e.g., voltage step-down controllers, voltage converters, rectifiers, filters, etc.) to regulate or control the power received through the power interface 515 to the electronic processor 550 and other components of the power tool 500 such as the wireless communication device 525.

The wireless communication device 525 is coupled to the electronic processor 550. In the example power tools 105, 205, 305, 405 of FIGS. 1-4A and 4C, the wireless communication device 525 is located near the foot of the power tool

105, 205, 305, 405 (sec FIGS. 1-4) to save space and ensure that the magnetic activity of the motor 505 does not affect the wireless communication between the power tool 500 and the server 110, 210, 310, 410 or with an external device 107. In a particular example, the wireless communication device 525 is positioned under the mode pad 527. The wireless communication device 525 may include, for example, a radio transceiver and antenna, a memory, a processor, and a real-time clock. The radio transceiver and antenna operate together to send and receive wireless messages to and from the external device 107, a second power tool 500, or the server 110, 210, 310, 410 and the processor. The memory of the wireless communication device 525 stores instructions to be implemented by the processor and/or may store data related to communications between the power tool 500 and the external device 107, a second power tool 500, or the server 110, 210, 310, 410. The processor for the wireless communication device 525 controls wireless communications between the power tool 500 and the external device 107, a second power tool 500, or the server 110, 210, 310, 410. For example, the processor of the wireless communication device 525 buffers incoming and/or outgoing data, communicates with the electronic processor 550, and determines the communication protocol and/or settings to use in wireless communications.

In some embodiments, the wireless communication device 525 is a Bluetooth® controller. The Bluetooth® controller communicates with the external device 107, a second power tool 500, or server 110, 210, 310, 410 employing the Bluetooth® protocol. In such embodiments, therefore, the external device 107, a second power tool 500, or server 110, 210, 310, 410 and the power tool 500 are within a communication range (i.e., in proximity) of each other while they exchange data. In other embodiments, the wireless communication device 525 communicates using other protocols (e.g., Wi-Fi, cellular protocols, a proprietary protocol, etc.) over a different type of wireless network. For example, the wireless communication device 525 may be configured to communicate via Wi-Fi through a wide area network such as the Internet or a local area network, or to communicate through a piconet (e.g., using infrared or NFC communications). The communication via the wireless communication device 525 may be encrypted to protect the data exchanged between the power tool 500 and the external device 107, a second power tool 500, or server 110, 210, 310, 410 from third parties.

In some embodiments, the wireless communication device 525 includes a real-time clock (RTC). The RTC increments and keeps time independently of the other power tool components. The RTC receives power from the power interface 515 when an external power source is connected to the power tool 500 and may receive power from a back-up power source when the external power source is not connected to the power tool 500. The RTC may time stamp the operational data from the power tool 500. Additionally, the RTC may enable a security feature in which the power tool 500 is disabled (e.g., locked-out and made inoperable) when the time of the RTC exceeds a lockout time determined by the user.

The wireless communication device 525, in some embodiments, exports tool usage data, maintenance data, mode information, drive device information, and the like from the power tool 500 (e.g., from the power tool electronic processor 550). The exported data may indicate, for example, when work was accomplished, and that work was accomplished to specification. The exported data can also provide a chronological record of work that was performed, track duration of tool usage, and the like. The server 110, 210, 310, 410 receives the exported information, either directly from the wireless communication device 525 or through an external device 107, and logs the data received from the power tool 500. As discussed in more detail below, the exported data can be used by the power tool 500, the external device 107, or the server 110, 210, 310, 410 to train or adapt a machine learning controller relevant to similar power tools. The wireless communication device 525 may also receive information from the server 110, 210, 310, 410, the external device 107, or a second power tool 500, such as configuration data, operation threshold, maintenance threshold, mode configurations, programming for the power tool 500, updated machine learning controllers for the power tool 500, and the like. For example, the wireless communication device 525 may exchange information with a second power tool 500 directly, or via an external device 107.

In some embodiments, the power tool 500 does not communicate with the external device 107 or with the server 110, 210, 310, 410 (e.g., power tool 405 in FIG. 4B). Accordingly, in some embodiments, the power tool 500 does not include the wireless communication device 525 described above. In some embodiments, the power tool 500 includes a wired communication interface to communicate with, for example, the external device 107 or a different device (e.g., another power tool 500). The wired communication interface may provide a faster communication route than the wireless communication device 525.

In some embodiments, the power tool 500 includes a data sharing setting. The data sharing setting indicates what data, if any, is exported from the power tool 500 to the server 110, 210, 310, 410. In one embodiment, the power tool 500 receives (e.g., via a graphical user interface generated by the external device 107) an indication of the type of data to be exported from the power tool 500. In one embodiment, the external device 107 may display various options or levels of data sharing for the power tool 500, and the external device 107 receives the user's selection via its generated graphical user interface. For example, the power tool 500 may receive an indication that only usage data (e.g., motor current and voltage, number of impacts delivered, torque associated with each impact, and the like) is to be exported from the power tool 500, but may not export information regarding, for example, the modes implemented by the power tool 500, the location of the power tool 500, and the like. In some embodiments, the data sharing setting may be a binary indication of whether or not data regarding the operation of the power tool 500 (e.g., usage data) is transmitted to the server 110, 210, 310, 410. The power tool 500 receives the user's selection for the data sharing setting and stores the data sharing setting in memory to control the communication of the wireless communication device 525 according to the selected data sharing setting.

The electronic control assembly 536 is electrically and/or communicatively connected to a variety of modules or components of the power tool 500. The electronic assembly 536 controls the motor 505 based on the outputs and determinations from the machine learning controller 540. In particular, the electronic control assembly 136 includes the electronic processor 550 (also referred to as an electronic controller), the machine learning controller 540, and the corresponding activation switch 545. In some embodiments, the electronic processor 550 includes a plurality of electrical and electronic components that provide power, operational control, and protection to the components and modules within the electronic processor 550 and/or power tool 500. For example, the electronic processor 550 includes, among other things, a processing unit 557 (e.g., a microprocessor, a microcontroller, or another suitable programmable device), a memory 560, input units 565, and output units 570. The processing unit 557 includes, among other things, a control unit 572, an arithmetic logic unit ("ALU") 574, and a plurality of registers 576. In some embodiments, the electronic processor 550 is implemented partially or entirely on a semiconductor (e.g., a field-programmable gate array ["FPGA"] semiconductor) chip or an Application Specific Integrated Circuit ("ASIC"), such as a chip developed through a register transfer level ("RTL") design process.

The memory 560 includes, for example, a program storage area 580 and a data storage area 582. The program storage area 580 and the data storage area 582 can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 230 is connected to the memory 560 and executes software instructions that are capable of being stored in a RAM of the memory 560 (e.g., during execution), a ROM of the memory 560 (e.g., on a generally permanent basis), or another non-transitory computer readable medium such as another memory or a disc. Software included in the implementation of the power tool 500 can be stored in the memory 560 of the electronic processor 550. The software includes, for example, firmware, one or more applications, program data, filters, rules, one or more program modules, and other executable instructions. In some embodiments, the machine learning controller 540 may be stored in the memory 560 of the electronic processor 550 and are executed by the processing unit 557.

The electronic processor 550 is configured to retrieve from memory 560 and execute, among other things, instructions related to the control processes and methods described herein. The electronic processor 550 is also configured to store power tool information on the memory 560 including tool usage information, information identifying the type of tool, a unique identifier for the particular tool, user characteristics (e.g., identity, trade type, skill level), and other information relevant to operating or maintaining the power tool 500 (e.g., received from an external source, such as the external device 107 or pre-programed at the time of manufacture). The tool usage information, such as current levels, motor speed, motor acceleration, motor direction, number of impacts, may be captured or inferred from data output by the sensors 530. More particularly, Table 3 shows example types of tool usage information which may be captured or inferred by the electronic processor 550. In other constructions, the electronic processor 550 includes additional, fewer, or different components.

TABLE 3

| Type of data | Time-series data | Non-time-series data |
| --- | --- | --- |
| Raw data | Trigger, current, voltage, speed, torque, temperature, motion, timing between events (ex: impacts) etc. | Duration, date, time, time, time since last use, mode, clutch setting, direction, battery type, presence of side-handle, errors, history of past applications and switching rate, user input, external inputs, gear etc. |

TABLE 3-continued

| Type of data | Time-series data | Non-time-series data |
| --- | --- | --- |
| Derived features | Filtered values of raw data, fast Fourier transforms (FFTs), subsampled/pooled data, fitted parameters (ex: polynomial fits), PCA, features generated by encoder [decoder] networks, derived features (ex: estimated energy, momentum, inertia of system), derivatives/ integrals/functions/ accumulators of parameters, padded data, sliding window of data, etc. | Principal component analysis (PCA), features generated by encoder [decoder] networks, likelihood matrix of application/history, functions of inputs, etc. |

The machine learning controller 540 is coupled to the electronic processor 550 and to the activation switch 545. The activation switch 545 switches between an activated state and a deactivated state. When the activation switch 545 is in the activated state, the electronic processor 550 is in communication with the machine learning controller 540 and receives decision outputs from the machine learning controller 540. When the activation switch 545 is in the deactivated state, the electronic processor 550 is not in communication with the machine learning controller 540. In other words, the activation switch 545 selectively enables and disables the machine learning controller 540. As described above with respect to FIGS. 1-4D, the machine learning controller 540 includes a trained machine learning controller that utilizes previously collected power tool usage data to analyze and classify new usage data from the power tool 500. As explained in more detail below, the machine learning controller 540 can identify conditions, applications, and states of the power tool. In one embodiment, the activation switch 545 switches between an activated state and a deactivated state. In such embodiments, while the activation switch 545 is in the activated state, the electronic processor 550 controls the operation of the power tool 500 (e.g., changes the operation of the motor 505) based on the determinations from the machine learning controller 540. Otherwise, when the activation switch 545 is in the deactivated state, the machine learning controller 540 is disabled and the machine learning controller 540 does not affect the operation of the power tool 500. In some embodiments, however, the activation switch 545 switches between an activated state and a background state. In such embodiments, when the activation switch 545 is in the activated state, the electronic processor 550 controls the operation of the power tool 500 based on the determinations or outputs from the machine learning controller 540. However, when the activation switch 545 is in the background state, the machine learning controller 540 continues to generate output based on the usage data of the power tool 500 and may calculate (e.g., determine) thresholds or other operational levels, but the electronic processor 550 does not change the operation of the power tool 500 based on the determinations and/or outputs from the machine learning controller 540. In other words, in such embodiments, the machine learning controller 540 operates in the background without affecting the operation of the power tool 500. In some embodiments, the activation switch 545 is not included on the power tool 500 and the machine learning controller 540 is maintained in the enabled state or is controlled to be enabled and disabled via, for example, wireless signals from the server (e.g., servers 110, 210, 310, 410) or from the external device 107.

Figure 5B:
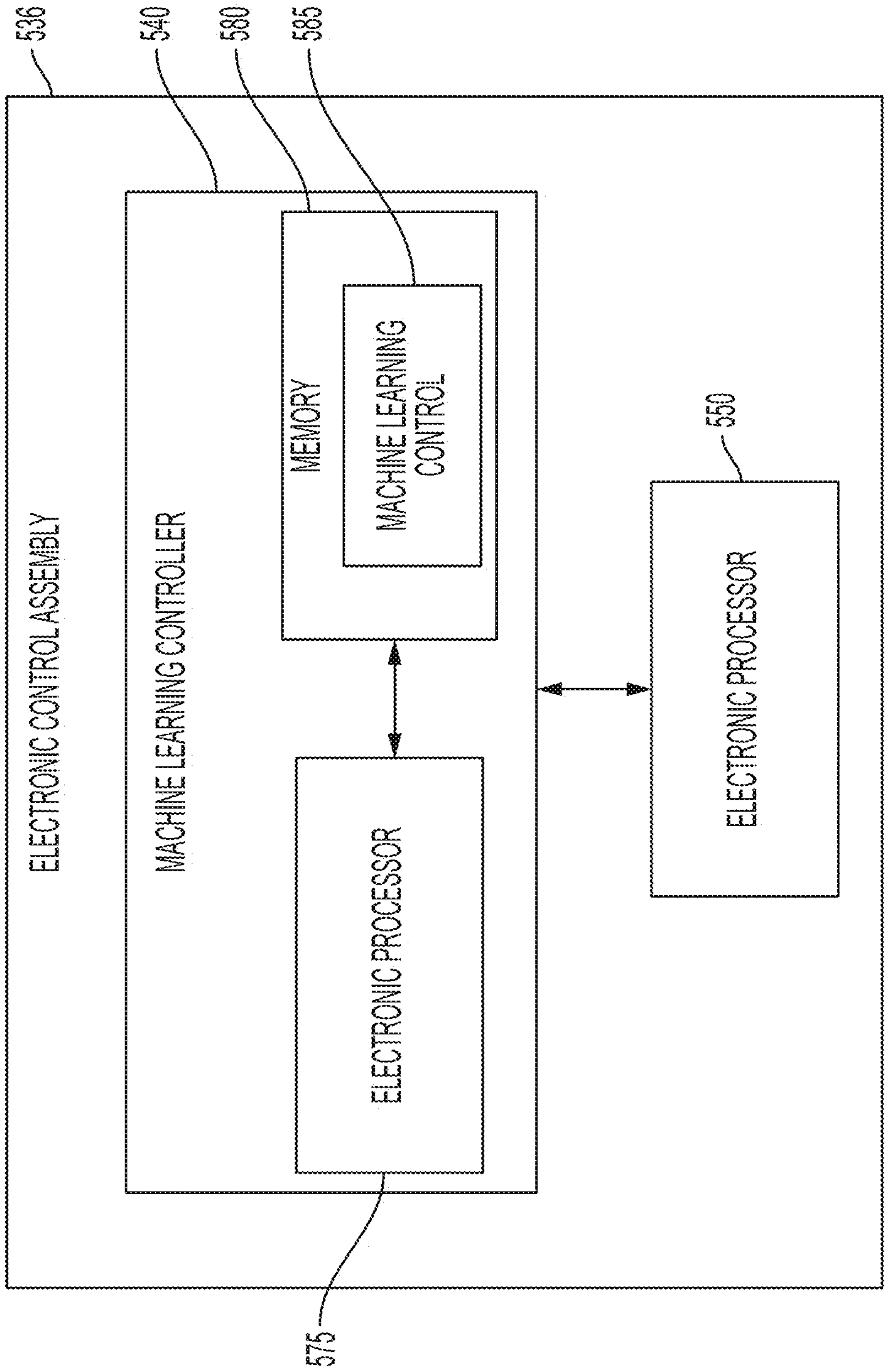
FIG. 5B is a block diagram of a machine learning controller of the power tool of FIG. 5A.

As shown in FIG. 5B, the machine learning controller 540 includes an electronic processor 575 and a memory 580. The memory 580 stores a machine learning control 585. The machine learning control 585 may include a trained machine learning program as described above with respect to FIGS. 1-4D. In the illustrated embodiment, the electronic processor 575 includes a graphics processing unit. In the embodiment of FIG. 5B, the machine learning controller 540 is positioned on a separate printed circuit board (PCB) as the electronic processor 550 of the power tool 500. The PCB of the electronic processor 550 and the machine learning controller 540 are coupled with, for example, wires or cables to enable the electronic processor 550 of the power tool 500 to control the motor 505 based on the outputs and determinations from the machine learning controller 540. In other embodiments, however, the machine learning control 585 may be stored in memory 560 of the electronic processor 550 and may be implemented by the processing unit 557. In such embodiments, the electronic control assembly 536 includes a single electronic processor 550. In yet other embodiments, the machine learning controller 540 is implemented in the separate electronic processor 575 but is positioned on the same PCB as the electronic processor 550 of the power tool 500. Embodiments with the machine learning controller 540 implemented as a separate processing unit from the electronic processor 550, whether on the same or different PCBs, allows selecting a processing unit to implement each of the machine learning controller 540 and the electronic processor 550 that has its capabilities (e.g., processing power and memory capacity) tailored to the particular demands of each unit. Such tailoring can reduce costs and improve efficiencies of the power tools. In some embodiments, as illustrated in FIG. 4C, for example, the external device 107 includes the machine learning controller 540 and the power tool 500 communicates with the external device 107 to receive the estimations or classifications from the machine learning controller 540. In some embodiments, the machine learning controller 540 is implemented in a plug-in chip or controller that is easily added to the power tool 500. For example, the machine learning controller 540 may include a plug-in chip that is received within a cavity of the power tool 500 and connects to the electronic processor 550. For example, in some embodiments, the power tool 500 includes a lockable compartment including electrical contacts that is configured to receive and electrically connect to the plug-in machine learning controller 540. The electrical contacts enable bidirectional communication between the plug-in machine learning controller 540 and the electronic processor 550 and enable the plug-in machine learning controller 540 to receive power from the power tool 500.

Figure 6:
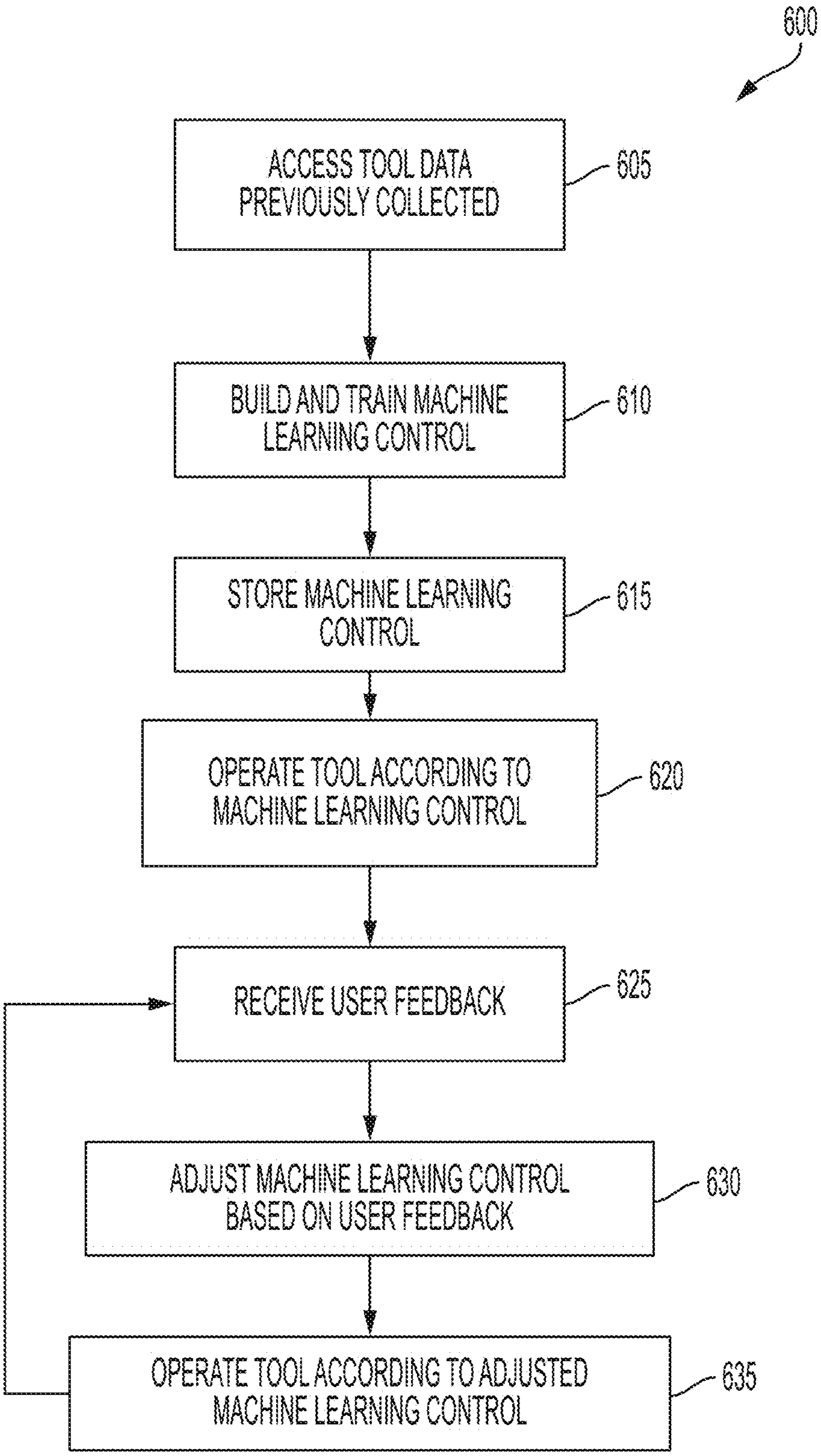
FIG. 6 is a flowchart illustrating a method of building and implementing a machine learning controller for the power tool of FIG. 5A.

As discussed above with respect to FIG. 1, the machine learning control 585 may be built and operated by the server 110. In other embodiments, the machine learning control 585 may be built by the server 110, but implemented by the power tool 500 (similar to FIGS. 2 and 3), and in yet other embodiments, the power tool 500 (e.g., the electronic processor 550, electronic processor 575, or a combination thereof) builds and implements the machine learning control 585 (similar to FIG. 4B). FIG. 6 illustrates a method 600 of building and implementing the machine learning control 585. The method 600 is described with respect to power tool 500, but, as previously described with respect to FIG. 5, the power tool 500 is representative of the power tools 105, 205, 305, 405 described in the respective systems of FIGS. 1-4C. Accordingly, a similar method may be implemented by the power tool 105, 205, 305, 405 of the respective systems of FIGS. 1-4D. In step 605, the server electronic processor 425 accesses tool usage information previously collected from similar power tools. Additionally, the server electronic processor 425 accesses user characteristic information, such as characteristic information of a user using a respective power tool at a time the power tool is collecting tool usage information. For example, to build the machine learning control 585 for the impact drivers of FIGS. 1-4C and 5A, the server electronic processor 425 accesses tool usage data previously collected from other impact drivers (e.g., via the network 115). The tool usage data includes, for example, motor current, motor voltage, motor position and/or velocity, usage time, battery state of charge, position of the power tool, position or velocity of the output shaft, number of impacts, and the like. Additionally, the server electronic processor 425 accesses user characteristic information previously collected (e.g., via the network 115). The server electronic processor 425 then proceeds to build and train the machine learning control 585 based on the tool usage data, the user characteristic information, or both (step 610).

Building and training the machine learning control 585 may include, for example, determining the machine learning architecture (e.g., using a support vector machine, a decision tree, a neural network, or a different architecture). In the case of building and training a neural network, for example, building the neural network may also include determining the number of input nodes, the number of hidden layers, the activation function for each node, the number of nodes of each hidden layer, the number of output nodes, and the like. Training the machine learning control 585 includes providing training examples to the machine learning control 585 and using one or more algorithms to set the various weights, margins, or other parameters of the machine learning control 585 to make reliable estimations or classifications.

In some embodiments, building and training the machine learning control 585 includes building and training a recurrent neural network. Recurrent neural networks allow analysis of sequences of inputs instead of treating every input individually. That is, recurrent neural networks can base their determination or output for a given input not only on the information for that particular input, but also on the previous inputs. For example, when the machine learning control 585 is configured to identify a type of fastener used with the power tool 500, the machine learning control 585 may determine that since the last three operations used lug nuts, the fourth operation is also likely to use a lug nut. Using recurrent neural networks helps compensate for some of the misclassifications the machine learning control 585 would make by providing and taking account the context around a particular operation. Accordingly, when implementing a recurrent neural network, the learning rate affects not only how each training example affects the overall recurrent neural network (e.g., adjusting weights, biases, and the like), but also affects how each input affects the output of the next input.

The server electronic processor 425 builds and trains the machine learning control 585 to perform a particular task. For example, in some embodiments, the machine learning control 585 is trained to identify an application for which the power tool 500 is used (e.g., for seating fasteners). In other embodiments, the machine learning control 585 is trained to detect when a detrimental condition is present or eminent (e.g., detecting kickback). The task for which the machine learning control 585 is trained may vary based on, for example, the type of power tool 500, a selection from a user, typical applications for which the power tool is used, user characteristic information, and the like. FIGS. 12-17 expand on examples of particular tasks for which the machine learning control 585 is built and trained. The server electronic processor 425 uses different tool usage data to train the machine learning control 585 based on the particular task.

In some embodiments, the particular task for the machine learning controller 540 (e.g., for the machine learning control 585) also defines the particular architecture for the machine learning control 585. For example, for a first set of tasks, the server electronic processor 425 may build a support vector machine, while, for a second set of tasks, the server electronic processor 425 may build a neural network. In some embodiments, each task or type of task is associated with a particular architecture. In such embodiments, the server electronic processor 425 determines the architecture for the machine learning control 585 based on the task and the machine learning architecture associated with the particular task.

After the server electronic processor builds and trains the machine learning control 585, the server electronic processor 425 stores the machine learning control 585 in, for example, the memory 430 of the server 110 (step 615). The server electronic processor 425, additionally or alternatively, transmits the trained machine learning control 585 to the power tool 500. In such embodiments, the power tool 500 stores the machine learning control 585 in the memory 580 of the machine learning controller 540. In some embodiments, for example, when the machine learning control 585 is implemented by the electronic processor 550 of the power tool 500, the power tool 500 stores the machine learning control 585 in the memory 560 of the electronic control assembly 536.

Once the machine learning control 585 is stored, the power tool 500 operates the motor 505 according to (or based on) the outputs and determinations from the machine learning controller 540 (step 620). In embodiments in which the machine learning controller 540 (including the machine learning control 585) is implemented in the server 110, 210, the server 110, 210 may determine operational thresholds from the outputs and determinations from the machine learning controller 540. The server 110, 210 then transmits the determined operational thresholds to the power tool 500 to control the motor 505.

The performance of the machine learning controller 540 depends on the amount and quality of the data used to train the machine learning controller 540. Accordingly, if insufficient data is used (e.g., by the server 110, 210, 310, 410) to train the machine learning controller 540, the performance of the machine learning controller 540 may be reduced. Alternatively, different users may have different preferences and may operate the power tool 500 for different applications and in a slightly different manner (e.g., some users may press the power tool 500 against the work surface with a greater force, some may prefer a faster finishing speed, and the like). These differences in usage of the power tool 500 may also compromise some of the performance of the machine learning controller 540 from the perspective of a user.

Optionally, to improve the performance of the machine learning controller 540, in some embodiments, the server electronic processor 425 receives feedback from the power tool 500 (or the external device 107) regarding the performance of the machine learning controller 540 (step 625). In other words, at least in some embodiments, the feedback is with regard to the control of the motor from the earlier step 620. In other embodiments, however, the power tool 500 does not receive user feedback regarding the performance of the machine learning controller 540 and instead continues to operate the power tool 500 by executing the machine learning control 585. As explained in further detail below, in some embodiments, the power tool 500 includes specific feedback mechanism for providing feedback on the performance of the machine learning controller 540. In some embodiments, the external device 107 may also provide a graphical user interface that receives feedback from a user regarding the operation of the machine learning controller 540. The external device 107 then transmits the feedback indications to the server electronic processor 425. In some embodiments, the power tool 500 may only provide negative feedback to the server 110, 210, 310, 410 (e.g., when the machine learning controller 540 performs poorly).

In some embodiments, the server 110, 210, 310, 410 may consider the lack of feedback from the power tool 500 (or the external device 107) to be positive feedback indicating an adequate performance of the machine learning controller 540. In some embodiments, the power tool 500 receives, and provides to the server electronic processor 425, both positive and negative feedback. In some embodiments, in addition or instead of user feedback (e.g., directly input to the power tool 500), the power tool 500 senses one or more power tool characteristics via one or more sensors 530, and the feedback is based on the sensed power tool characteristic(s). For example, on a torque wrench embodiment of the power tool 500, the torque wrench includes a torque sensor to sense output torque during a fastener operation, and the sensed output torque is provided as feedback. The feedback from the torque sensor can directly provide feedback to itself to prevent overshooting target torque during rundown and seating of a fastener. Alternatively, a sensor on a different power tool may be used (e.g. a separate powered torque wrench) to provide feedback.

The sensed output torque (e.g., feedback) may be evaluated locally on the power tool 500, or externally on the external device 107 or the server electronic processor 425, to determine whether the feedback is positive or negative (e.g., the feedback may be positive when the sensed output torque is within an acceptable torque range, and negative when outside of the acceptable torque range). Alternatively, the sensed output may be used to scale or transfer outputs and/or adjusted thresholds and/or confidence ranges for the machine learning control 585. As discussed above, in some embodiments, the power tool 500 may send the feedback or other information directly to the server 110, 210, 310, 410 while in other embodiments, an external device 107 may serve as a bridge for communications between the power tool 500 and the server 110, 210, 310 410 and may send the feedback to the server 110, 210, 310, 410.

The server electronic processor 425 then adjusts the machine learning control 585 based on the received user feedback (step 630). In some embodiments, the server electronic processor 425 adjusts the machine learning control 585 after receiving a predetermined number of feedback indications (e.g., after receiving 100 feedback indications). In other embodiments, the server electronic processor 425 adjusts the machine learning control 585 after a predetermined period of time has elapsed (e.g., every two months). In yet other embodiments, the server electronic processor 425 adjusts the machine learning control 585 continuously (e.g., after receiving each feedback indication). Adjusting the machine learning control 585 may include, for example, retraining the machine learning controller 540 using the additional feedback as a new set of training data or adjusting some of the parameters (e.g., weights, support vectors, and the like) of the machine learning controller 540. Because the machine learning controller 540 has already been trained for the particular task, re-training the machine learning controller 540 with the smaller set of newer data requires less computing resources (e.g., time, memory, computing power, etc.) than the original training of the machine learning controller 540.

In some embodiments, the machine learning control 585 includes a reinforcement learning control that allows the machine learning control 585 to continually integrate the feedback received by the user to optimize the performance of the machine learning control 585. In some embodiment, the reinforcement learning control periodically evaluates a reward function based on the performance of the machine learning control 585. In such embodiments, training the machine learning control 585 includes increasing the operation time of the power tool 500 such that the reinforcement learning control 585 receives sufficient feedback to optimize the execution of the machine learning control 585. In some embodiments, when reinforcement learning is implemented by the machine learning control 585, a first stage of operation (e.g., training) is performed during manufacturing or before such that when a user operates the power tool 500, the machine learning control 585 can achieve a predetermined minimum performance (e.g., accuracy). The machine learning control 585, once the user operates his/her power tool 500, may continue learning and evaluating the reward function to further improve its performance. Accordingly, a power tool may be initially provided with a stable and predictable algorithm, which may be adapted over time. In some embodiments, reinforcement learning is limited to portions of the machine learning control 585. For example, in some embodiments, instead of potentially updating weights/biases of the entire or a substantial portion of the machine learning control 585, which can take significant processing power and memory, the actual model remains frozen or mostly frozen (e.g., all but last layer(s) or outputs), and only one or a few output parameters or output characteristics (such as final scaling or thresholds) of the machine learning control 585 are updated based on feedback.

In some embodiments, the machine learning controller 540 interprets the operation of the power tool 500 by the user as feedback regarding the performance of the machine learning controller 540. For example, if the user presses the trigger harder during execution of a particular mode, the machine learning controller 540 may determine that the motor speed selected by the machine learning controller 540 is not sufficiently high, and may increase the motor speed directly, use the received feedback to re-train or modify the machine learning controller, or a combination thereof. Accordingly, operation of the power tool 500 may vary between two identical consecutive pulls of the trigger 510 of the power tool 500. In some embodiments, the amount of variance is based on user feedback, a learning rate, or both. Table 4 below, for example, indicates some control of the power tool 500 by the user and how the various types of control are interpreted as feedback regarding the machine learning controller 540 by the machine learning controller 540. This type of feedback may allow the machine learning controller 540 to determine appropriate motor control thresholds and parameters when, for example, the machine learning controller 540 lacks some information regarding the operation of the power tool 500. For example, these feedback mechanisms make it possible for the machine learning controller 540 to alter an operating mode to fasten a self-drilling screw of unknown length.

TABLE 4

| Control Action (by user) | Interpreted Feedback by the Machine Learning Controller |
|---|---|
| Trigger is pulled harder | Machine learning controller interprets as a desired increase in power, speed, torque, ramp, a combination thereof, and the like |
| Power tool is rotated with the fastener (e.g., clockwise) | Machine learning controller interprets as a desired increase in power, speed, torque, ramp, a combination thereof, and the like |
| Trigger is slightly released (pulled less) | Machine learning controller interprets as a desired decrease in power, speed, torque, ramp, a combination thereof, and the like |
| Power tool is rotated against the fastener (e.g., counterclockwise) | Machine learning controller interprets as a desired decrease in power, speed, torque, ramp, a combination thereof, and the like |
| Reach maximum peak torque | Machine learning controller interprets as a necessary adjustment to a mechanical or electronic clutch setting |
| Identify unseated fastener with second pull | Machine learning controller interprets as a necessary adjustment to a mechanical or electronic clutch setting |
| Trigger is released and additional information regarding tool and/or motor motion | Machine learning controller interprets as a necessary adjustment to the kickback detection settings, and the auto-shutoff settings (for saws, for example) |
| Detect Kickback | Machine learning controller interprets as a necessary adjustment to the kickback detection settings |
| Identify stripped fastener by switching to reverse direction | Machine learning controller interprets as a necessary adjustment to a mechanical or electronic clutch setting. |

In some embodiments, the server 110, 210, 310, 410 receives tool usage data from a variety of different power tools in, for example, step 625. Accordingly, when the server electronic processor 425 adjusts the machine learning control 585 based on the user feedback (step 630), the server electronic processor 425 may be adjusting the machine learning control 585 based on feedback from various users. In embodiments in which the machine learning controller 540 is fully implemented on the power tool 500 (e.g., such as discussed above with respect to FIG. 4A-B), the electronic processor 550 may use the feedback indications from only the power tool 405 to adjust the machine learning controller 420 of the same power tool 405. In other words, some power tools 500 may use only the feedback information from particular users to adjust the machine learning control 585. Using the feedback information from particular users may help customize the operation of the power tool 500 for the user of that particular tool.

After the server electronic processor 425 adjusts the machine learning controller 540 based on the user feedback, the power tool 500 operates according to the outputs and determinations from the adjusted machine learning controller 540 (step 635). In some embodiments, such as the power tool system 300 of FIG. 3, the server 310 transmits the adjusted machine learning control 585 to the power tool 500. The power tool 500 then stores the adjusted machine learning control 585 in the memory 580 of the machine learning controller 540 (or in the memory 560 of the power tool 500) and operates the motor 505 according to the adjusted machine learning controller 540. The adjusted machine learning controller 540 improves its performance by using a larger and more varied dataset (e.g., by receiving feedback indications from various users) for the training of the machine learning controller 540.

In some embodiments, the user may also select a learning rate for the machine learning controller 540. Adjusting the learning rate for the machine learning controller 540 impacts the speed of adjustment of the machine learning controller 540 based on the received user feedback. For example, when the learning rate is high, even a small number of feedback indications from the user (or users) will impact the performance of the machine learning controller 540. On the other hand, when the learning rate is lower, more feedback indications from the user are used to create the same change in performance of the machine learning controller 540. Using a learning rate that is too high may cause the machine learning controller 540 to change unnecessarily due to an anomaly operation of the power tool 500. On the other hand, using a learning rate that is too low may cause the machine learning controller 540 to remain unchanged until a large number of feedback indications are received requesting a similar change. In some embodiments, the power tool 500 includes a dedicated actuator to adjust the learning rate of the machine learning controller 540. In another embodiment, the activation switch 545 used to enable or disable the machine learning controller 540 may also be used to adjust the learning rate of the machine learning controller 540. For example, the activation switch 545 may include a rotary dial. When the rotary dial is positioned at a first end, the machine learning controller 540 may be disabled, as the rotary dial moves toward a second end opposite the first end, the machine learning controller 540 is enabled and the learning rate increases. When the rotary dial reaches the second end, the learning rate may be at a maximum learning rate. In other embodiments, an external device 107 (e.g., smartphone, tablet, laptop computer, an ASIC, and the like), may communicatively couple with the power tool 500 and provide a user interface to, for example, select the learning rate. In some embodiments, the selection of a learning rate may include a selection of a low, medium, or high learning rate. In other embodiments, more or less options are available to set the learning rate and may include the ability to turn off learning (i.e., setting the learning rate to zero).

As discussed above, when the machine learning controller 540 implements a recurrent neural network, the learning rate (or sometimes referred to as a "switching rate") affect how previous inputs or training examples affect the output of the current input or training example. For example, when the switching rate is high the previous inputs have minimal effect on the output associated with the current input. That is, when the switching rate is high, each input is treated more as an independent input. On the other hand, when the switching rate is low, previous inputs have a high correlation with the output of the current input. That is, the output of the current input is highly dependent on the outputs determined for previous inputs. In some embodiments, the user may select the switching rate in correlation (e.g., with the same actuator) with the learning rate. In other embodiments, however, a separate actuator (or graphical user interface element) is generated to alter the switching rate independently from the learning rate. The methods or components to set the switching rate are similar to those described above with respect to setting the learning rate.

The description of FIG. 6 focuses on the server electronic processor 425 training, storing, and adjusting the machine learning control 585. In some embodiments, however, the electronic processor 550 of the power tool 500 may perform some or all of the steps described above with respect to FIG. 6. For example, FIG. 4 illustrates an example power tool system 400 in which the power tool 405 stores and adjusts the machine learning controller 540. Accordingly, in this system 400, the electronic processor 550 performs some or all of the steps described above with respect to FIG. 6. Analogously, in some embodiments, the electronic processor 575 of the machine learning controller 540 or the external device 107 performs some or all of the steps described above with respect to FIG. 6.

Figure 7:
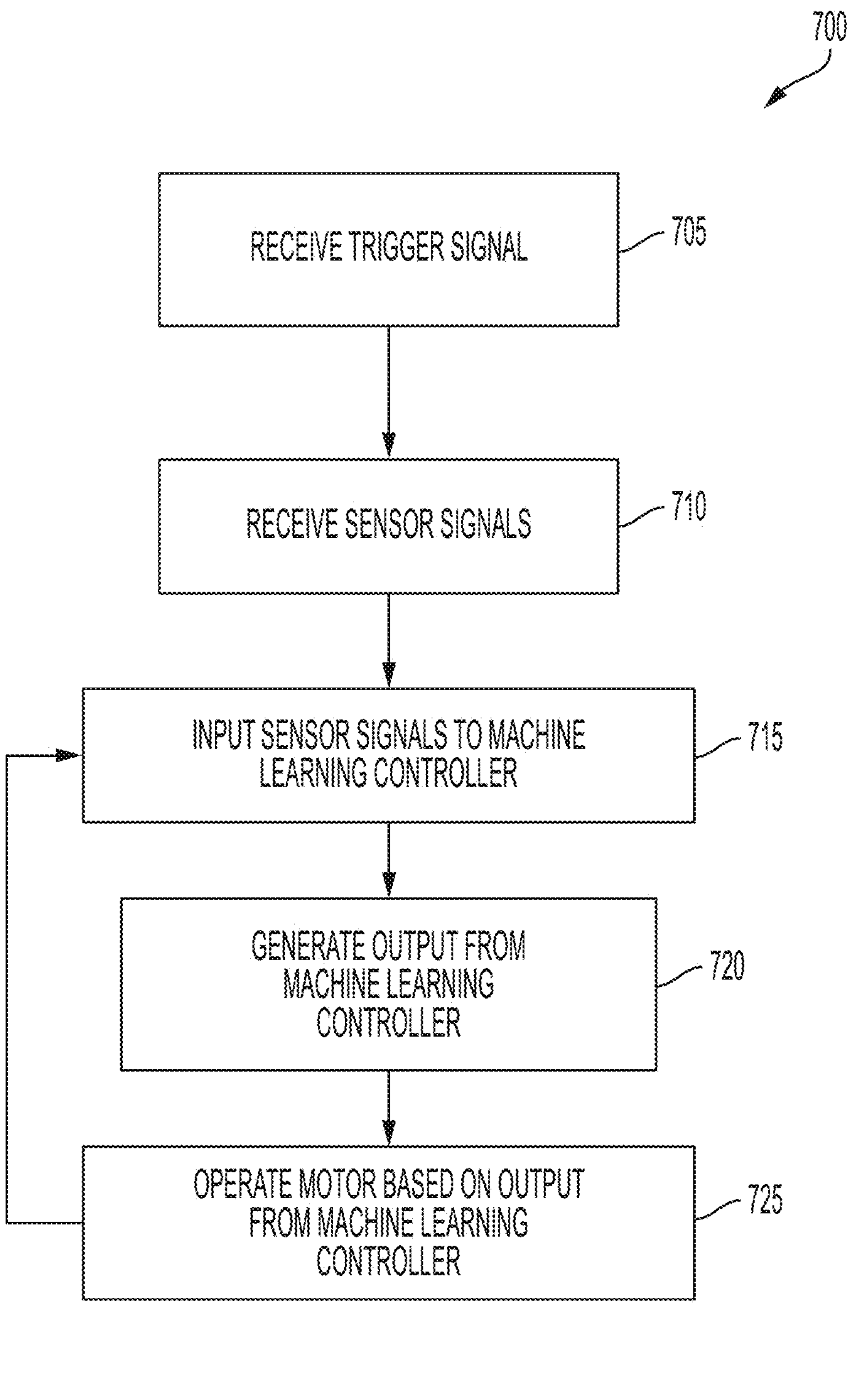
FIG. 7 is a flowchart illustrating a method of operating the power tool of FIG. 5A according to the machine learning controller.

FIG. 7 is a flowchart illustrating a method 700 of operating the power tool 500 according to the machine learning controller 540 as referenced in step 620 of FIG. 6. In step 705, the power tool 500 receives a trigger signal from the trigger 510 indicating that the power tool 500 is to begin an operation. During operation of the power tool 500, the electronic processor 550 receives output sensor data (step 710) from the sensors 530. As discussed above, the output sensor data provide varying information regarding the operation of the power tool 500 (referred to as operational parameters) including, for example, motor position, motor speed, spindle position, spindle speed, output torque, position of the power tool 500, battery pack state of charge, date, time, time, time since last use, mode, clutch setting, direction, battery type, presence of side-handle, errors, history of past applications and switching rate, user input, external inputs, gear and the like, see again Table 3. The electronic processor 550 then provides at least some of the sensor data to the machine learning controller 540 (step 715). In embodiments in which the electronic processor 550 implements the machine learning control 585, the electronic processor 550 bypasses step 715. When the power tool 500 does not store a local copy of the machine learning controller 540, such as in the power tool system 100 of FIG. 1, the electronic processor 550 transmits some or all of the sensor information to the server 110 where the machine learning controller 540 analyzes the received information in real-time, approximately real-time, at a later time, or not at all.

The sensor information transmitted to the machine learning controller 540 varies based on, for example, the particular task for the machine learning controller 540. As discussed above, the task for the machine learning controller may vary based on, for example, the type of power tool 500. For example, in the context of an impact driver, the machine learning controller 540 for the power tool 500 may be configured to identify a type of application of the power tool 500 and may use specific operational thresholds for each type of application. In such embodiments, the electronic processor 550 may transmit, for example, the rotating speed of the motor 505, the rotating speed of the spindle, the operating mode of the power tool, but may not send the battery pack state of charge. The machine learning controller 540 then generates an output based on the received sensor information and the particular task associated with the machine learning block 540 (step 720). For example, the machine learning program executing on the machine learning controller 540 processes (e.g., classifies according to one of the aforementioned machine learning algorithms) the received sensor information and generates an output. In the example above, the output of the machine learning controller 540 may indicate a type of application for which the power tool 500 is being used. The electronic processor 550 then operates the motor 505 based on the output from the machine learning controller 540 (step 725). For example, the electronic processor 550 may use the output from the machine learning controller 540 to determine whether any operational thresholds (e.g., starting speed, maximum speed, finishing speed, rotating direction, number of impacts, and the like) are to be changed to increase the efficacy of the operation of the power tool 500.

The electronic processor 550 then utilizes the updated operational thresholds or ranges to operate the motor 505. In another example, the output may indicate a condition of the tool and the electronic processor 550 controls the motor dependent on the condition. For example, and as described in further detail below, the condition may indicate an output torque value of the motor, an obstacle that is detected, an abnormal accessory condition that is detected, a kickback that is detected, or an operation that is finished (e.g., a fastening operation is completed). In another example, a detected impact is used to predict the ideal blow-to-blow motor profile to optimize impact timing, additional torque delivery, maximum torque delivery, or another characteristic of the impact. The motor, in turn, may be controlled to stop, to increase speed, or decrease speed (e.g. via braking) based on the condition, or may be controlled in other ways based on the condition. Although the particular task of the machine learning controller 540 may change as described in more detail below, the electronic processor 550 uses the output of the machine learning controller 540 to, for example, better operate the power tool 500 and achieve a greater operating efficiency.

In some embodiments, the machine learning controller 540 receives user characteristics of the current user of the power tool 500 in step 715, in addition to or instead of sensor data, and then generates an output in step 720 based on the user characteristics or based on the user characteristics and the sensor data received in step 715. In some embodiments, in addition to or instead of controlling the motor in step 725, another electronically controllable element is controlled. For example, in some embodiments, one or more of an LED of the power tool is enabled, disabled, has its color changed, or has its brightness changed; a gear ratio of the power tool is changed (e.g., the gear ratio is increased or decreased, or a gear ratio from a plurality of gear ratios is selected), a solenoid of the power tool is enabled or disabled, or an electronic filtering rate is adjusted for a faulting or noisy sensor. In some embodiments, an electrically controlled clutch is engaged/disengaged or adjusted to avoid overshoot on bolts and stripping on fasteners. In other embodiments, motor driving characteristics are changed such as which winding are used and/or the use of field weakening/phase advance techniques.

In some embodiments, the server 110, 210, 310, 410 may store a selection of various machine learning controls 585 in which each machine learning control 585 is specifically trained to perform a different task. In such embodiments, the user may select which of the machine learning controls 585 to implement with the power tool 500. For example, an external device 107 (see FIG. 15) may provide a graphical interface that allows the user to select a type of machine learning control 585. A user may select the machine learning control 585 based on, for example, applications for which the user utilizes the power tool 500 often (e.g., if the user often installs drywall), or commonly used power tools (e.g., a user often uses an impact driver). In such embodiments, the graphical user interface receives a selection of a type of machine learning control 585. The external device 107 may then send the user's selection to the server 110, 210, 310, 410. The server 110, 210, 310, 410 would then transmit a corresponding machine learning control 585 to the power tool 500 or may transmit updated operational thresholds based on the outputs from the machine learning control 585 selected by the user. Accordingly, the user can select which functions to be implemented with the machine learning control 585 and can change which type of machine learning control 585 is implemented by the server 110, 210, 310, 410 or the power tool 500 during the operation of the power tool 500.

Figure 8A:
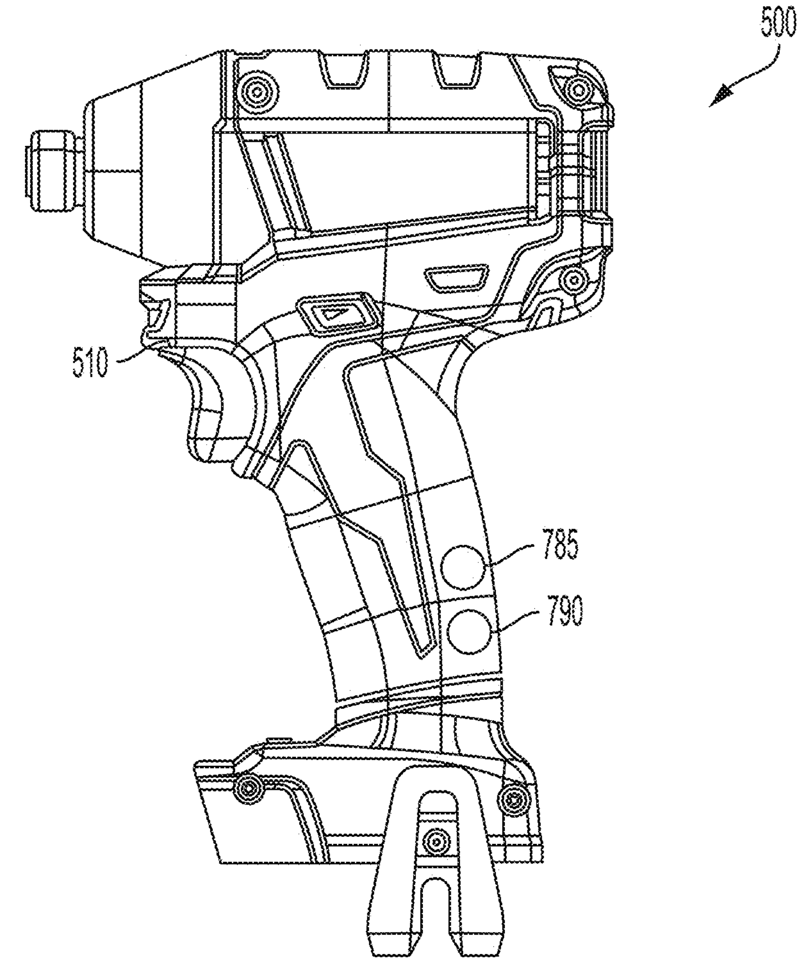
FIG. 8*a* illustrates a power tool including feedback actuators.

FIG. 8*a* illustrates yet another embodiment of providing actuators to receive user feedback regarding the operation of the power tool 500 and regarding the operation of the machine learning controller 540, in particular. In the illustrated embodiment, the power tool 500 includes a first actuator 785 and a second actuator 790. In some embodiments, each actuator 785, 790 may be associated with a different type of feedback. For example, the activation of the first actuator 785 may indicate that the operation of the machine learning controller 540 is adequate (e.g., positive feedback), while the activation of the second actuator 790 may indicate that the operation of the machine learning controller 540 is inadequate (e.g., negative feedback). For example, a user may indicate that changes made to the finishing speed are undesirable when the electronic processor 550 implemented a different finishing speed due to a determination by the machine learning controller 540 that the power tool 500 is being utilized for a particular application. In other embodiments, the first actuator 785 and the second actuator 790 (or an additional pair of buttons) are associated with increasing and decreasing the learning rate of the machine learning controller 540, respectively. For example, when the user wants to increase the learning rate of the machine learning controller 540, the user may activate the first actuator 785. FIG. 8*a* illustrates the first and second actuators 785, 790 on the handle of the power tool 500. In other embodiments, however, the first and second actuators may be positioned on the foot of the power tool 500, below the handle, or on the motor housing portion above the handle.

Figure 8B:
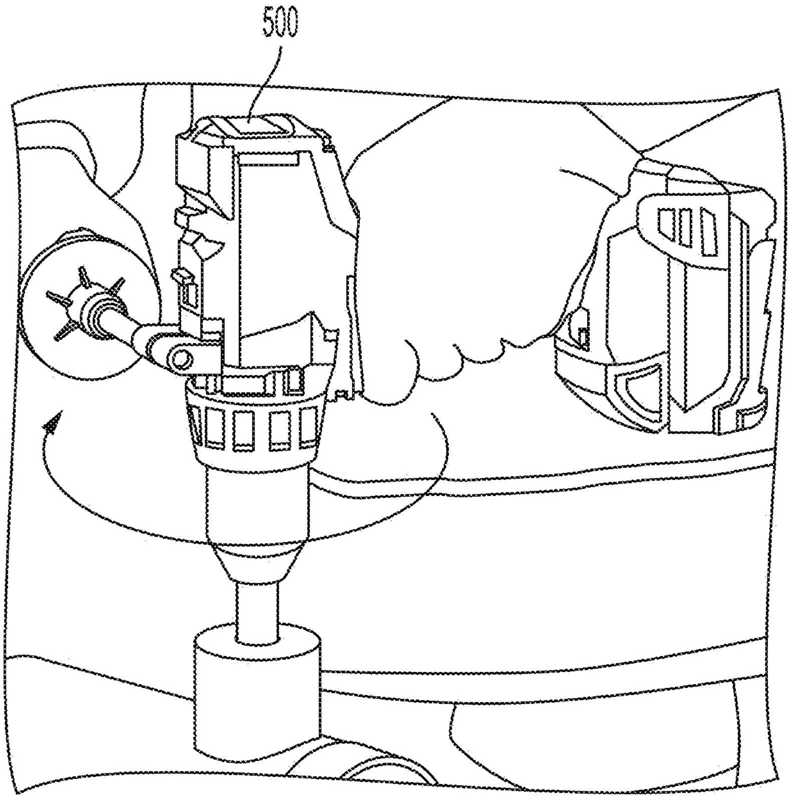
FIG. 8*b* is an illustration of a rotation of the power tool to provide feedback information.

In another embodiment, the user may provide feedback to the electronic processor 550 by moving the power tool 500 itself. For example, the power tool 500 may include an accelerometer, gyroscope, and/or a magnetometer (e.g., as a sensor 530) that provides an output signal to the electronic processor 550 indicative of a position, orientation, or combination thereof of the power tool 500. In such embodiments, clockwise or counterclockwise rotation of the power tool as illustrated in FIG. 8*b* may provide feedback information to the electronic processor 550. For example, rotating the power tool clockwise may correspond to a request for the electronic processor 550 to increase the speed of the motor 505, while rotating the power tool 500 counterclockwise may correspond to a request for the electronic processor 550 to decrease the speed of the motor 505. In some embodiments, the electronic processor 550 may detect a shaking motion of the power tool 500 using similar sensors. Shaking the power tool 500 may indicate that the power tool 500 is not operating as expected by the user to provide negative feedback. For example, the user may shake the power tool 500 when the machine learning controller 485 determines the incorrect application for the current task of the power tool 500. As discussed above, providing such feedback allows the machine learning controller 540 to update its parameters to improve its performance.

Figure 9:
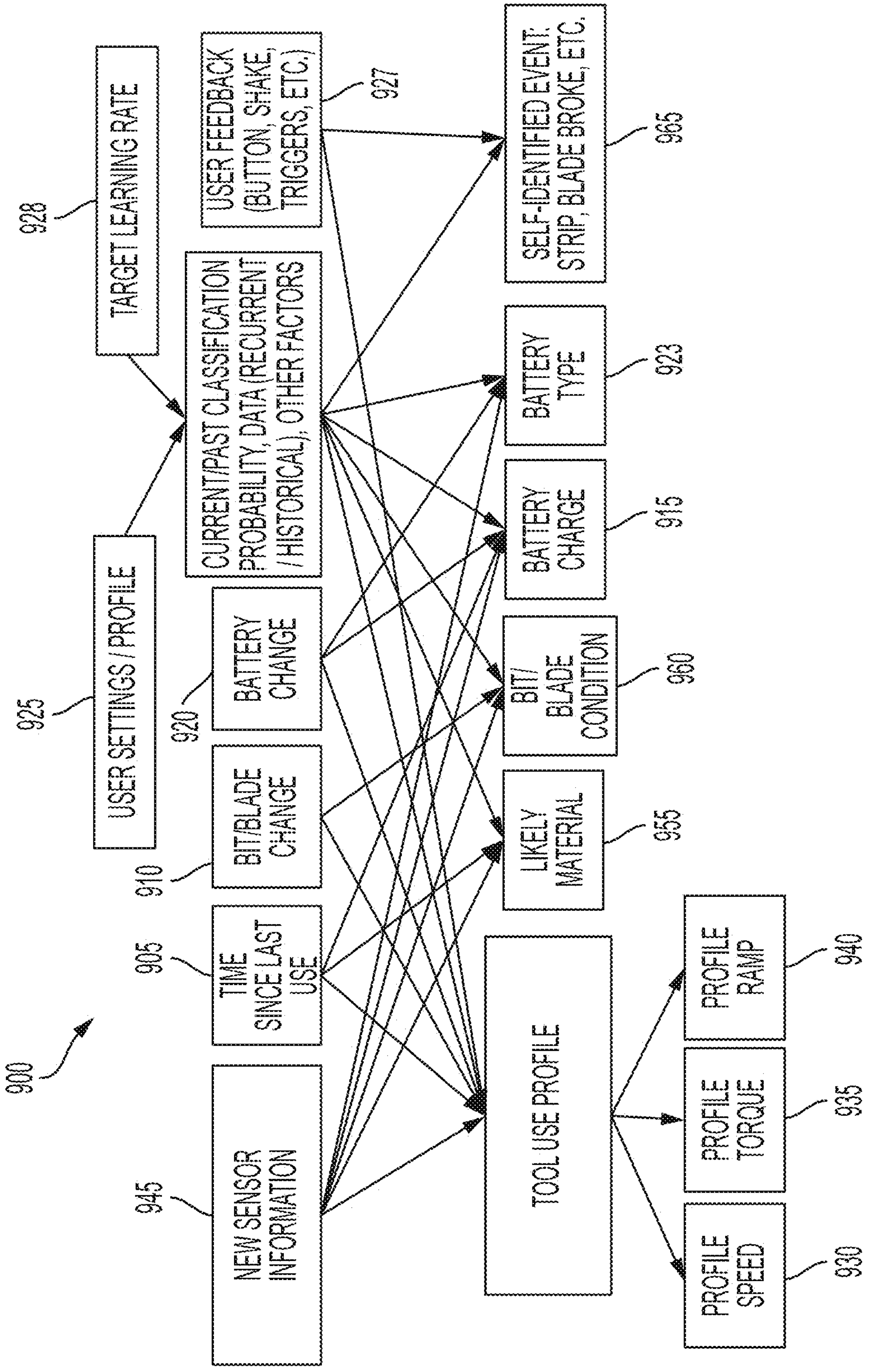
FIG. 9 is a schematic diagram of various types of information that may be utilized by the machine learning controller.

As discussed above, the machine learning controller 540 is associated with one or more particular tasks. The machine learning controller 540 receives various types of information from the power tool 500 and the electronic processor 550 based on the particular task for which the machine learning controller 540 is configured. For example, FIG. 9 illustrates a schematic diagram 900 of the various types of information that may be utilized by the machine learning controller 540 to generate outputs, make determinations and predictions, and the like. In the illustrated diagram, the machine learning controller 540 may receive, for example, an indication of the operation time of the power tool 500 (e.g., how long the power tool 500 is used in each session, the amount of time between sessions of power tool usage, and the like) 905, information regarding changes in bits, blades, or other accessory devices 910 for the power tool 500, the state of charge of the battery pack 915, the amount of time the battery pack has been in use, whether the battery pack was recently changed 920, and the like. The machine learning controller 540 may also receive information regarding the battery pack type 923 used with the power tool 500 (e.g., an 18V battery pack).

As discussed above, the mode pad 527 selects an operating mode for the power tool. The operating mode may specify operation parameters and thresholds for the power tool 500 during operation in that mode. For example, each operation mode may define a maximum torque, minimum torque, average torque, starting speed, finishing speed, non-impacting speed, impacting speed, a speed ramp (e.g., how fast the motor 505 reaches the target speed), a target number of impacts, a rotation direction, a speed for each rotation direction, and a combination thereof. The combination of two or more operation parameters or thresholds define a tool use profile or mode. When the mode is selected by the user, the electronic processor 550 controls the motor 505 according to the operation parameters or thresholds specified by the selected mode, which may be stored in the memory 560. The machine learning controller 540 also receives information regarding the operating mode 925 of the power tool 500 such as, for example, the speed(s) associated with the mode, the mode torque, the mode ramp, and the like. The machine learning controller also receives sensor information 945 indicative of an operational parameter of the power tool 500 such as, for example, motor current, motor voltage, trigger activations or feedback from the trigger, motion of the power tool, motor speed, output shaft speed, and the like.

As discussed above, the machine learning controller 540 may also receive feedback from the user 927 as well as an indication of a target learning rate 928. The machine learning controller 540 using various types and combinations of the information described above to generate various outputs based on the particular task associated with the machine learning controller 540. For example, in some embodiments, the machine learning controller 540 generates suggested parameters for a particular mode. The machine learning controller 540 may generate a suggested starting or finishing speed 930, a suggested mode torque(s) 935, and a suggested mode ramp 940. FIG. 15 illustrates an example graphical user interface 1080 illustrating a suggested torque level and a suggested trigger ramp for a particular operating mode. Additionally, the machine learning controller 540 may determine a likely workpiece material (e.g., whether a power tool 500 is used on wood or drywall) 955. In some embodiments, the machine learning controller 540 may determine the condition of the bit or blade 960 attached to the power tool 500. In some embodiments, the machine learning controller 540 can also identify particular events such as a stripped fastener, a broken blade, kickback, and the like. The power tool 500 may then generate an indication to the user that such an event or condition has been detected such that corrective action may be taken. In some embodiments, for example, when the machine learning controller 540 implements a recurrent neural network, the identification of a particular event is input (e.g., sent) to the machine learning controller 540 to help identify other events and/or other aspects of the operation of the power tool 500. For example, when the machine learning controller 540 determines that a first fastener has been stripped, the machine learning controller 540 may then alter the finishing speed when securing the next fastener to inhibit stripping the second fastener.

As discussed above, the architecture for the machine learning controller 540 may vary based on, for example, the particular task associated with the machine learning controller 540. In some embodiments, the machine learning controller 540 may include a neural network, a support vector machine, decision trees, logistic regression, and other machine learning architectures. The machine learning controller 540 may further utilize kernel methods or ensemble methods to extend the base structure of the machine learning controller 540. In some embodiments, the machine learning controller 540 implements reinforcement learning to update the machine learning controller 540 based on received feedback indications from the user.

Figure 10:
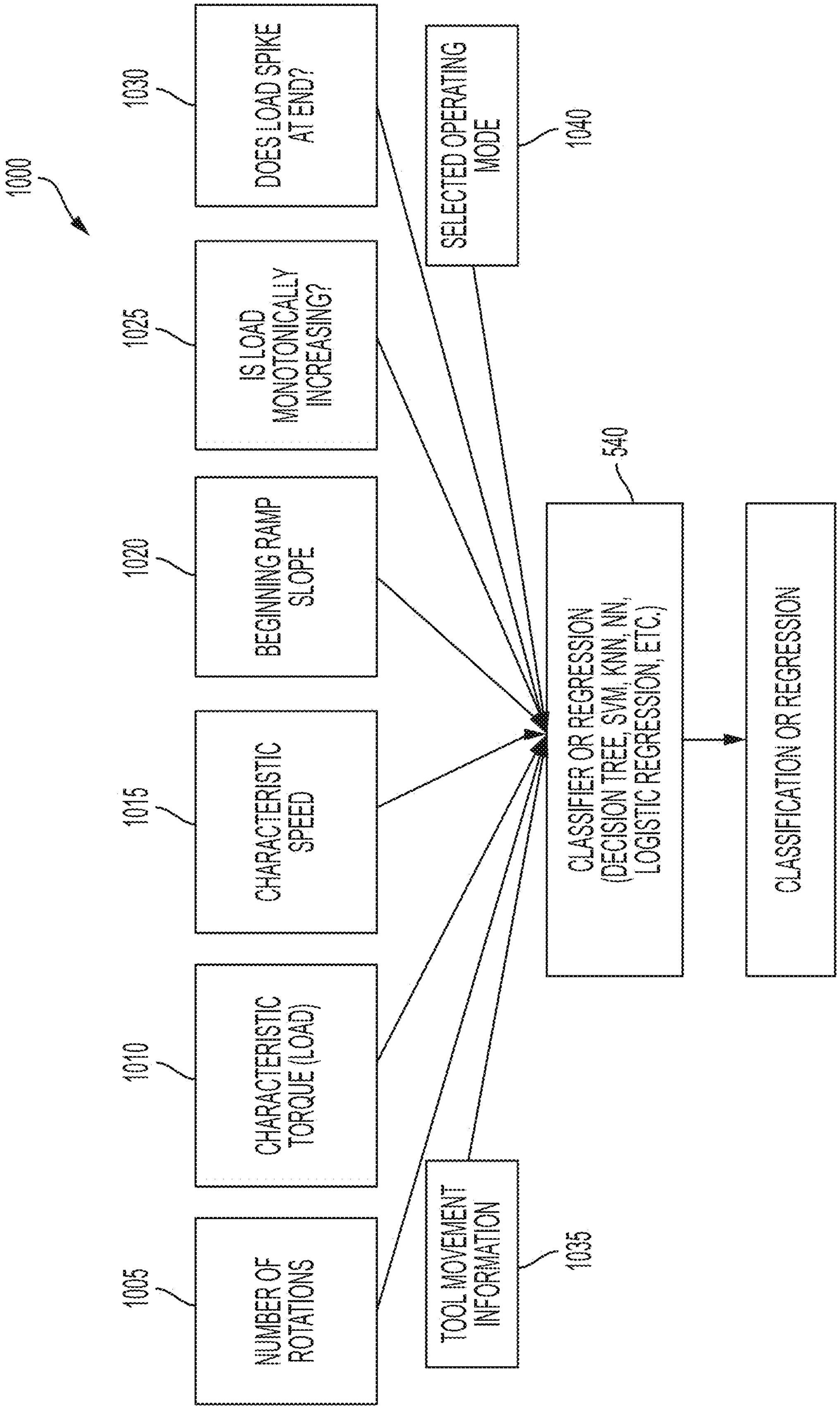
FIG. 10 illustrates a schematic diagram of a machine learning controller configured to identify a type of fastener used.

FIG. 10 illustrates a diagram 1000 for an example use of the machine learning controller 540. In the illustrated embodiment, the machine learning controller 540 is configured to identify a type of fastener being worked on by the power tool 500. In such an embodiment, the machine learning controller 540 receives, for example, a number of rotations 1005, a load torque 1010, a motor speed 1015, a torque or speed ramp slope 1020, information regarding whether the load increases monotonically 1025, information regarding whether the load increases rapidly toward the end of the operation 1030, information regarding the tool movement 1035 (e.g., rotation of the power tool 500, output signals from an accelerometer), and a selected operating mode 1040 for the power tool 500. In one embodiment, the information (operational parameters) described above is generated by the electronic processor 550 based on sensor data from the sensors 530, arithmetic operations using the sensor data (e.g., to calculate slope), and comparisons of the sensor data or calculated values with threshold (e.g., defining whether an increase is rapid). The generated information is then received by the machine learning controller 540 after each operation by the power tool 500 is completed (e.g., after each fastener is fully installed or removed). Based on the received information, the machine learning controller 540 determines the type of fastener used in the operation of the power tool 500. In the illustrated embodiment, the machine learning controller 540 may utilize, for example, a neural network with multiple outputs such that each output corresponds to a different type of fastener. In some embodiments, the machine learning controller 540 may also generate an output indicating that the fastener was unable to be identified.

In one example, the machine learning controller 540 may identify a fastener type of a fastener from various potential fastener types. For example, the machine learning controller 540 differentiates between a self-drilling screw, a sheet metal screw, a drywall screw, among others. Accordingly, in the illustrated embodiment, the training examples for the machine learning controller 540 include an input vector indicating the number of rotations 1005, the load torque 1010, the motor speed 1015, the torque or speed ramp slope 1020, an indication of whether the load increases monotonically 1025, an indication indicating whether the load increases rapidly toward the end of the operation 1030, an indication regarding the tool movement 1035, the selected mode of operation 1040, and an output label indicating the type of fastener. In the illustrated embodiment, the machine learning controller 540 implements an artificial neural network to perform this classification. The artificial neural network includes, for example, six input nodes, and, for example, one hundred output nodes. Each output node, for example, corresponds to a different type of fastener identifiable by the machine learning controller 540, and an additional output to indicate to the power tool 500 when the fastener does not correspond to any of the identifiable type of fasteners. The artificial neural network may include more or less output nodes based on the number of fasteners able to be differentiated. In some embodiments, the neural network includes an additional layer including a single node. This additional layer may determine which output node has the highest values (which may correspond to the probability that the type of fastener is identified as the type of fastener corresponding to that output node), and outputs a value (e.g., one, two, three, or four) associated with the output node. The value of the output node may correspond to a type of fastener identified by the machine learning controller 540.

During training of the machine learning controller 540 to identify the type of fastener, the machine learning controller 540 adjusts the weights associated with each node connection of the neural network to achieve a set of weights that reliably classify the different types of fasteners. As discussed above with respect to FIG. 1, each node of a neural network may have a different activation network, so adjusting the weights of the neural network may also be affected by the activation functions associated with each layer or each node. Once the neural network is trained, the machine learning controller 540 receives the input variables (e.g., the values associated with each input variable), and applies the weights and connections through each layer of the neural network. The output or outputs from the trained neural network correspond to a particular type of fastener identifiable by the machine learning controller 540.

Figure 11:
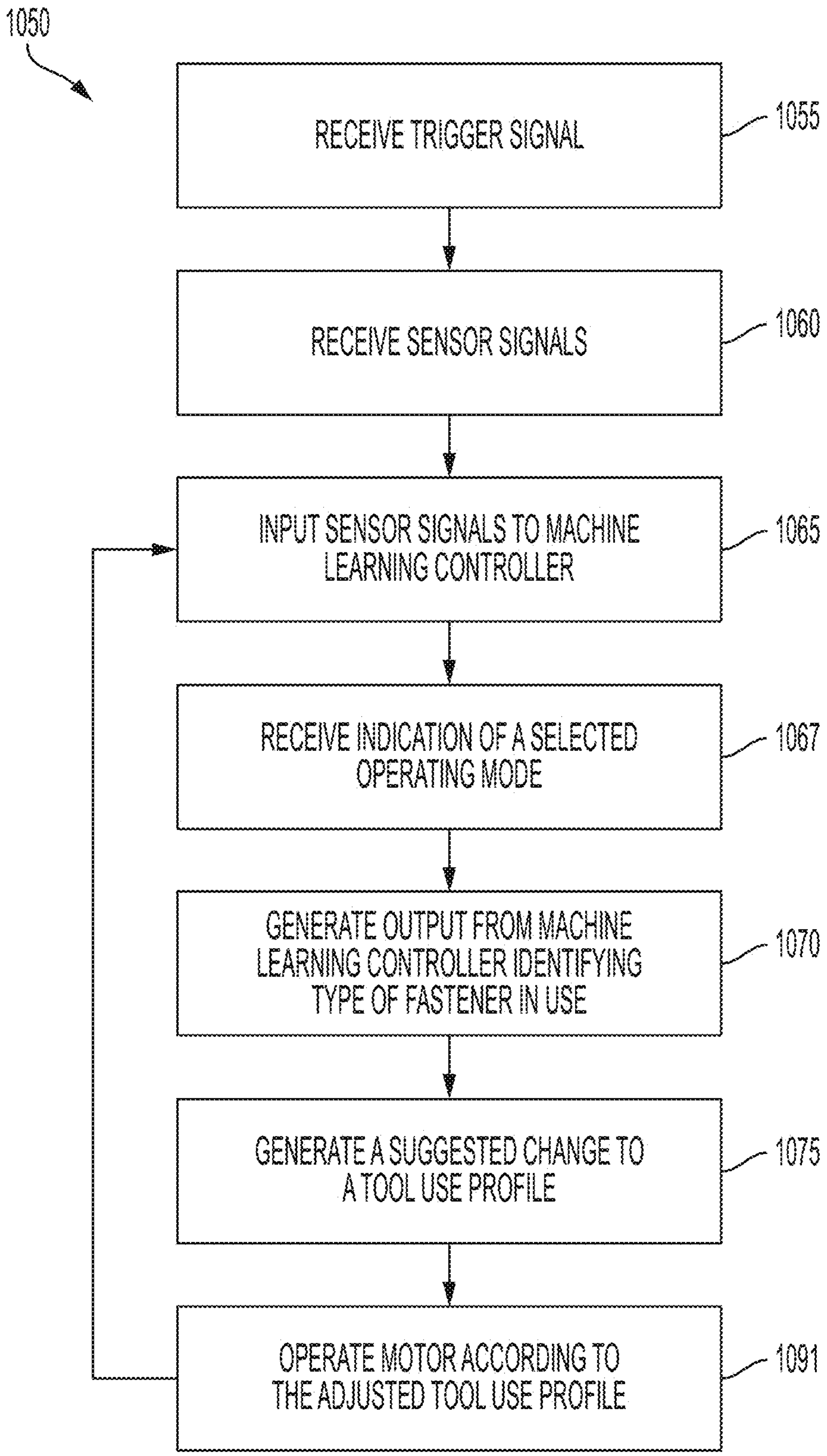
FIG. 11 is a flowchart illustrating a method of identifying type of fastener using the machine learning controller.

FIG. 11 is a flowchart illustrating a method 1050 of identifying a type of fastener using the machine learning controller 540. At step 1055, the electronic processor 550 receives a signal from the trigger 510 indicating that the user is operating the power tool 500. The electronic processor 550 begins to operate the power tool 500 and receiving sensor data from the sensors 530 (step 1060). As discussed above, sensor data is indicative of one or more operational parameters of the power tool and may include, for example, motor speed and/or position information, torque information, impact information, tool movement information, information regarding the selected mode, and the like. The electronic processor 550 then sends at least a subset of the sensor data to the machine learning controller 540 (step 1065). As discussed above with respect to FIG. 13, the machine learning controller 540 of the illustrated embodiment receives the motor speed, the torque and torque ramp, and the number of rotations performed. Some of the signals received by the machine learning controller 540 may be calculated by the electronic processor 550 rather than directly received from the sensors 530. For example, the electronic processor 550 may determine whether the load on the power tool 500 increases monotonically or if the load increases rapidly (e.g., spikes) toward the completion of the operation. The electronic processor 550 also sends these intermediary inputs (e.g., calculated or determined by the electronic processor 550 based on signals from the sensors 530) to the machine learning controller 540 as sensor data in step 1065. In step 1067, the machine learning controller 540 also receives an indication of a selected operating mode for the power tool 500.

The machine learning controller 540 then generates an output identifying the type of fastener in use by the power tool 500 (step 1070). As discussed above with respect to FIG. 13, the machine learning controller 540 generates the output identifying the type of fastener by using an artificial neural network. In other embodiments, the machine learning controller 540 may implement a different architecture to identify the type of fastener used by the power tool 500. In particular, the machine learning controller 540 receives the values for the input variables and uses these values to progress across the layers of the neural networks using the node connection weights and the activation functions for each node. As described above, the output layer may include one or more output nodes indicating the type of fastener used by the power tool 500 or indicating that the type of fastener was not identifiable by the machine learning controller 540.

In step 1075, a suggested change to an operating mode of the power tool is generated based on the identified type of fastener. The suggested change generated is then stored in a tool profile of the memory 560 by the electronic processor 550 as an operation parameter or threshold. The suggested change is generated by an electronic processor that receives the identified type of fastener from the machine learning controller 540, such as the electronic processor implementing the machine learning controller 540 or another electronic processor that is not implementing the machine learning controller 540, which, depending on the embodiment may be the electronic processor 550, an electronic processor of the external device 107, or the server electronic processor 425. The suggested change may be generated using the identified type of fastener as an input to a lookup table (stored in memory associated with the particular electronic processor) that maps fastener types to suggested operation parameters of the power tool 500.

The machine learning controller 540 has various applications and can provide the power tool 500 with an ability to analyze various types of sensor data and received feedback. Generally, the machine learning controller 540 may provide various levels of information and usability to the user of the power tool 500. For example, in some embodiments, the machine learning controller 540 analyzes usage data from the power tool 500 and provides analytics that help the user make more educated decisions. Table 5 below lists a plurality of different implementations or applications of the machine learning controller 540. For each application, Table 5 lists potential inputs to the machine learning controller 540 that would provide sufficient insight for the machine learning controller 540 to provide the listed potential output(s).

The inputs are provided by various sources, such as the sensors 530, as described above.

TABLE 5

| Machine Learning Application | Potential Inputs to Machine Learning Controller | Potential Output(s) from Machine Learning Controller |
|---|---|---|
| Anti-kickback control | Motion sensor(s) and/or running data (i.e., motor current, voltage, speed, trigger, gearing, etc.). Optionally mode knowledge, sensitivity settings, detection of side handle, recent kickback, state of tethering, orientation, battery added rotational inertia | Kickback event indication (used as control signal to electronic processor 550 to stop or brake motor), identification of user beginning to let up on trigger and responding faster |
| Fastener seated | Motion sensor(s) and/or running data. Optionally mode knowledge, past use | Fastener seated or near seated indication (used to stop, or brake, or slow motor, begin state such as pulsing, increase kickback sensitivity temporarily, etc.) |
| Screw strip | Running data and/or motion (movement and/or position). Optionally settings (such as clutch settings), past screw stripping detection/accessory wear, mode knowledge | Screw stripping indication (used as control signal to electronic processor 550, which responds by, e.g., clutching out, backing motor off, updating settings, and/or pulsing motor) |
| Tool application identification (drills, impacts, saws, and others). Similarly: identification of material type, characteristic (e.g., thickness), or condition identification of accessory type or condition identification of power tool event (e.g., stripping, losing engagement with a fastener, binding, breakthrough) identification of power tool context (e.g., likely on a ladder based on tool acceleration) identification of rating of power tool performance | Running data (motor current, voltage, speed, trigger, gearing etc.), recent tool use (accessory change detections), timing, tool settings. Optionally past tool use, knowledge of likely applications (such as trade, common materials, etc.), sound (for material identifications), vibration patterns, nearby tools and/or their recent use, learning rate input or on/off switch, battery presence and properties, user gear selection, direction input, clutch settings, presence of tool attachments (like side handle), nearby tool use, location data | The output is one or more of tweaking of settings, switching modes or profiles (for example, as combinations of profiles), alerting a user to a condition, auto-gear selection, change or activation of output (e.g., reduce saw output if hit nail, turn on orbital motion if softer material, turn off after break through, etc.), use/accessory analytics (including suggestion/auto purchase of accessories, selling of such data to commercial partners, providing analytics of work accomplished); tool bit, blade, or socket identification and condition; workpiece fracturing; detection of hardness, density, and location of contacted objects; detection of uncentered applications, slippage, improper die and crimp combinations; condition and identification of sanding material; suspended or level sanding position; tire burst or leak condition; detection of vacuum clogs, suction surface, and orientation; detection of pumping fluid characteristics; and identification of application, material type, material characteristic material condition, accessory type, accessory condition, power tool event, power tool context, and/or rating of power tool performance |
| Light duration/state | Running data, motion data (e.g., when placed on ground/hung on tool belt), nearby tools (e.g., lights), retriggers when light is going out | Optimize tool light duration during or after use; possible recognizing and responding to being picked up |

TABLE 5-continued

| Machine Learning Application | Potential Inputs to Machine Learning Controller | Potential Output(s) from Machine Learning Controller |
|---|---|---|
| Estimate of user condition (e.g., skill, aggressiveness, risk, fatigue) | Running data, detection of kickback, screw stripping, aggressiveness, timing (such as pacing, breaks, or hurriedness) | Safety risk level on jobsite or by user, usable in prevention or motivating insurance rates, or alert to user of detected condition as warning (e.g., fatigue warning) |
| Ideal charging rates | Past tool/battery use, time of day, stage of construction, battery charge states, presence of batteries | A charger may reduce speed of charging if the charger does not think a rapid charge will be necessary for a user (may extend overall battery life) |
| Ideal output (e.g., for a string trimmer) Note: similar for sanders/grinders/many saws, hammering devices, energy needed for nailers, grease gun/soldering iron/ glue gun output | Running and motion data, timing | Detection of contact (resistance) helps to determine height of user as well as typical angle/ motion for expecting contact. Running model of string length can help to optimize speed for consistent performance |
| Identification of user | Running data, motion, and/or location data, data from other tools, timing | Useful for tool security features and more quickly setting preferences - especially in a shared tools environment |
| Tool health and maintenance | Running data, motion, location, weather data, higher level identification such as applications, drops, temperature sensors | Identification or prediction of wear, damage, etc., use profile in coordination with customized warrantee rates |
| Precision Impact | Running data, motion, application knowledge (including input of fastener types), timing of use, settings, feedback from digital torque wrench, desired torque or application input | Identification of star pattern for lug nuts, estimate for auto-stop to improve consistency, warning to user for over/under/unknown output, determination of optimal motor profile impact-to-impact to improve impact timing. |
| Characteristic positive or negative feedback | Tool motion, restarts, or changes in input, trigger depression, tool shaking, feedback buttons | This can feed many other machine learning control blocks and logic flows as well as provide useful analytics on user satisfaction |

In one embodiment, the machine learning controller 540 may be used to analyze operational data for a tool 500 to identify a user currently using the tool. As users may operate the same tool 500 in different manners or for different tasks, the machine learning controller 540 may change the operation of the power tool 500 or a training of the machine learning controller 540 based on characteristics of an identified user, such as the user's trade, present geographic area, age, gender, strength, physical dimensions, or any other characteristics as desired. Accordingly, a plurality of machine learning controllers 540 in respective power tools 500 may provide a similar experience between power tools 500 for respective users. With respect to FIG. 7, for example, sensor signals are input to the machine learning controller 540 (step 715). The machine learning controller may then output (step 720) an identity of the user currently using the tool based on the sensor signals, and tool is then operated based on output (i.e., the identity of the user) (step 725). For example, a power tool may be operated with a reduced maximum motor current or a more sensitive anti-kickback feature with reduced triggering thresholds based on the identity of the user currently using the tool, which may indicate a user preference or user characteristic. The particular identity of the user may be associated with one or more user preferences or characteristics in a lookup table stored locally on the power tool 500 or remotely on an external system device. In some embodiments, the identity of the user is fed back into a further machine learning program of the machine learning controller 540 that is used to generate a further output on which operation of the motor is based.

In one embodiment, the machine learning controller 540 may be used to analyze movement data for tools 500 performing applications during development of the tools 500 and then the resulting pattern recognition information may be included on machine learning controllers 540 that are sold such that tools are pre-trained.

In another embodiment, direct user feedback (button, manual phone input, shaking/hitting tool, override of application mode.) can also be useful input to the machine learning controller 540. A user might provide a "how much to obey the machine learning controller 540 recommendation vs. the trigger" setting such that there is override capability. This could be via an app, a tool input (ex: slider, dial, button) or via trigger switch 555 (multi-stage, function of input, nonlinear trigger, etc.).

Additionally, the machine learning controller's 540 programming may be periodically adjusted by updates, e.g., over the air updates, etc. User input with "most common applications" and other defining characteristics or preferences ("I like to preserve blades over cut fast," "I strongly prefer vibration minimization" etc.) all may feed into the machine learning controller 540. In some embodiments, a user preference or characteristic persists between or across power tools. For example, a user preference for minimized vibration may be used to train a machine learning controller 540 or operate a power tool of a similar type previously used by the user. Alternatively, or in addition, such a user preference or user characteristic may be used to train a machine learning controller 540 or operate a power tool of a dissimilar type previously used by the user. For example, a user with a preference for minimized vibration in an impact driver may be provided a reciprocating saw with a machine learning program pre-trained for minimized vibration.

Accordingly, as discussed above, the machine learning controller 540 can provide the power tool 500 with an ability to analyze various types of sensor data and provide feedback to the user by one or more of implementing or suggesting changes to an operational mode of the power tool 500, changing the operation of the power tool 500, or providing analytics regarding the use of specific power tools or power tool devices (e.g., power boxes).

As described above, power tools, such as power tool 105 may be used for various purposes. In one specific application, power tools such as impact drivers, screwdrivers, hydraulic pulse tools, and impact tools can be used by a power tool user to assist in seating fasteners and bolts. Fasteners may include screws, such as deck screws, drywall/plaster screws, construction screws, sheet metal screws, concrete anchors, machine screws, lag bolts, wall anchors, and/or other specialty screws (e.g., EMT set screws, plastic screws, screws for assembly line products, automotive screws, screws for electronic equipment, and the like). Bolts may include lug nuts, structural and non-structural bolts, tension control bolts, and the like. Bolts may be rated for specific tensions and/or torques, and/or rotations. In some embodiments, a power tool may act on the bolt or a corresponding nut. Unless otherwise noted, the terms fastener, screw, anchor, bolt, and nuts may be used interchangeably.

Traditionally, techniques for improving fastener and bolt seating have included using torque-based mechanical or electrical clutches, such as those on drills and powered screwdrivers; contact sensors and clutches, such as those on screw drivers; and different tool modes used in other tools. Tool modes may limit parameters such as output speeds, motor currents, or application durations, and often use profiles and/or basic state machines to perform the desired operations. These tool modes are present on some drills, pulse tools, and impact tools. The tool modes may be used with a wide variety of sensory inputs, such as currents, voltages, temperatures, trigger inputs, motion, forces, contact, and position detection (e.g., inductive sensors in impact drivers). The programming of such tool modes has generally been implemented as a series of consecutive tool states (e.g., basic state machines), wherein the power tool may be required to move from a ramp-up state, to a sustain-an-output state, to a state in which a fixed number of impacts are counted, to a ceasing state. Alternative states can occur in response to signals such as in the case of detecting kickback in the case of certain tools, such as drills.

The above programming of general tool modes is usually fixed, meaning that memory has not been employed that might use signals or results from previous uses and apply them to future runs for adaptive characteristic output responses. The programming of traditional tool modes is usually narrow in focus (such as seating a specific fastener), simplistic in control (such as setting a target speed) or, if broader in application (such as a general 'Tek-screw mode' or general 'torque level'), are often inconsistent in performance. Table 6, below, illustrates a comparison of features, aspects, and themes of traditional fastening and bolting tools to machine learning fastening and bolting power tools, such as those described herein.

TABLE 6

| Traditional Fastening and Bolting Tool | Fastening and Bolting Power Tool with ML |
|---|---|
| Tool has one specific 'mode' at a time, often corresponding to a specific fastener/bolt, a type of application, or a profile. | Tool may identify particular fastener/bolting applications and/or between fastener/bolting and non-fastener/bolting applications.<br>The identity of the application may be represented as being discrete, continuous, encoded, feature driven, probabilistic, or some combination thereof<br>Tool may use such identification to:<br>Change its target output, output logic, or parameters during a run<br>Change its output logic or parameters between runs<br>Suggest a different mode<br>Suggest modifying a mode characteristic<br>Update likelihoods of use cases<br>Report such identification of its use case<br>Alternatively, the tool may be so robust at detecting proper seating, it may not directly or externally identify a fastener/bolt, but be applicable to a wide range of applications |
| A state machine is used to define and program tool behavior | The tool may represent its state in a probabilistic or encoded state.<br>The probabilistic or encoded state can account for uncertainty, user feedback, user |

TABLE 6-continued

| Traditional Fastening and Bolting Tool | Fastening and Bolting Power Tool with ML |
|---|---|
| | idiosyncrasies, prior knowledge (say from user trade knowledge), and a richer description of likely state. |
| A tool operates agnostic to its user | The tool may recognize its user and personalize itself to best suit a particular user or group of users. |
| The tool logic is fixed during use, repeatable, and is modified only due to outside input, communications, or sensing. | The tool logic may exhibit some degree of output randomness and/or change, even with the same repeated inputs. |
| Each tool mode has specific settings, profiles, a particular state machine, output characteristics such as max speed/impact counts, or thresholds. | A tool mode may be represented as a high dimensional algorithm that is substantially nonlinear.<br>A tool mode may additionally possess specific settings, output characteristics, or thresholds, which each may be used as hard or soft constraints/targets. |
| The tool does not adapt its performance based on past tool usage | Tool may keep a memory, whether encoded, summary, or raw time-series to adapt its performance.<br>Such use memory may be shared, combined, compared, filtered, or aggregated with other data sources. Data sources can include user data (tool specific, user specific, or within a local geography, trade, organization, or globally etc.), exemplary data (say generated by an expert user), or automated data (generated by automated test fixture).<br>The tool may use such memory to change the probability and/or switching rates for likely applications, changing target profiles, or changing tool logic.<br>The tool may update its logic or stored parameters during applications, in-between applications, at specific times (ex: at night), in response to request for updates, in response to connections and/or processing with other devices or broadly the cloud. |
| A tool may have one to six discrete modes on a tool, potentially interchangeable or updatable by a wireless communication | A tool may have tens, hundreds, or thousands of discrete modes on a tool.<br>A tool may have continuous, probabilistic, or encoded range of modes.<br>A tool may have a mode that encompasses a wide range of applications. |
| A tool may activate a ceasing behavior in response to a mechanical or electronic clutch or a predefined count or change in inputs (such as blow counting) | A tool may activate a ceasing behavior in response a predictive output of a machine learning model.<br>A tool may activate a slowdown behavior or a controlled output in response to a predictive output of a machine learning model suggesting a nearness to a desired seating or bolting condition. |
| A tool operating in an operating state has a substantially fixed or set output characteristic, typically taking in as input a narrow set of sensory inputs. | A tool may have an operating state whether by the output as a high dimensional function including a narrow or wide set of sensory inputs.<br>The high dimensional function may take in both time-series data, operating parameters, and historical information.<br>The high dimensional function may still be bound - whether with hard, soft limits, overrides - by other constraints. |
| Operating state transitions largely defined by meeting at least one fixed threshold | Operating state may<br>Gradually transition in response to a series of time-based inputs.<br>Transition in response to a machine learned classifier/regressor/algorithm<br>Transition in part due to randomization<br>Be a combinatory function of multiple states due to their corresponding probabilities. |
| Traditional tools may provide basic analytics such as how many trigger pulls have occurred | A tool may provide a rich set of information about the fasteners that were used.<br>This information may be used to suggest, reorder, or promote fasteners, tools, etc. to users and other stakeholders. |

TABLE 6-continued

| Traditional Fastening and Bolting Tool | Fastening and Bolting Power Tool with ML |
|---|---|
| Critical bolt applications with traditional tools often require verification via specialty tension control bolts, degrees rotated for turn-of-nut uses cases, or post inspection with a torque wrench | A tool may provide users feedback indicating whether fasteners were seated correctly. This feedback could be from a status light, auditory feedback, and/or historical records. These records may be able to be communicated wirelessly and used potentially as part of certifications. A tool may recommend whether or not further inspection should be done, especially in the case of bolts. |
| A traditional tool may be able to clutch upon reaching a given torque level | A tool may act as an inspection tool whereby a torque level, detection of yield, or another characteristic may be used. |
| A traditional tool may have as user input: A trigger A clutch ring A mode selector A gear ratio mode A traditional tool takes in no user feedback | A tool may additional have: An input or feedback means such as positive/negative feedback buttons, A trigger with a nonlinearity such as a flexure or multiple springs A trigger pattern detection (repeated pulses) Hit or shake detection Feedback from other calibration tools, such as a skidmore, a torque wrench, a screen guided input, input from a connected device (e.g. smartphone), and the like. The ability to self-calibrate (e.g. by rotating forwards and revere to capture motor, inertial, total slop, and/or accessory characteristics). |
| Tool is used with torque limiting accessory such as a torque stick | Tool is used with torque limiting accessory such as a torque stick for which a model is optimized for use with such accessory for even better torque accuracy. The model may take advantage of the extended duration and/or characteristics of the impact sensor shapes that provide more time for signal readings and characteristic signals. |

As stated above, various sensors may be used on the power tool 105 to effectuate machine learning for a specific purpose. Turning now to Table 7, potential sensor devices for using machine learning to effectuate fastener seating are shown.

TABLE 7

| Tool Type | Example Sensors |
|---|---|
| Precision Drill or Screwdriver | At least one of the following: Rotational/motion sensor (e.g. accelerometer(s), gyroscope(s), and the like A load cell Speed, voltage, current, and/or trigger sensors Back emf sensor(s) Temperature Sensors (e.g. for accounting for properties of grease) |
| Precision Pulse Tool | A load cell and/or accelerometer Internal fluid temperature sensor (to maintain below a threshold) or a thermocouple for estimating the internal fluid temperature. Speed, voltage, current, and/or trigger sensor Back emf sensor(s) A motion sensor (e.g., a gyroscope) |
| Precision Impact | Sensors for detecting the position or motion of a tool's hammer and/or anvil (e.g., inductive sensors, accelerometer, load cell, etc.) Speed, voltage, current, and trigger sensors A motion sensor (e.g., an impact-rated gyroscope) Sensor for detecting the magnitude, timing, and/or vibrations/resonance of an impact (ex: accelerometer) Back-emf sensor(s) A temperature sensor Anisotropic magnetoresistance sensor |

Figure 12:
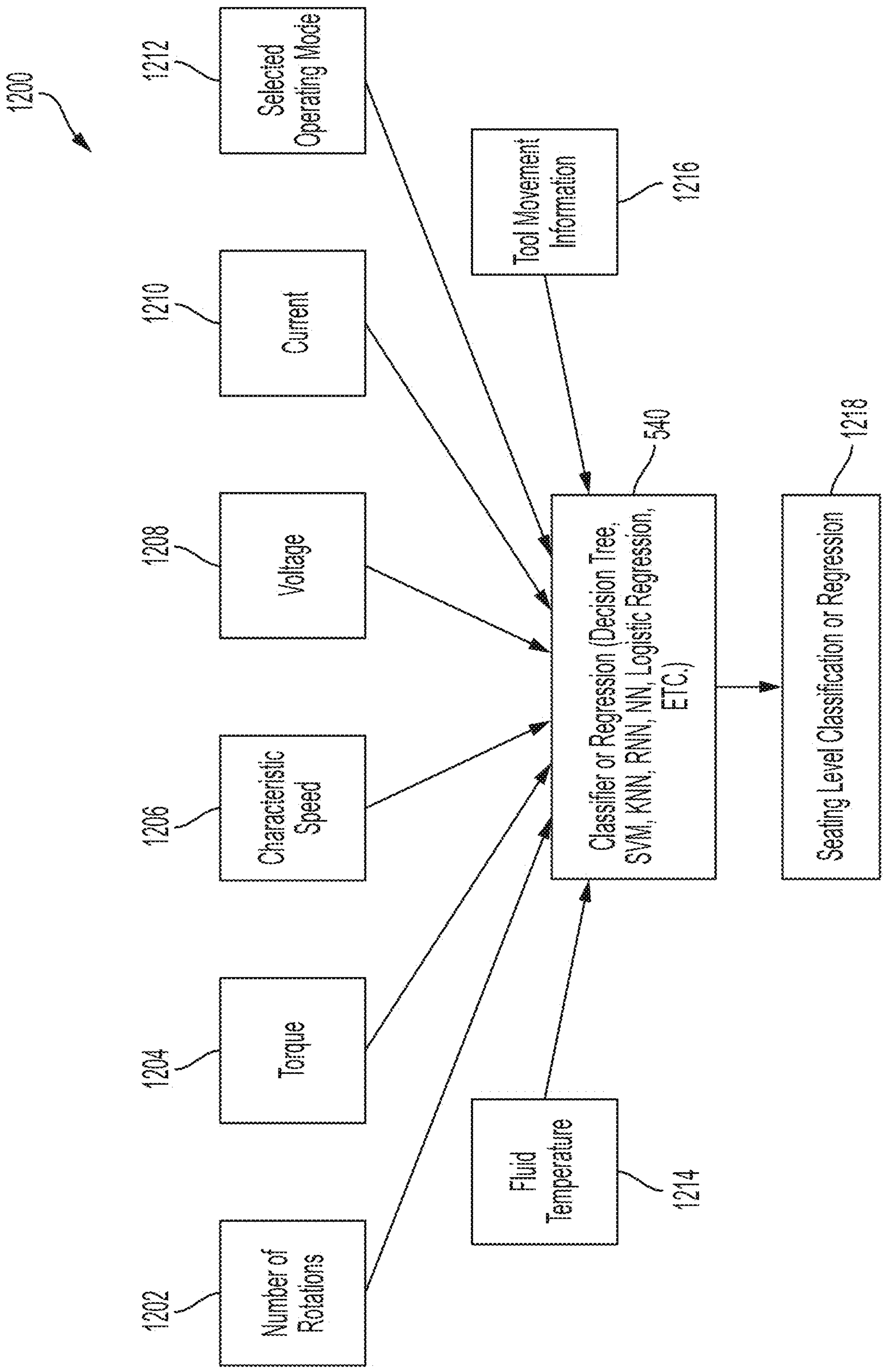
FIG. 12 is a schematic diagram of various types of information that may be utilized by the machine learning controller effectuating a fastener seating program.

FIG. 12 illustrates a diagram 1200 for an example use of the machine learning controller 540 for use with a power tool, such as power tool 500. In the illustrated embodiment, the machine learning controller 540 is configured to determine a seating level of a fastener. For example, the machine learning controller 540 determines when a fastener begins to be seated and continues to determine a level of seating for the fastener until the fastener becomes fully seated. In such an embodiment, the machine learning controller 540 receives multiple operational parameters (inputs) associated with the tool 500. These operational parameters may include a number of rotations 1202, a measured torque 1204, a characteristic speed 1206, one or more voltages 1208, one or more currents 1210, a selected operating mode 1220 of the tool 500, a fluid temperature 1214 (e.g., for use on hydraulic impulse tools), and tool movement information 1216 (e.g., provided via a gyroscope, a motion sensor, and the like.). In one embodiment, the information (operational parameters) described above is generated by the electronic processor 550 based on sensor data from the sensors 530, arithmetic operations using the sensor data (e.g., to calculate torque), and comparisons of the sensor data or calculated values with a threshold (e.g., defining whether an increase or decrease of an operational parameter is rapid). The generated information is then received by the machine learning controller 540 during the operation of the tool. Based on the received information, the machine learning controller 540 determines and outputs a seating level 1218 of the fastener to the electronic processor 550, and the electronic processor 550 controls an output of the tool 500 accordingly. For example, the machine learning controller 540 may indicate to the electronic processor 550 to slow the rotation of the tool when the seating is nearing completion, and/or to cease operation of the tool based on the fastener being determined to be fully seated. In one embodiment, the machine learning controller 540 may utilize, for example, a neural network with multiple outputs such that each output corresponds to a speed value for the tool 500. In some examples, the neural networks may be relatively small, thereby allowing the electronic processor 550 to perform the functions of the machine learning controller 540 without first significantly increasing processing capacity or capabilities, or otherwise upgrading the hardware of the processor 550.

Figure 13:
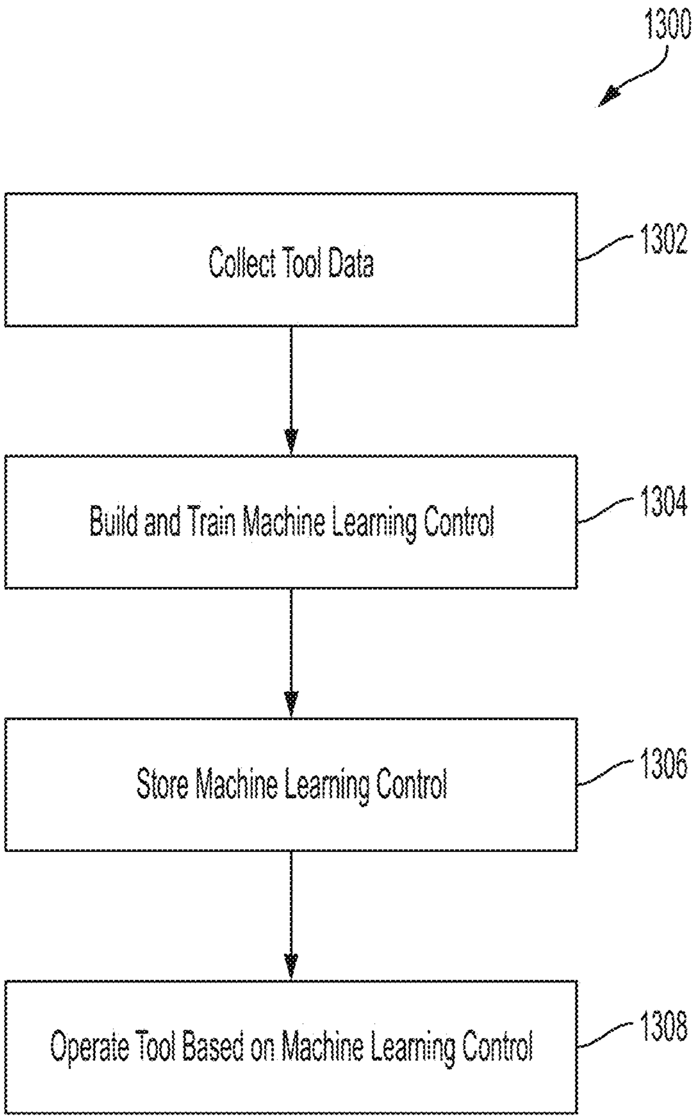
FIG. 13 is a flowchart illustrating a method of training a power tool to perform a fastener seating operation using static logic.

Turning now to FIG. 13, a process 1300 for training and operating a power tool with machine learning, such as power tool 500, using static logic is provided. In one embodiment, machine learning is performed by a machine learning controller, such as machine learning controller 540 described above. However, other machine learning controllers may also be used. In some examples, the use of static logic can reduce the computing power used to effectuate the machine learning, such as by requiring a smaller neural network. By reducing the computing power and/or other processing resources required, the process machine learning controller 540 may be integrated into the processor 550, as described above. However, in other examples, the machine learning controller 540 may have its own processor, as described above.

In a static logic tool, the machine learning controller 540 may be programmed prior to the tool being provided to a user (e.g., during manufacturing), and not subsequently updated. The static logic may be used with various fastening tools, such as drills, pulse, or impact tools. In some embodiments, the tools have multiple modes, such as Tek screw mode, drywall screw mode, deck screw mode, concrete anchor mode, pipe flange/coupling mode, or other fastening modes. The static logic tool may also be a drill, impulse, or impact tool capable of applying a precision fastening torque, such as for bolts and lug nuts.

Figure 14:
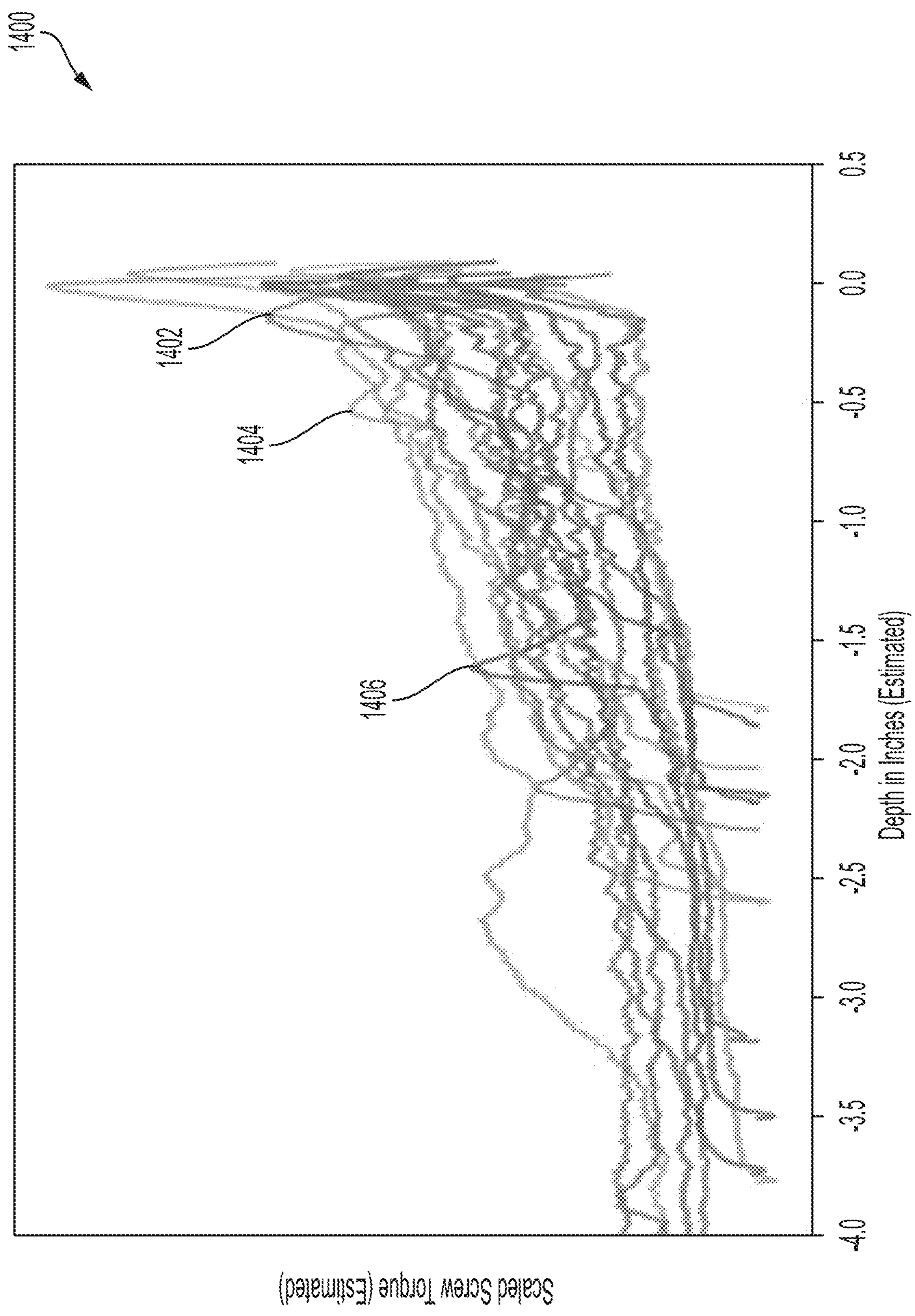
FIG. 14 is a data plot of a torque output of a tool during a seating process.

At process block 1302, tool data is collected. In some embodiments, the tool data is collected during product development and/or manufacturing. The tool may be used in various situations to generate the data. Multiple data points are used as there are many variables that may affect determining when seating is occurring, and to what degree it has occurred. As shown in FIG. 14, the torque output of the tool 500 may show sudden changes due to uncontrollable factors. For example, peaks 1402 and 1404 illustrate torque spikes due to changes in the hardness or type of the work material (e.g., concrete to wood, drywall to wood, and the like). The torque peak 1406 may be the result of an anomaly in the work material, such as a knot in the wood. Thus, multiple data points via the multiple inputs are used by the machine learning controller 540 to effectively generate the proper algorithms.

In some embodiments, to collect the tool data, approximately 2000 fasteners are seated. However, in some embodiments, more than 2000 fasteners or less than 2000 fasteners may be seated to collect the tool data (e.g., between 1000-3000 fasteners, or at least 1000 fasteners). For each seating, various data is collected such as, for example, fastener type, length, diameter; material type and thickness; number and order of layers of materials; user experience, size, and age; battery type, charge level and age; sensed data generated by the tool sensors (e.g., current, voltage, acceleration, temperature, motor rotation velocity, motor rotation acceleration, torque); sensed data generated by external sensors (e.g., torque, tool acceleration); indications of fastener seating level, and indication of seating completion success. Different users may operate the tool over the course of the many fastener seating operations used to generate the data because, for example, different users have different ways of holding and operating the tool, which may result in different forces, speeds, etc. being used to seat the screw. Power supply types may also be varied and evaluated during data collection. For example, where the tool is a battery powered tool, various batteries may be used during the collection of tool data (e.g., during seating of fasteners), such as 1.5 Ah, 2 Ah, 3 Ah, 5 Ah, 6 Ah, 9 Ah, and/or 12 Ah batteries. Furthermore, the batteries may be used having various states of charge. Various material combinations may be used during the collection of tool data as well. For example, different combinations of materials (e.g., concrete, wood, plastic, plaster, drywall, metal, and the like) may be combined in multiple layers, and then a fastener may be driven and seated into the combination materials. In one embodiment, the combinations are two-layer combinations. However, other values of layered combinations are also contemplated. Additionally, multiple different types of fasteners would be used to collect tool data. Even where the tool is being programmed to seat one type of fastener, such as a deck screw, multiple different lengths of the deck screw may be used to collect the tool data. Additionally, models previously trained on one application (even an unknown or unlabeled application) may be used to help train yet another application (for example, drywall screw data or other unlabeled field data may pertain to a model used for deck screws).

Figure 15A:
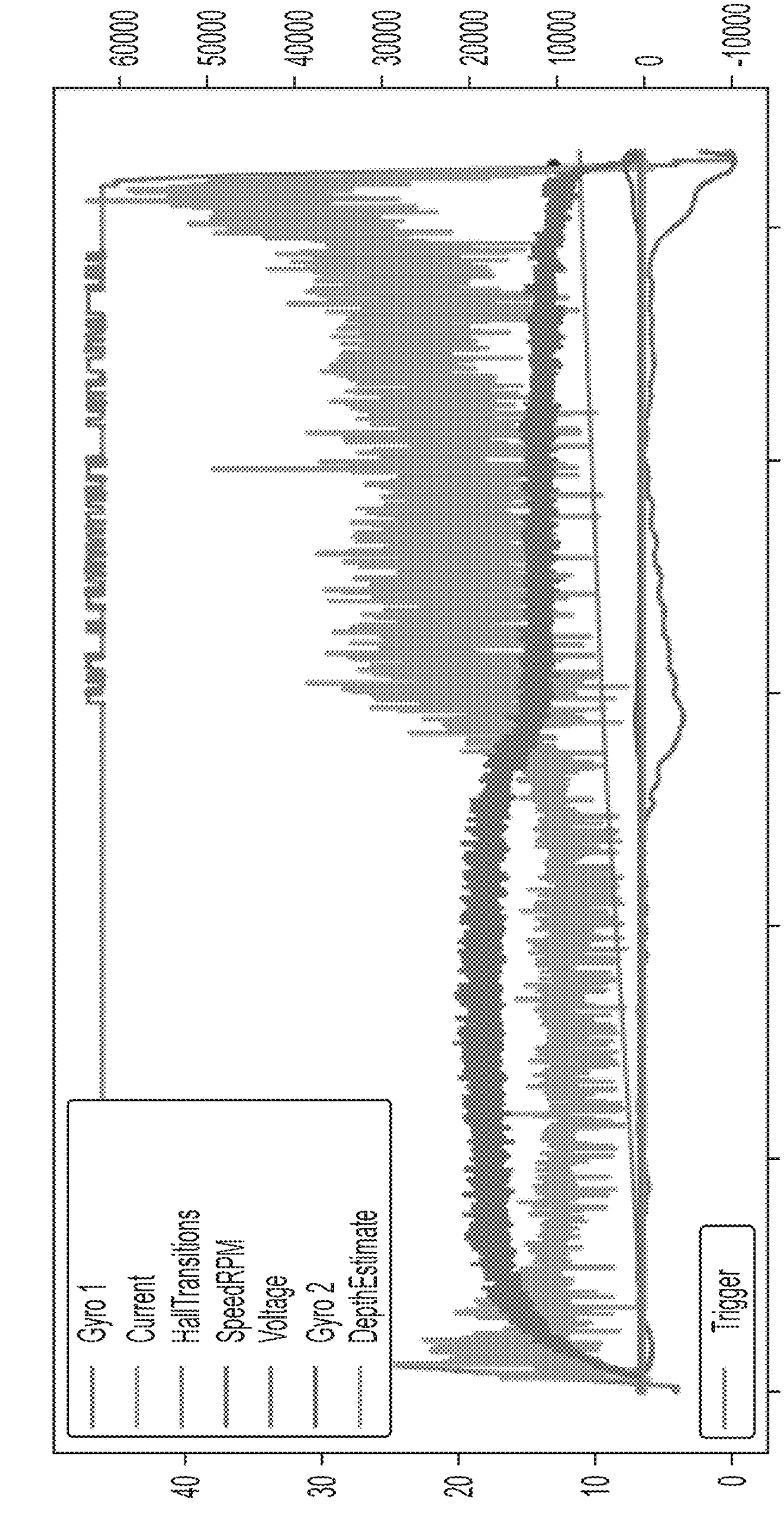
FIGS. 15*a*-*g* are data plots illustrating multiple sensed inputs during a fastener seating process, according to some embodiments.
Figure 15B:
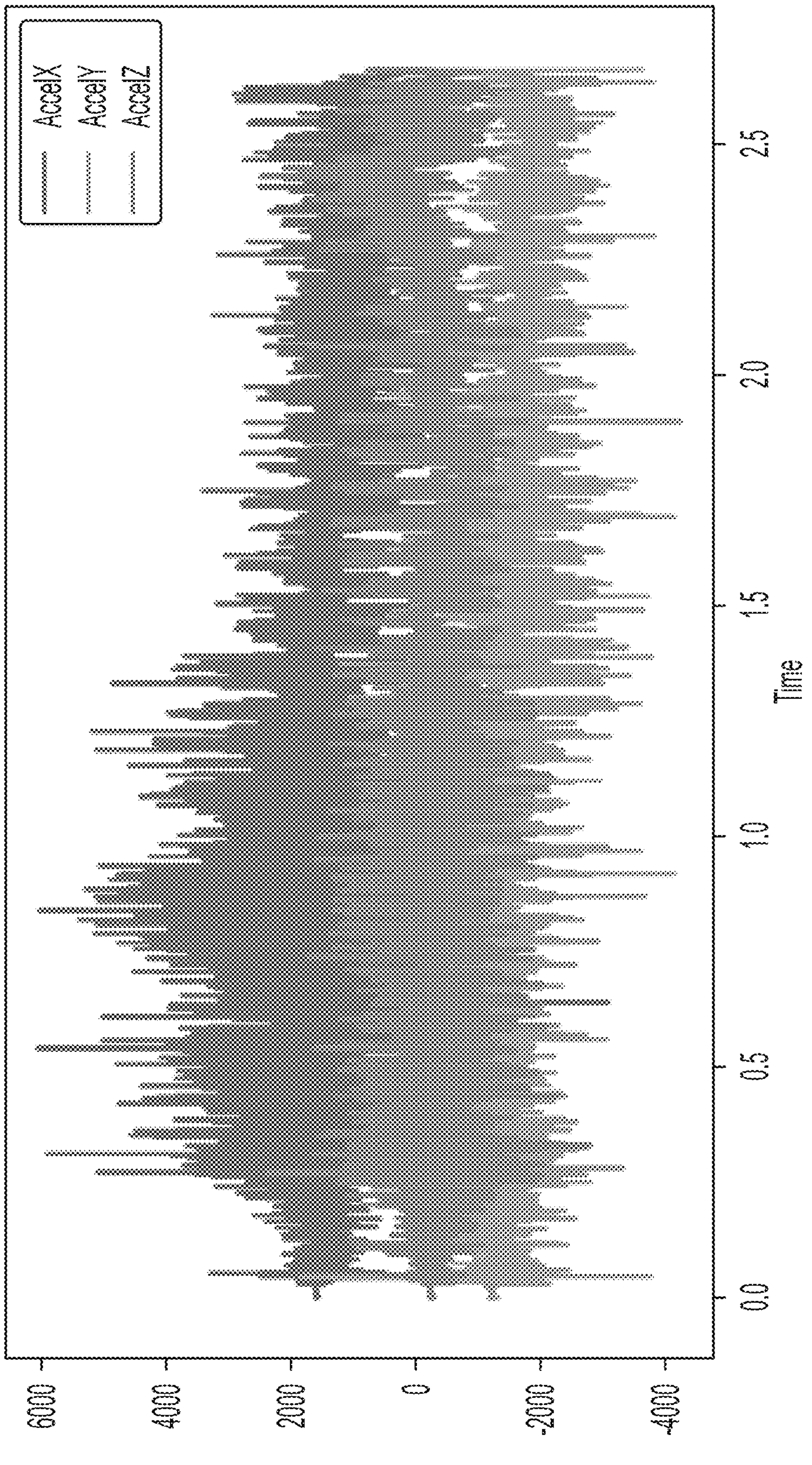
Figure 15C:
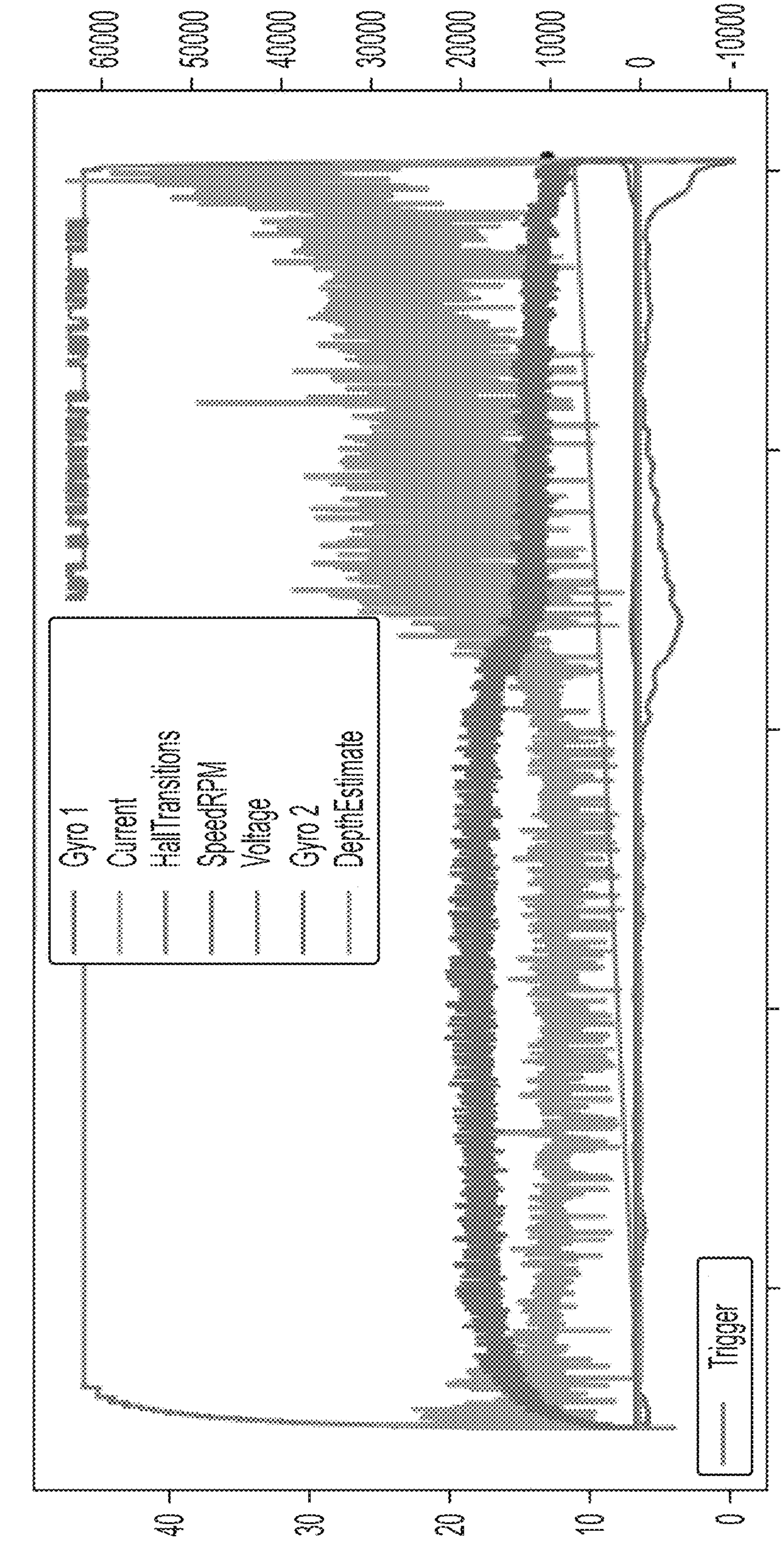
Figure 15D:
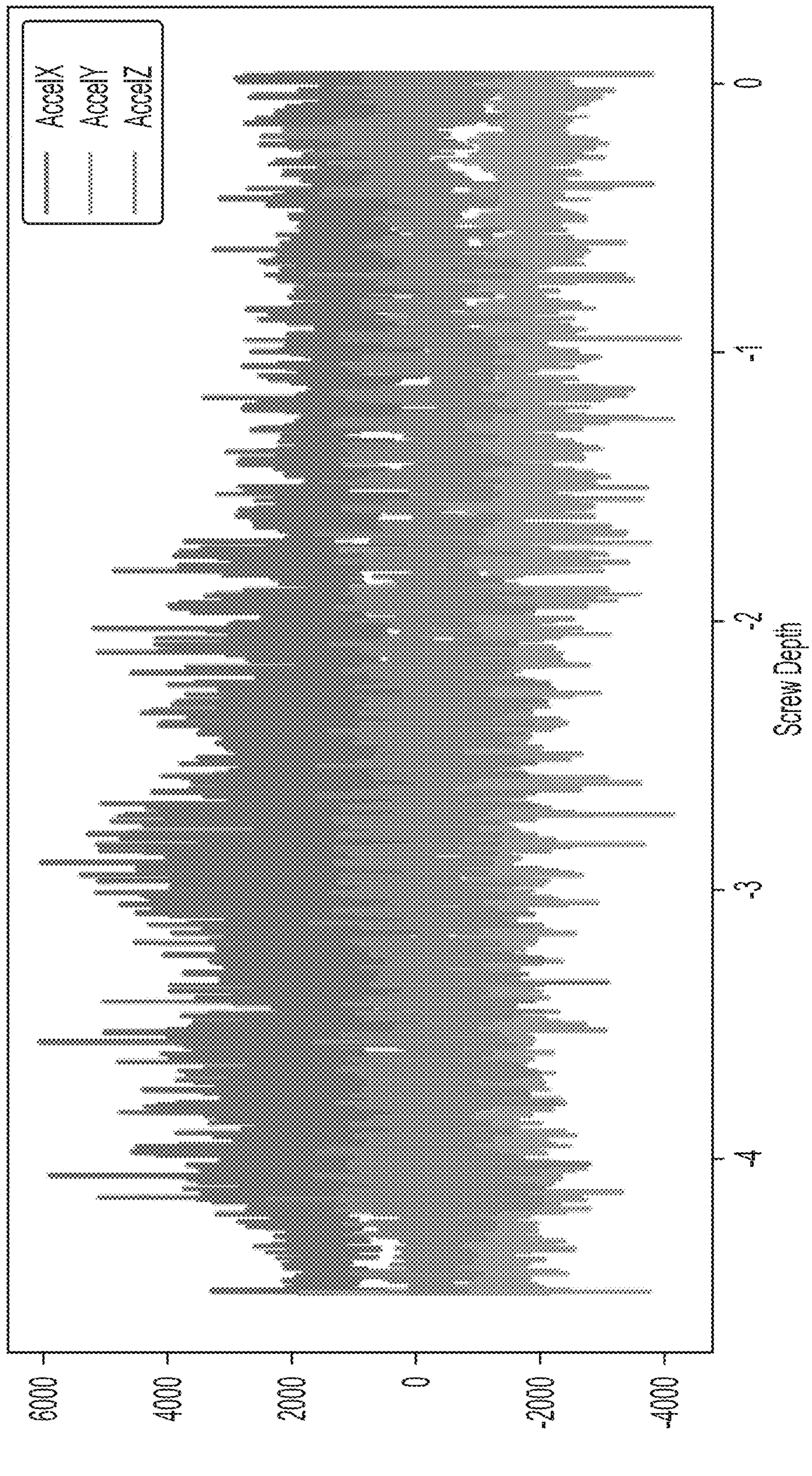

Examples of both time-based and parameter-based (e.g., seating depth) data is shown in FIGS. 15*a-g*. FIGS. 15*a-b* show multiple data inputs over time for a seating process. In one embodiment, the inputs include motion data (e.g., via one or more gyroscopes), current values, rotational values (e.g., via Hall transitions), tool speed, voltage, and estimated depth of the fastener. FIGS. 15*c-d* show the same datapoints, but over a depth of the fastener. In some embodiments, one or both time-based and the parameter-based data is collected for use in building and training a machine learning control.

In some embodiments, motion tracking using a motion sensor is used in an application with multiple bolts, such as lug nuts, pipe flanges, and couplings. Motion tracking enables knowledge of if a user hit all of the multiple bolts, as well as which bolt is being impacted. Such tracking can be done reliably by motion integration in-between impacting runs. In some embodiments, models may take advantage of knowing which fastener is being torqued and what pass is being performed (e.g., first pass, second pass, or third pass). Such information can be provided to the machine learning controller 540 to improve torque control.

Figure 15E:
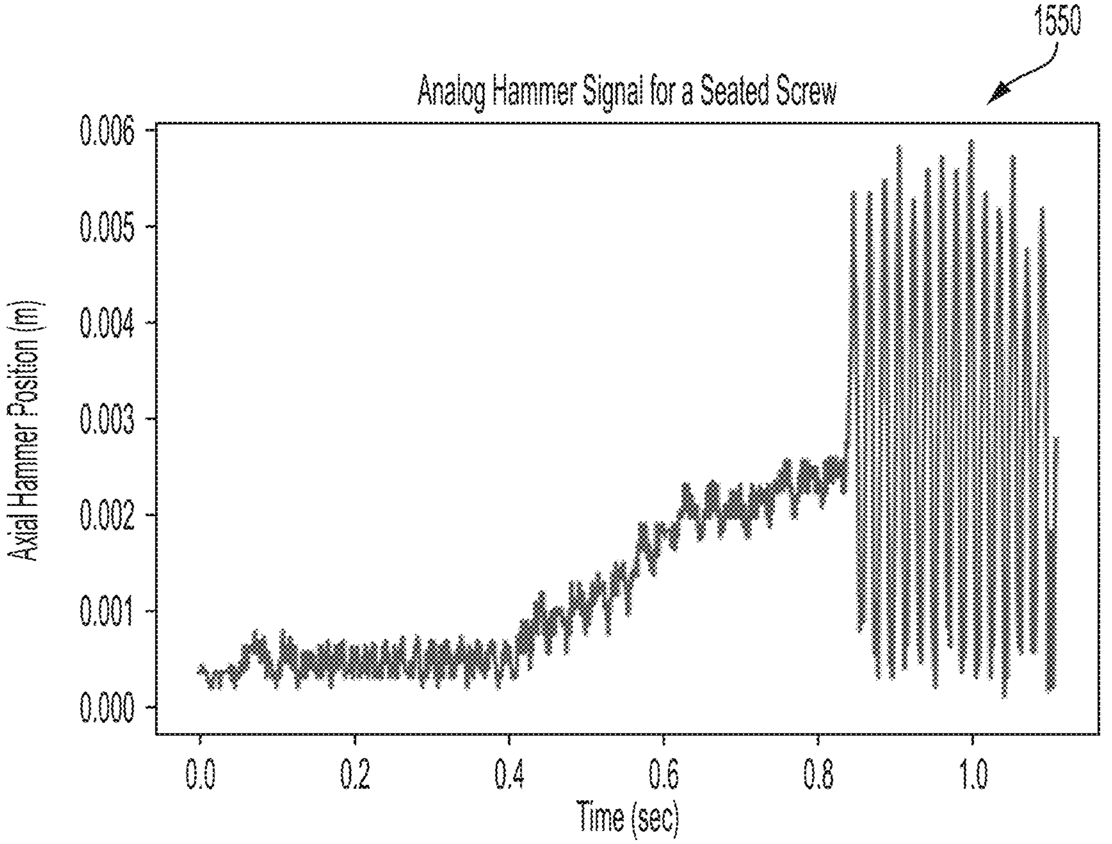
Figure 15F:
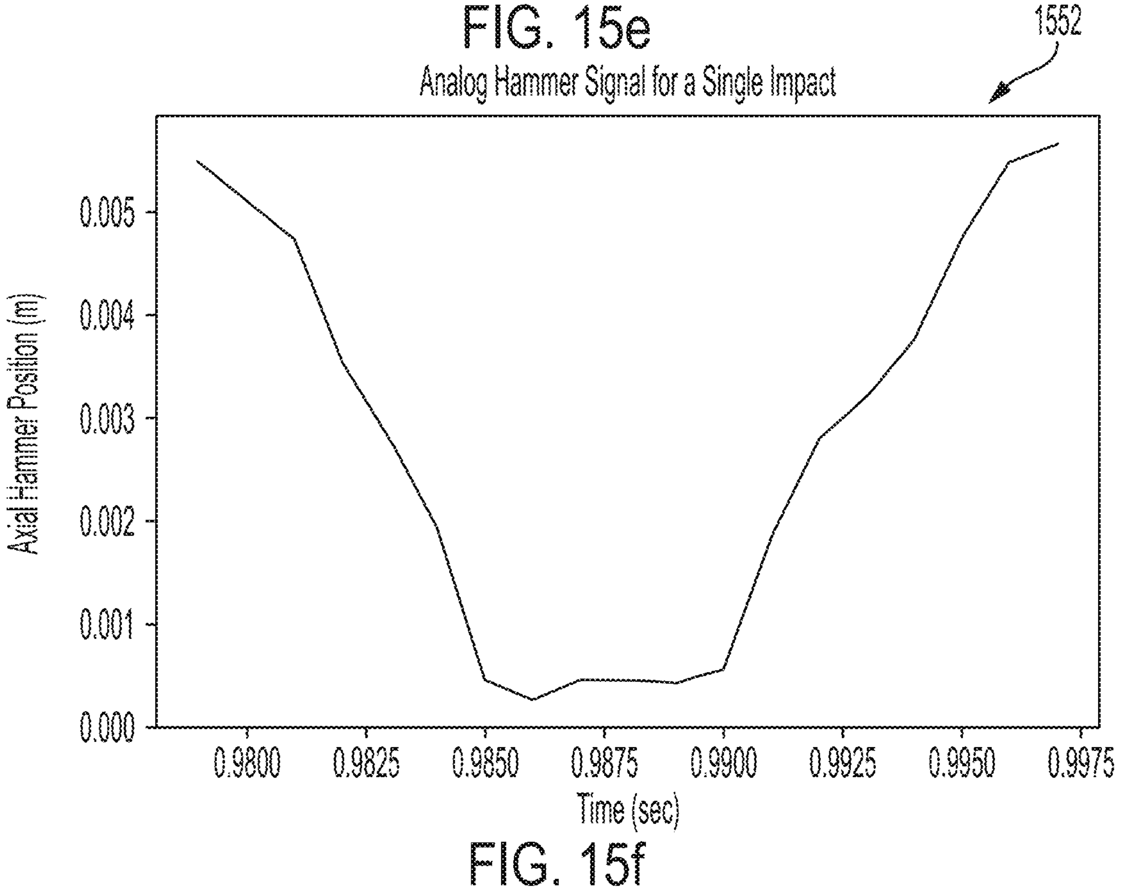

FIGS. 15*e-f* illustrate time-based outputs for a hammer signal, such as used in an impact tool. In FIG. 15*e*, the data plot 1550 shows that the axial hammer position as derived from an analog sensor for an impact as it seats a fastener. The analog signal contains substantial information that can be used in seating a fastener, and which may be provided as an input to a machine learning controller, such as machine learning controller 540. As shown in data plot 1550, the axial position gradually increases until a trip torque is achieved, at which point impacting begins. FIG. 14*f* shows an analog signal 1552 representative of the axial position of the hammer during a single impact. The profiles before, during, and after impacting, especially in combination with other sensors, may contain information about each impact event. As screws vary significantly in torque profiles, relying only on counting the number of impacts generally provides a poor indication of detecting screw seating. Bolt torque has a higher correlation to a number of impacts but is still limited. Instead, this analog signal—and in combination with other sensors—can help derive a number of "features" to provide a useful input to the machine learning controller that can more robustly determine screw seating. These features may include, but are not limited to, spacing of impacts, velocities before and after impacting, angular increases in anvil output, and rebound coefficients. Additionally, the hammer signal during impacts may be transformed and/or combined with the signal while not impacting. One primary transformation and combination example is estimating the fastener torque vs. angle over an entire run. This torque vs. angle information can then be used as input into a machine learning algorithm. While FIGS. 15*c-f* show an axial hammer position, in some embodiments, similar or different sensors are used to estimate the angular and axial translations of both the anvil and hammer during impacting.

Figure 15G:
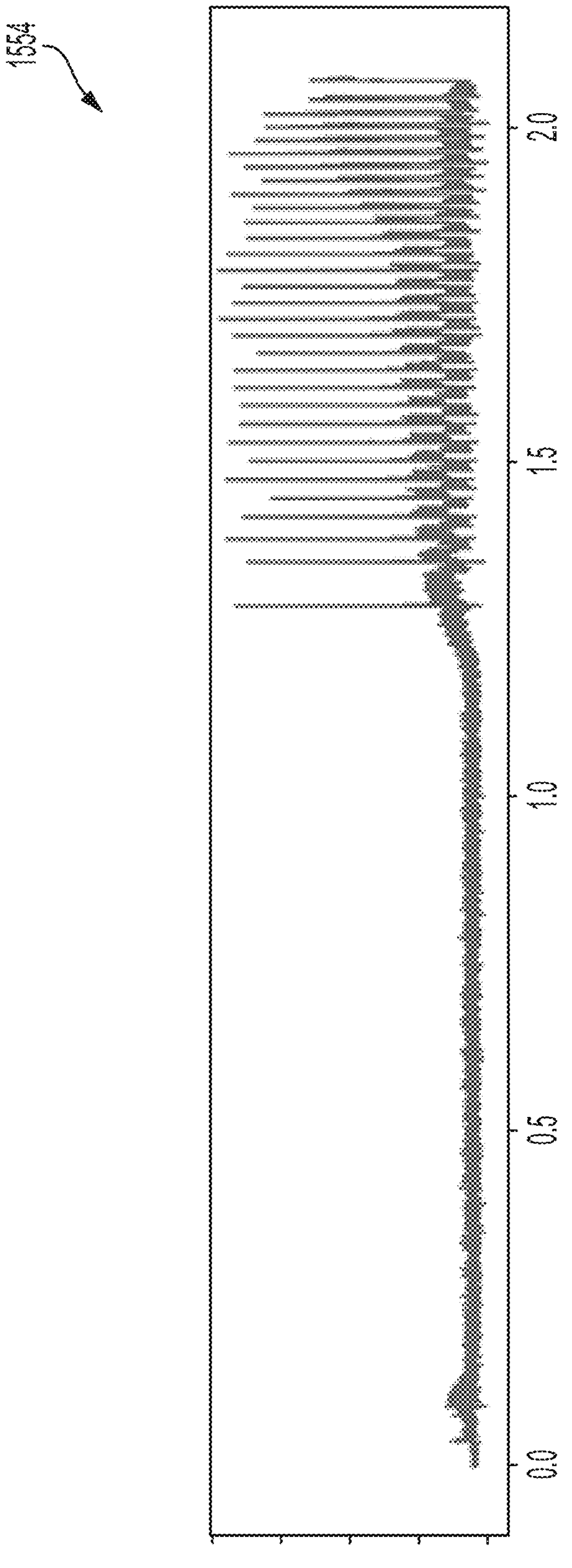

FIG. 15*g* provides a data plot 1554 showing time-based torque measurements from a hydraulic pulse tool. In one example, the torque values are determined using a load cell within the hydraulic pulse tool. In some embodiments, torque measurements can provide better data to the machine learning controller 540 for determining fastener seating conditions. For example, the characteristic torque (e.g., the sustained loading experienced with each pulse) may be fed directly into a recurrent neural network (RNN). In other examples, the characteristic torque may be input or buffered into a DNN or CNN. The machine learning controller 540 can then use the characteristic torque to evaluate a seating condition. In one embodiment, the machine learning algorithm helps estimating sustained loading of the tool, along with other sensor data, especially as the joint becomes hard, and the sustained loading becomes harder to determine.

Upon the tool data being collected, a machine learning control, such as machine learning control 585 described above, associated with the machine learning controller 540 is built and trained at process block 1304. In one embodiment, the server electronic processor 425 builds and trains the machine learning control, as described above. Building and training the machine learning control 585 may include, for example, determining the machine learning architecture (e.g., using a support vector machine, a decision tree, a neural network, or a different architecture). In the case of building and training a neural network, for example, building the neural network may also include determining the number of input nodes, the number of hidden layers, the activation function for each node, the number of nodes of each hidden layer, the number of output nodes, and the like. Additionally, building the neural network may involve feature engineering whereby the ideal inputs and potential filters, combination, or calculations are selected. Furthermore, the neural network output may be provided into one or more output filters on the neural network such that noisy sensor data estimates crossing a threshold too early. In some embodiments, the output filters' parameters are optimized using machine learning. Training the machine learning control 585 includes providing training examples, such as those described above, to the machine learning control 585 and using one or more algorithms to set the various weights, margins, or other parameters of the machine learning control to make reliable estimations and/or classifications.

In some embodiments, building and training the machine learning control 585 includes building and training a recurrent neural network. Recurrent neural networks (RNNs) allow analysis of sequences of inputs instead of treating every input individually. That is, recurrent neural networks can base their determination or output for a given input not only on the information for that particular input, but also on the previous inputs. RNNs can operate in different ways. In a first example, each tool operation or "run" may be considered independent for which there is no previous memory of the last run. However, the RNN may aggregate and use some or all of the time series data during a run. Thus, one version of an RNN may provide more robust output than a DNN of filtered, processed, buffered, or raw data. RNNs are convenient in that they process data in multiple steps and, at least in some embodiments, do not require a memory that holds all previous run-time series data. This processing is especially useful as the duration of a run can vary and may be quite long. Moreover, RNNs may efficiently feed multiple outputs that govern output speed in addition to determining when to cease tool operation.

In a second example, RNNs may also save at least part of their state from one run and use this in a subsequent run. For example, when the machine learning control 585 is configured to identify a seating of a fastener, the machine learning control 585 may determine that since the previous three operations seated a fastener to a first depth, the fourth operation is also likely to seat a fastener to the first depth. Using RNNs helps to compensate for some of the misclassification that the machine learning control 585 may make, by providing and taking account of the context around a particular operation. Other use cases include identifying aspects of the fastening application such as screw or bolt type, characteristic user hand stiffness, runout characteristics of the tool, battery state, grease properties, bolt coatings, workpiece stiffness, use of adapters, condition of accessories, etc. This information can be fed back into the next run or series of runs.

In a third example, another use of an RNN is to use a substantially non-recurrent neural network such as a DNN or CNN where there is some subset of output of previous runs that is fed as a set of inputs into a machine learning algorithm. An example is a DNN that identifies the use of a particular screw type by updating a matrix of likely use cases. This matrix of likely use cases is then fed into the machine learning algorithm as one of the inputs. In some of the above examples where information is passed from one run to the next, the information may be filtered, curtained, aggregated, or reset depending on information such as time between use cases, switching of modes, switching of batteries, sensor data indicating tool movement or changing of accessories. A more complex recurrent algorithm may be used where a previously detected state of drilling suggests a pilot hole for a subsequent particular screw type. Such a complex algorithm is another RNN, in one example. In other examples, the algorithm is a variant of a Markov chain that can govern the inputs to the machine learning control 585.

As described above, the machine learning control 585 is trained to perform a particular task, such as accurately seating a fastener into a working material. Additionally, the machine learning control 585 is trained to detect and account for detrimental conditions, such as material changes, knots, kickback etc., when determining how to properly seat a fastener. The task for which the machine learning control 585 is trained may vary based on, for example, the type of power tool 500 (e.g., drill/driver, impulse, impact, and the like), a selection from a user, user characteristic information, and the like.

After the machine learning control 585 has been built and trained, the machine learning control is saved at process block 1306. In some embodiments, machine learning control 585 is saved in the memory 430 of the server 110. The machine learning control 585 may also be stored in the memory 580 of the machine learning controller 540. In some embodiments, for example, when the machine learning control 585 is implemented by the electronic processor 550 of the power tool 500, the power tool 500 stores the machine learning control 585 in the memory 560 of the electronic control assembly 536.

Once the machine learning control 585 is stored, the power tool 500 operates the motor 505 according to (or based on) the outputs and determinations from the machine learning controller 540 at process block 1308. The process 1700 of FIG. 17 (described further below) illustrates an example of operating the motor 505 based on the machine learning controller 540 that can be used to implement process block 1308. In embodiments in which the machine learning controller 540 (including the machine learning control 585) is implemented in the server 110, 210, the server 110, 210 may determine operational thresholds from the outputs and determinations from the machine learning controller 540. The server 110, 210 then transmits the determined operational thresholds to the power tool 500 to control the motor. 505.

As stated above, the performance of the machine learning controller 540 depends on the amount and quality of data used to train the machine learning controller 540. Accordingly, if insufficient data is used (e.g., by the server 110, 210, 310, 410) to train the machine learning controller 540, the performance of the machine learning controller 540 may be reduced. Alternatively, different users may have different preferences and may operate the power tool 500 differently from other users (e.g., some users may press the power tool 500 against the work material with a greater force, some may prefer a faster finishing speed, and the like). These differences in usage of the power tool 500 may also compromise some of the performance of the machine learning controller 540 from the perspective of a user.

Figure 16:
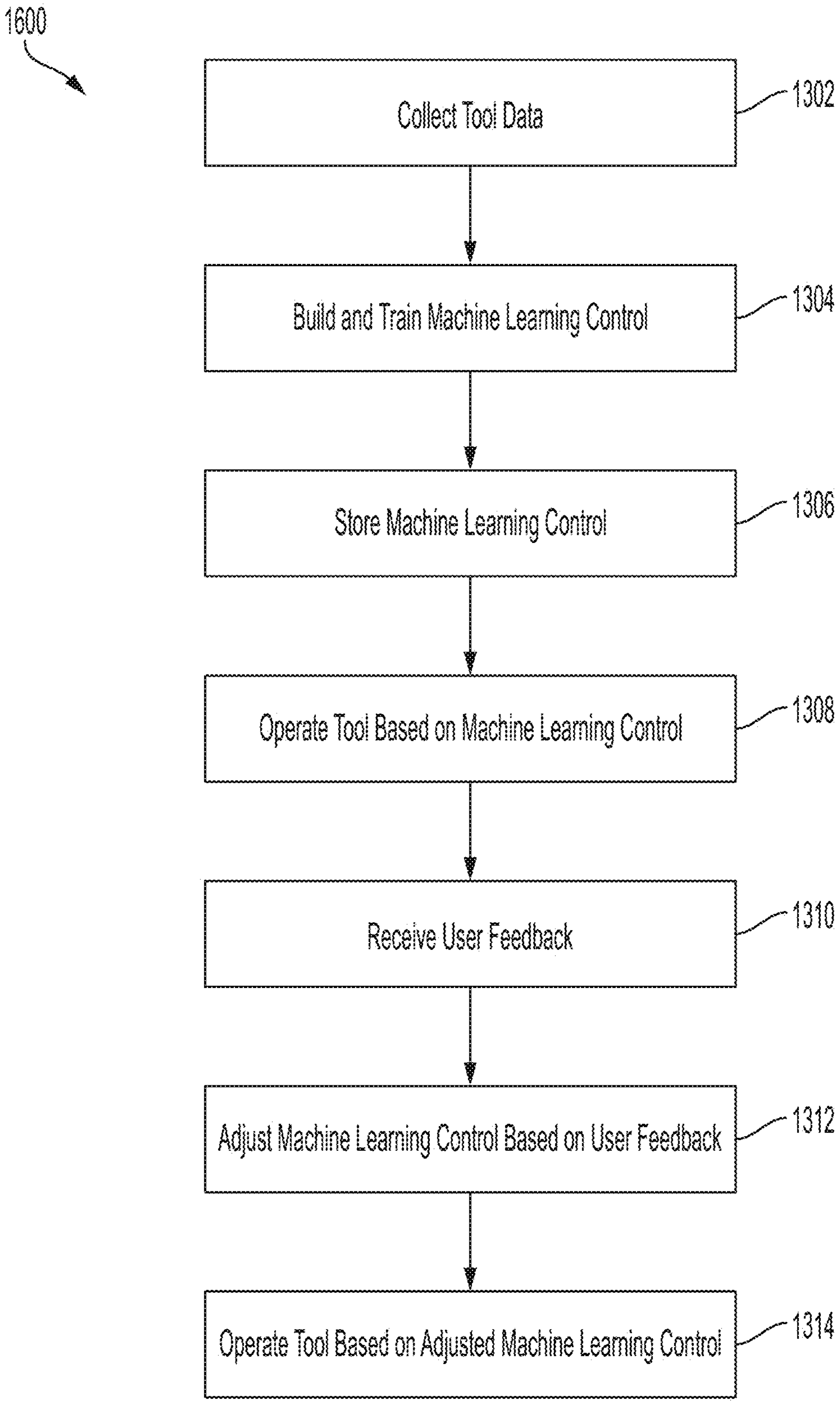
FIG. 16 is a flowchart illustrating a method of training a power tool to perform a fastener seating operation with adaptive logic, according to some embodiments.

Turning now to FIG. 16, a process 1600 for training and operating a power tool with machine learning, such as power tool 500, using adaptive logic. The use of adaptive logic allows for certain logic to be static, but also allow for parameters that change from one run to the next. These changes can allow a tool to update the likelihood of a given fastener type or characteristic (e.g., material hardness) between operations. This adaptive logic provides an ability to anticipate seating a fastener (and often slow down), even before a fastener head engages and creates a detectable signal. The adaptive aspects may include thresholds for a machine learning algorithm (such as those described herein), profile parameters (e.g., ideal ramp ups, max speeds, and the like), anticipated rotations, etc. In one embodiment, the adaptive logic uses an RNN, as described above. In one example, the adaptive logic is used to highlight information from one run to the next that is processed in a way that does not use machine learning (but is still in effect acting as a neural network, such as an RNN). One example is a conditional statement whereby, if a tool has not been used for ten minutes, the historical information from previous runs is reset towards a default. The adaptive aspects can create substantial influence on the output performance of a tool with the machine learning control 585 without the potentially computationally intensive training of the whole machine learned logic.

The process 1600 includes the same process blocks 1302-1308 as described above. Accordingly, blocks 1302-1308 will not be described again for brevity. At process block 1310, user feedback is received. In one embodiment, the server electronic processor 425 receives feedback from the power tool 500 (and/or the external device 107) regarding the performance of the machine learning controller 540. Thus, in at least some embodiments, the feedback is with regard to the control of the motor from the earlier block 1308. In other embodiments, however, the power tool 500 does not receive user feedback regarding the performance of the machine learning controller 540 and instead continues to operate the power tool 500 by executing the machine learning control 585. As explained above, in some embodiments, the power tool 500 includes specific feedback mechanisms for providing feedback on the performance of the machine learning controller 540. In some embodiments, the external device 107 may also provide a graphical user interface that receives feedback from a user regarding the operation of the machine learning controller 540. The external device 107 then transmits the feedback indications to the server electronic processor 425. In other embodiments, the power tool 500 may only provide negative feedback to the server 110, 210, 310, 410 (e.g., when the machine learning controller 540 performs poorly).

In other embodiments, the server 110, 210, 310, 410 may consider the lack of feedback from the power tool 500 (or the external device 107) to be positive feedback indicating an adequate performance of the machine learning controller 540. In some embodiments, the power tool 500 receives, and provides to the server electronic processor 425, both positive and negative feedback. In some embodiments, in addition or instead of user feedback (e.g., directly input to the power tool 500), the power tool 500 senses one or more power tool characteristics via one or more sensors 530, and the feedback is based on the sensed power tool characteristic(s). For example, on an impulse tool embodiment of the power tool 500, the impulse tool includes a torque sensor to sense output torque during a fastener operation, and the sensed output torque is provided as feedback. The sensed output torque may be evaluated locally on the power tool 500, or externally on the external device 107 or the server electronic processor 425, to determine whether the feedback is positive or negative (e.g., the feedback may be positive when the sensed output torque is within an acceptable torque range, and negative when outside of the acceptable torque range). As discussed above, in some embodiments, the power tool 500 may send the feedback or other information directly to the server 110, 210, 310, 410 while in other embodiments, an external device 107 may serve as a bridge for communications between the power tool 500 and the server 110, 210, 310 410 and may send the feedback to the server 110, 210, 310, 410. Furthermore, randomization may be used to test if alternative logic for the machine learning control 585 may be more suitable.

The machine learning control 585 is then adjusted based on the user feedback at process block 1312. In one embodiment, the server electronic processor adjusts the machine learning control. For example, the server electronic processor 425 adjusts the machine learning control after receiving a predetermined number of feedback indications (e.g., after receiving 50 or 100 feedback indications). In other embodiments, the server electronic processor 425 adjusts the machine learning control 585 after a predetermined period of time has elapsed (e.g., every two weeks or two months). In yet other embodiments, the server electronic processor 425 adjusts the machine learning control 585 continuously (e.g., after receiving each feedback indication). Adjusting the machine learning control 585 may include, for example, retraining the machine learning controller 540 using the additional feedback as a new set of training data or adjusting some of the parameters (e.g., weights, support vectors, and the like) of the machine learning controller 540. Because the machine learning controller 540 has already been trained for the particular task, re-training the machine learning controller 540 with the smaller set of newer data requires less computing resources (e.g., time, memory, computing power, etc.) than the original training of the machine learning controller 540.

In some embodiments, the machine learning control 585 includes a reinforcement learning control that allows the machine learning control 585 to continually integrate the feedback received by the user to optimize the performance of the machine learning control 585. In some embodiment, the reinforcement learning control periodically evaluates a reward function based on the performance of the machine learning control 585. In such embodiments, training the machine learning control 585 includes increasing the operation time of the power tool 500 such that the reinforcement learning control 585 receives sufficient feedback to optimize the execution of the machine learning control 585. In some embodiments, when reinforcement learning is implemented by the machine learning control 585, a first stage of operation (e.g., training) is performed during manufacturing or before such that when a user operates the power tool 500, the machine learning control 585 can achieve a predetermined minimum performance (e.g., accuracy). The machine learning control 585, once the user operates his/her power tool 500, may continue learning and evaluating the reward function to further improve its performance. Accordingly, a power tool may be initially provided with a stable and predictable algorithm, which may be adapted over time. In some embodiments, reinforcement learning is limited to portions of the machine learning control 585. For example, in some embodiments, instead of potentially updating weights/biases of the entire or a substantial portion of the machine learning control 585, which can take significant processing power and memory, the actual model remains static or mostly static (e.g., all but last layer(s) or outputs), and only one or a few output parameters or output characteristics of the machine learning control 585 are updated based on feedback.

In some embodiments, the machine learning controller 540 interprets the operation of the power tool 500 by the user as feedback regarding the performance of the machine learning controller 540. For example, if the user presses the trigger harder during execution of a particular mode, the machine learning controller 540 may determine that the motor speed selected by the machine learning controller 540 is not sufficiently high, and may increase the motor speed directly, use the received feedback to re-train or modify the machine learning controller, or a combination thereof. Accordingly, operation of the power tool 500 may vary between two identical consecutive pulls of the trigger 510 of the power tool 500. In some embodiments, the amount of variance is based on user feedback, a learning rate, a randomization, or a combination thereof.

After the machine learning controller is adjusted, the motor is operated based on the updated output from the machine controller 540 at process block 1314. In one embodiment, the server electronic processor 425 adjusts the machine learning controller 540 based on the user feedback, and the power tool 500 operates according to the outputs and determinations from the adjusted machine learning controller 540. In some embodiments, such as the power tool system 300 of FIG. 3, the server 310 transmits the adjusted machine learning control 585 to the power tool 500. The power tool 500 then stores the adjusted machine learning control 585 in the memory 580 of the machine learning controller 540 (or in the memory 560 of the power tool 500), and operates the motor 505 according to the adjusted machine learning controller 540 (block 1314). Similar to process block 1308, the process 1700 of FIG. 17 (described further below) illustrates an example of operating the motor 505 based on the machine learning controller 540, as adjusted based on user feedback, that can be used to implement process block 1314. The adjusted machine learning controller 540 improves its performance by using a larger and more varied dataset (e.g., by receiving feedback indications from various users) for the training of the machine learning controller 540.

Figure 17:
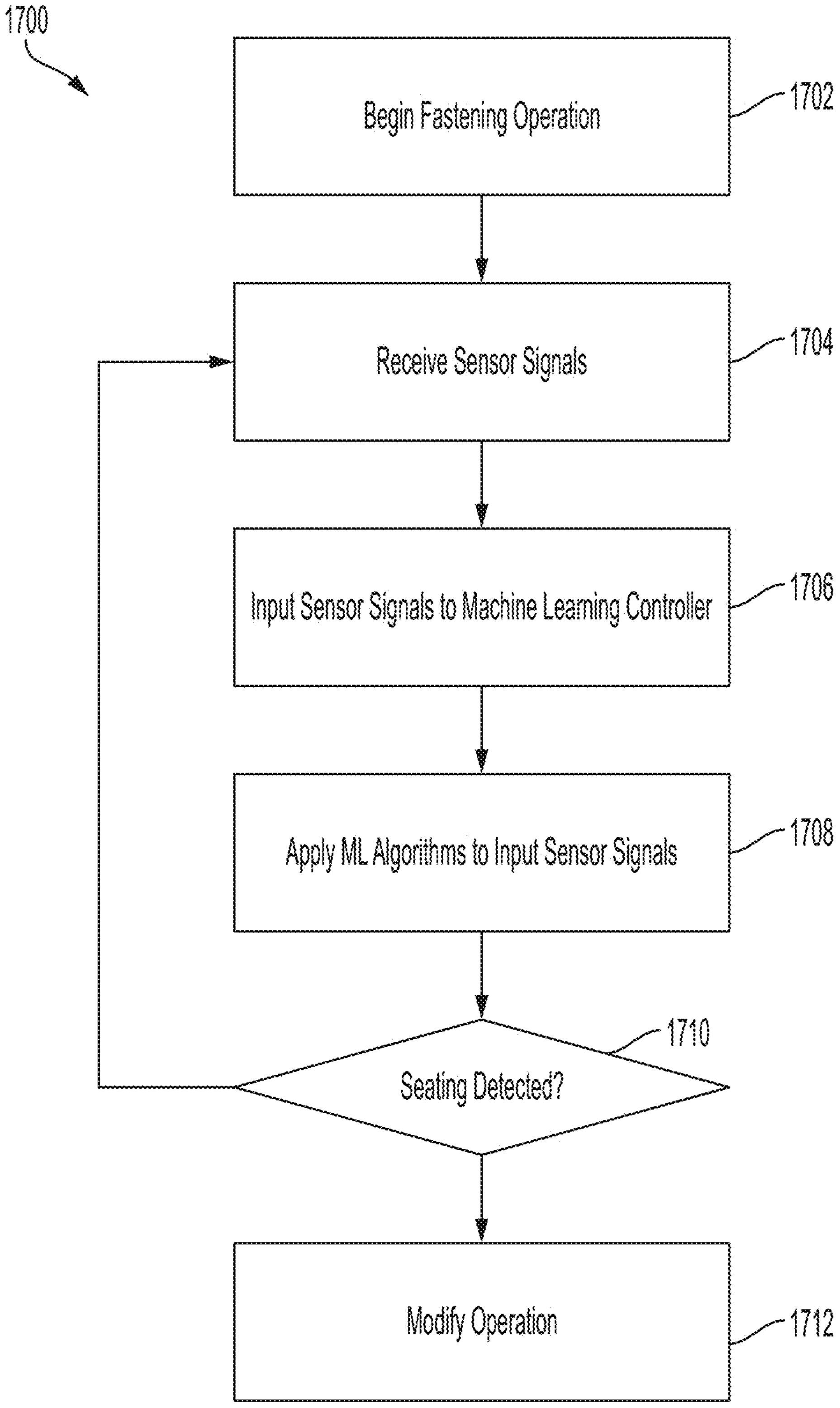
FIG. 17 is a flowchart illustrating a method of seating a fastener with a power tool using machine learning, according to some embodiments.

Turning now to FIG. 17, a process 1700 for seating a fastener is shown, according to some embodiments. The process 1700 may be performed by a power tool, such as power tool 500 described above. However, other power tools described herein may also be used to perform the process 1700. Further, the fastener to be driven may any of the fastener described above, such as deck screws, wood screws, lag bolts, drywall screws, machine screws, nuts on bolts, or any other applicable fastener. At process block 1702, the tool begins operation. For example, a user may begin to drive the fastener into a work material. Once the operation begins, the electronic processor 550 receives output sensor data from the one or more sensors at process block 1704. As discussed above, the sensor data can provide multiple operational parameters related to the operation of the power tool 500. Example operational parameters can include motor position, motor speed, spindle position, spindle speed, output torque, position of the power tool 500, battery pack state of charge, date, time, time since last use, mode, clutch setting(s), direction, battery type, presence of a side handle or other accessory, errors, history of past applications, switching rates, user inputs, external inputs, gear, and the like. (Sec Table 3, above.)

The electronic processor 550 then provides at least some of the sensor data to the machine learning controller 540 at process block 1706. In embodiments in which the electronic processor 550 implements the machine learning control 585, the electronic processor 550 bypasses step 1706. In embodiments where the power tool 500 does not store a local copy of the machine learning controller 540, such as in the power tool system 100 of FIG. 1, the electronic processor 550 transmits some or all of the sensor information to the server 110 where the machine learning controller 540 analyzes the received information in real-time, approximately real-time, at a later time, or not at all.

The sensor information transmitted to the machine learning controller 540 varies based on, for example, the particular task for the machine learning controller 540. As discussed above, the task for the machine learning controller may vary based on, for example, the type of power tool 500. For example, in the context of an impact driver, the machine learning controller 540 for the power tool 500 may be configured to identify a type of application of the power tool 500 and may use specific operational thresholds for each type of application. In such embodiments, the electronic processor 550 may transmit, for example, the rotating speed of the motor 505, the rotating speed of the spindle, the operating mode of the power tool, but may not send the battery pack state of charge. In other examples, in the context of a drill/driver, the electronic processor 550 may transmit, for example, the rotating speed of the motor 505, the rotating speed of the spindle, the motor current, reaction forces (e.g., via gyroscopic sensors), and the like. In other examples, in the context of an impulse tool, the electronic processor 550 may transmit, for example, a temperature of the hydraulic fluid, a speed of the spindle, a speed of the motor 505, an output torque, and reaction forces. However, it should be noted that the tools described herein are not limited to the types of signals described here for each use and may use any number of signals.

The machine learning controller 540 applies one or more machine learning algorithms to determine if the fastener has been seated at process block 1708. For example, the machine learning controller 540 may apply one or more of the machine learning algorithms described above, particularly those shown in Table 2. For example, the machine learning program executing on the machine learning controller 540 processes (e.g., classifies according to one of the aforementioned machine learning algorithms) the received sensor information and generates an output. In the example above, the output of the machine learning controller 540 may indicate a seating condition of a fastener (e.g., not seated, partially seated, fully seated, etc.).

At process block 1710, the machine learning controller 540 determines whether seating of the fastener has been detected. As described above, various machine learning algorithms may be used to determine whether seating has begun. For example, the machine learning controller 540 may utilize classifier or regressor functions on either time-series data and/or filters thereof to determine a seating condition with a tool such as a drill, pulse tool or impact tool. In some embodiment, such as when the machine learning controller 540 is determining whether a nut is seated on an associated bolt using an impact tool, the machine learning controller 540 may use various machine learning algorithms to estimate anvil rotation to determine when the fastener becomes seated. In embodiments where the power tool 500 is an impulse tool, the machine learning controller 540 may use various machine learning algorithms to interpret torque sensor readings to predict actual fastener torque. While the above process describes detecting a seating of a fastener, it is contemplated that the machine learning controller 540 may also detect conditions such as: a likelihood of the fastener reaching a target depth; a likelihood an anomaly has occurred (e.g. stripped fastener, material split, broken fastener, lost engagement with a bit, and the like); a likelihood that with braking or coasting the tool may seat the fastener at a particular depth or depth characteristic.

Based on the machine learning controller 540 determining that seating has not yet begun, the process 1700 returns to process block 1704. In response to the machine learning controller 540 determining that seating of the fastener has been detected, the machine learning controller 540 modifies operation of the tool 500 at process block 1712, via the electronic processor 550. The electronic processor 550 then operates the motor 505 based on the output from the machine learning controller 540. In some embodiments, the electronic process 550 may slow the rotation of the tool 500 upon the seating being detected. In other examples, torque may be reduced (e.g., by changing clutch values, reducing speed or current to the motor, etc.) by the electronic processor 550. In still further embodiments, the electronic controller 550 may cause the tool 500 to pulse (e.g., by repeatedly reversing or interrupting current to the motor 505) based on the seating level determined by the machine learning controller. In some embodiments, the machine learning controller 540 may determine that the fastener is fully seated and cease operation of the tool 500.

In some embodiments, in block 1710, in addition or instead of a binary determination of whether seating has been detected, the machine learning controller 540 determines a level of seating, for example, between a range of values. As an example, the range of values may be 0-10, where 0 indicates that the fastener is not seated, 1 indicates that fastener seating has just begun (e.g., 10% seating), and so on, and 10 indicates that seating is completed. Then, in block 1712, the modified operation may correspond to the level of seating determined. For example, the modified operation in block 1712 may be to reduce motor speed in proportion to the level of seating until the fastener is indicated a fully seated, at which point, the electronic processor 550 stops driving the motor. Accordingly, in some embodiments, after reducing the speed of the motor in process block 1712, the electronic processor 550 returns to process block 1704 to receive further signals so that the modify operation process block 1712 is executed a plurality of times during a single fastener operation. This example results in the process blocks 1704-1712 being executed in a loop to progressively slow the motor 505 until the fastener is fully seated, at which point, the electronic processor 550 stops driving the motor 505. In still further embodiments, the speed gradual reduction is also based on a confidence level associated with the determined seating level. In other words, the more confident that the machine learning controller 540 is in its determination of the seating level, the greater the speed reduction of the motor 505 and/or the more aggressively the motor 505 is slowed and eventually stopped.

In one example, the machine learning controller 540 may act as an electronic clutch ("e-clutch"). For example, the machine learning controller 540 may act as e-clutch where the seating condition may primarily be a torque value, or some other seating profile. The input setting to the e-clutch may provide a target range of expected torques, give a target range of the final depth, or provide additional sensitivity. Additional sensitivity may be useful to provide an indication of how conservative the machine learning controller 540 should be when the confidence of a specific machine learning algorithm is low. In some embodiments, the machine learning controller 540 may reduce the motor speed substantially prior to detecting seating (e.g., approximately five turns after detection of good engagement with the workpiece) to allow for more user controller.

Figure 18:
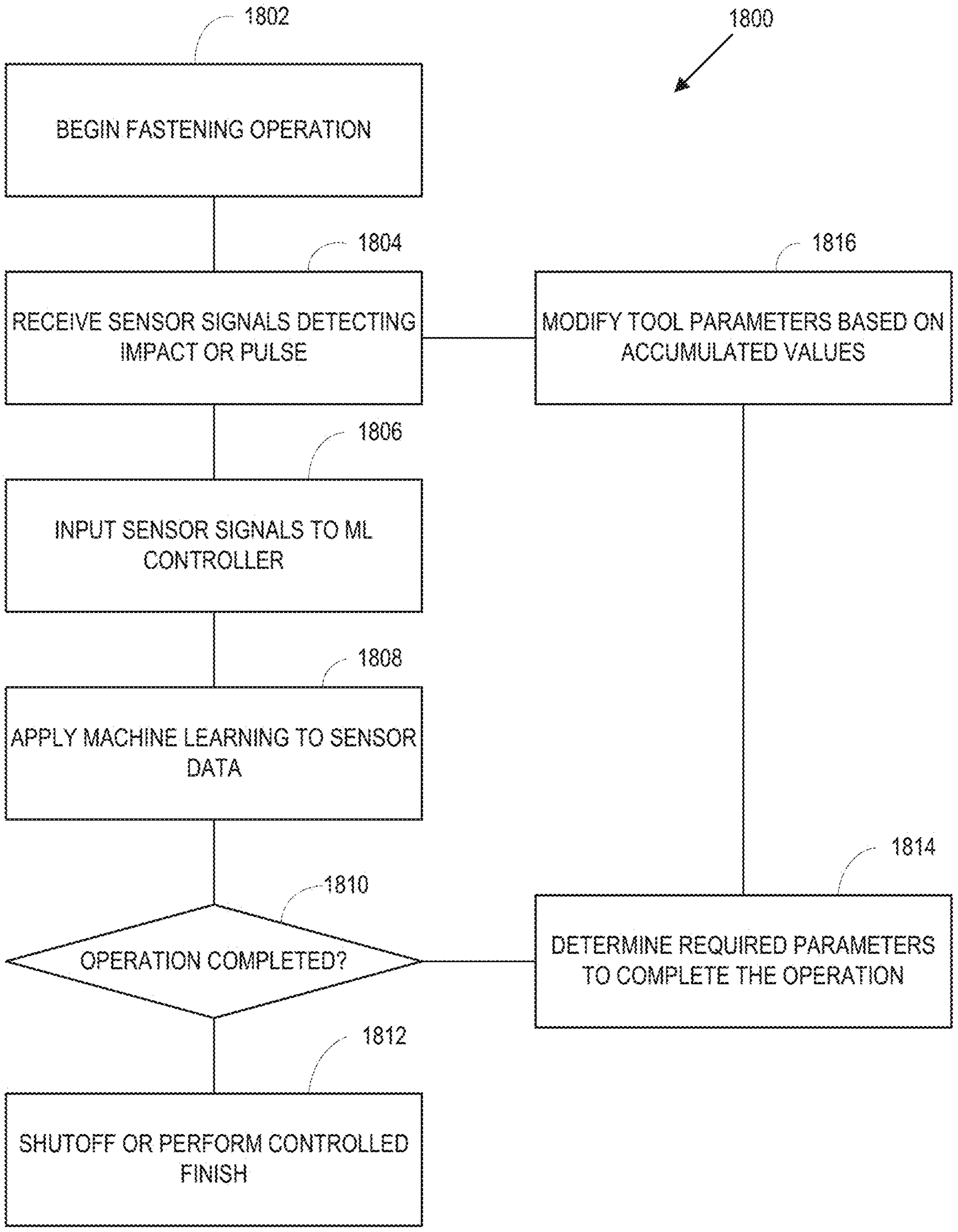
FIG. 18 is a flowchart illustrating a method of torqueing a fastener with a power impact tool using machine learning, according to some embodiments.

Turning now to FIG. 18, a process 1800 for torqueing fasteners using a power tool, such as power tool 500 described above, is described according to some embodiments. At process block 1802, a fastening operation is initiated. This could relate to seating a fastener, or torqueing a bolt or other threaded fastener. In one example, the fastening process may be initiated by a user actuating a trigger or other input on a power tool, such as an impact driver or a hydraulic pulse tool (as described in more detail above). At process block 1804, the electronic processor 550 receives output sensor data from one or more sensors of the power tool 500. As described in more detail above, the sensor data can provide multiple operational parameters related to the operation of the power tool 500. Example operational parameters can include motor position, motor speed, spindle position, spindle speed, output torque, position of the power tool 500, orientation of the power tool 500, battery pack state of charge, date, time, time since last use, mode, clutch setting, direction, battery type, presence of a side handle or other accessory, errors, history of past applications, switching rates, user input, external inputs, gear, hydraulic pressure, impact timing, impact force, and the like. (Sec Table 3, above).

The electronic processor 550 then provides at least some of the sensor data to the machine learning controller 540 at process block 1806. In embodiments in which the electronic processor 550 implements the machine learning control 585, the electronic processor 550 may bypass process block 1806. The sensor information transmitted to the machine learning controller 540 varies, based on, for example, the particular task for the machine learning controller 540. For example, when related to a fastening operation using a impact driver or hydraulic pulse tool, the electronic processor 550 may transmit an output torque, reaction forces, time since last impact, force of last impact, torque prior to first impact, temperature of the hydraulic fluid, speed of the spindle, speed of the motor 505, output torque, etc.

The machine learning controller 540 then applies one or more machine learning algorithms to determine if the fastener is sufficiently tightened (e.g. fastened) at process block 1808. For example, the machine learning controller 540 may apply one or more of the machine learning algorithms described above, particularly those shown in Table 2. In one embodiment, the machine learning controller 540 may apply a machine learning algorithm configured to determine or estimate a remaining number of impacts, or applied force, to fully tighten the fastener. In some embodiments, the fastener may be considered to be sufficiently fastened based on a specification provided by a user. In other embodiments, a machine learning algorithm may be applied which determines if the fastener may have pre-tightened, thereby altering the required start torque and/or other parameters required to properly fasten the fastener per the provided specification. In another embodiment, a machine learning algorithm may be applied to evaluate if the power tool 500 is held steady enough to perform the desired operation. For example, sensor data from an accelerometer, gyroscope, or magnetometer may be used to evaluate the steadiness of the tool during (or prior to) operation. In still a further embodiment, a machine learning algorithm may be applied to verify the reasonableness of a machine learning output. For example, the machine learning algorithm may provide bounds for a number of pulses or impacts that can be used to fasten a given fastener. In still further embodiments, a machine learning algorithm may be used to estimate if a subsequent pulse or impact will exceed a target torque (e.g. overshoot).

At process block 1810, the machine learning controller 540 determines if the operation is completed based on the sensor data and the outputs from the one or more applied machine learning algorithms. For example, the operation may be completed where the fastener is fastened with sufficient torque or where a subsequent impact or pulse would exceed the target torque. In response to determining that the operation is completed, the electronic processor 550 stops the current operation of the power tool 500 (e.g. stops the motor) at process block 1812. In some examples, the electronic processor 550 may initiate a controlled finish (e.g. where continuous operation may result in an overshoot event, such as over torqueing the fastener) to complete the operation. For example, a final pulse or impact at a lower speed or force may be applied to the fastener to complete the operation.

In response to determining that the operation is not completed at process block 1810, the machine learning controller 540 determines what is required (e.g. operational parameters) to complete the operation at process block 1814. For example, the machine learning controller 540 may determine a new number of pulses and/or impacts required, an amount of energy required, rotation of the fastener, etc. The machine learning controller 540 then modifies one or more parameters of the power tool 500 at process block 1816 based on the determined required operational parameters. The electronic processor 550 then continues to receive sensor signals at process block 1804.

Figure 19:
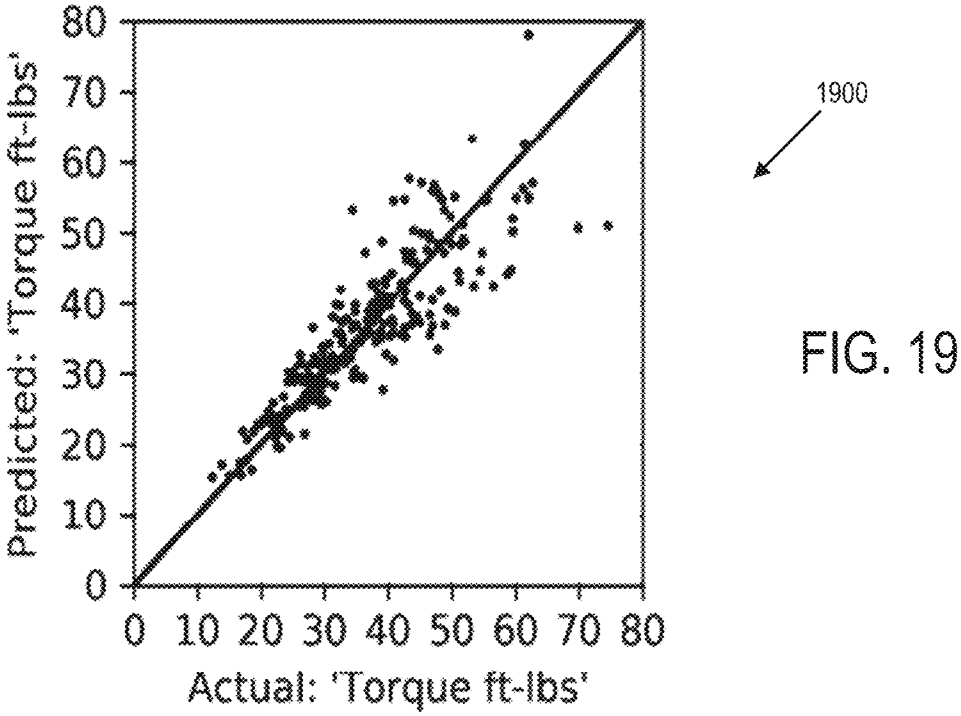
FIG. 19 is a data plot illustrating actual torque vs. predicted torque using a known blow counting method for use with an impact tool, according to some embodiments.
Figure 20:
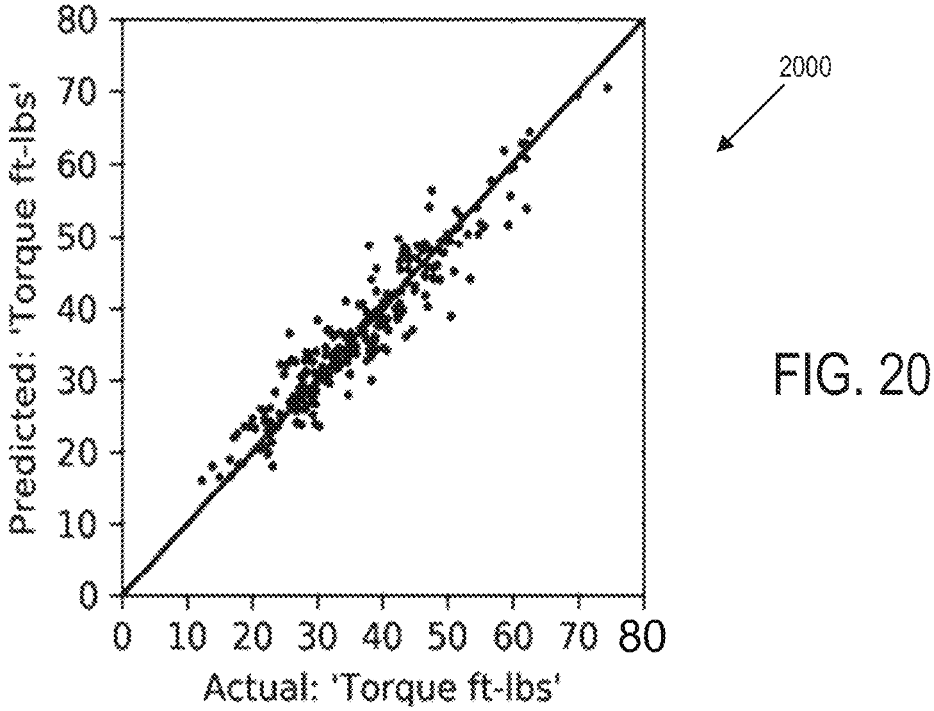
FIG. 20 is a data plot illustrating actual torque vs. predicted torque using a machine learning algorithm configured to analyze hammer position information in an impact tool, according to some embodiments.

Turning now to FIG. 19, a data plot 1900 illustrating actual torque vs. predicted torque using a known blow counting method for use with an impact tool is shown, according to some embodiments. The individual data points in the plot 1900 represent actual measured torque values, and the line illustrates a predicted torque value. Turning now to FIG. 20, a data plot 2000 illustrating actual torque vs. predicted torque using a machine learning algorithm configured to analyze hammer position information in an impact tool, is shown, according to some embodiments. As shown in FIG. 20, the machine learning algorithm was able to predict the torque on a fastener as much as 37% more accurately than the known blow counting method shown in FIG. 19. The fastener and tool type used to generate the data in both FIGS. 19 and 20 were the same. Further, in both FIGS. 19 and 20, the individual data points represent one complete operation.

Figure 21:
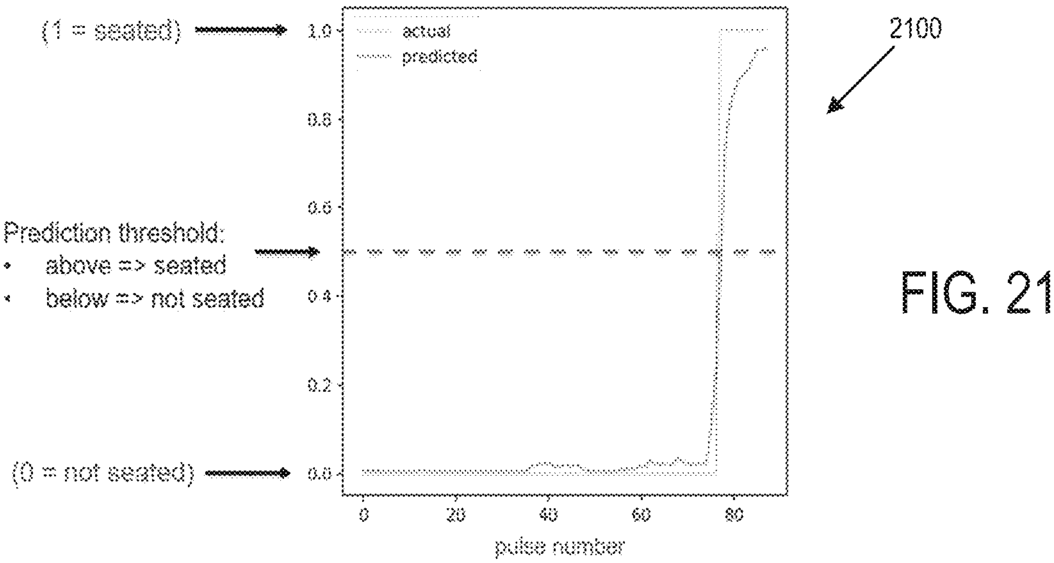
FIG. 21 is a graph illustrating an actual and predicted seating operation for deck screws using a pulse tool, according to some embodiments.
Figure 22:
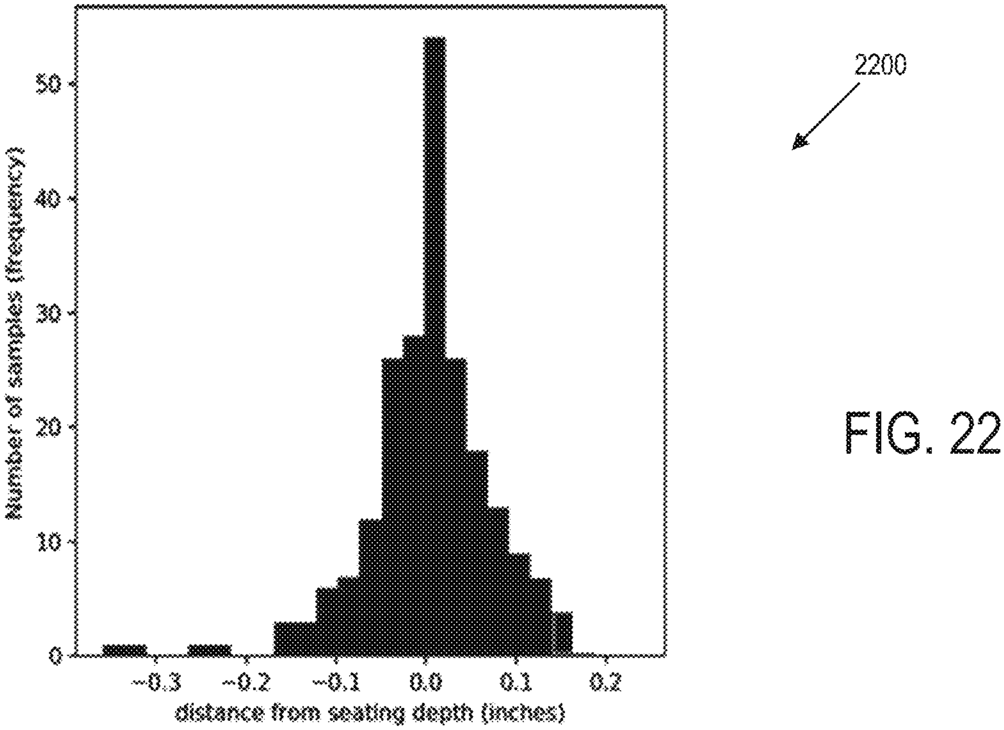
FIG. 22 is a distribution graph illustrating a distance of seated deck screws using a neural network, according to some embodiments.

Turning now to FIG. 21, a graph 2100 illustrating an actual and predicted seating operation for deck screws using a pulse tool is shown, according to some embodiments. Deck screws are generally a difficult fastener to seat due to the variations in the screws and in the material (e.g., wood). While a soft joint allows for a long duration of a pulse for which a torque can be more easily ascertained, no fixed torque level is suitable for deck screw seating as the torque varies with each application. To obtain the data shown in FIG. 21, a hydraulic pulse tool with an integrated load cell was used. The load cell provided data to a neural network (such as described above) which determined whether the deck screw was successfully seated. As shown in FIG. 22, a distribution graph 2200 shows that the distance of the deck screws from the desired seating depth using a neural network was generally within less than 0.1 inches. Thus, using a machine learning algorithm based on load data, the deck screws were able to be consistently seating using a hydraulic pulse tool.

Figure 23:
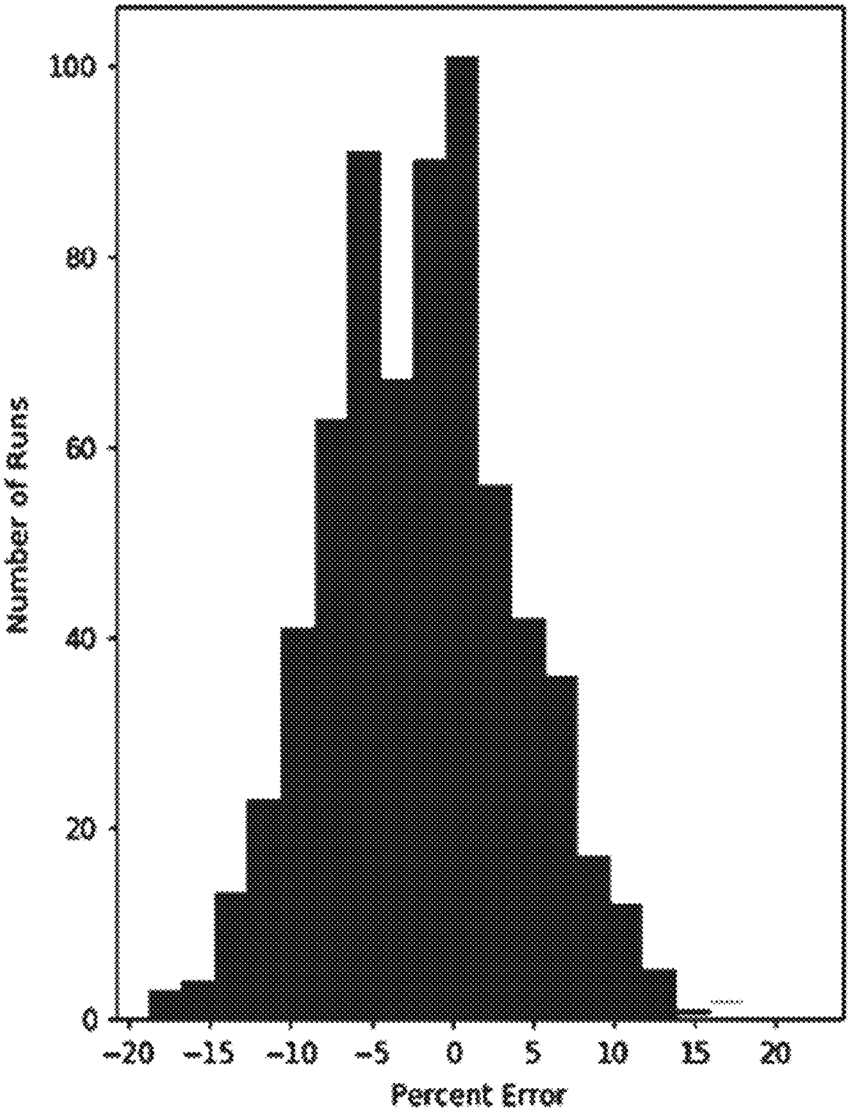
FIG. 23 is a distribution graph illustrating an error associated with seating bolts using a hydraulic pulse tool, according to some embodiments.

Turning now to FIG. 23, a distribution graph 2300 illustrating an error associated with seating bolts using a hydraulic pulse tool is shown, according to some embodiments. In the experiment associated with the distribution chart 2300, a load cell in a hydraulic pulse tool was employed using one or more machine learning algorithms (such as described herein) to predict the fastener torque after a bolting application was completed. The machine learning algorithm used a regression technique that accumulated a torque estimate from one pulse to another. As shown in FIG. 23, the machine learning algorithm was able to consistently predict the fastener torque within +/−5% of error.

Figure 24:
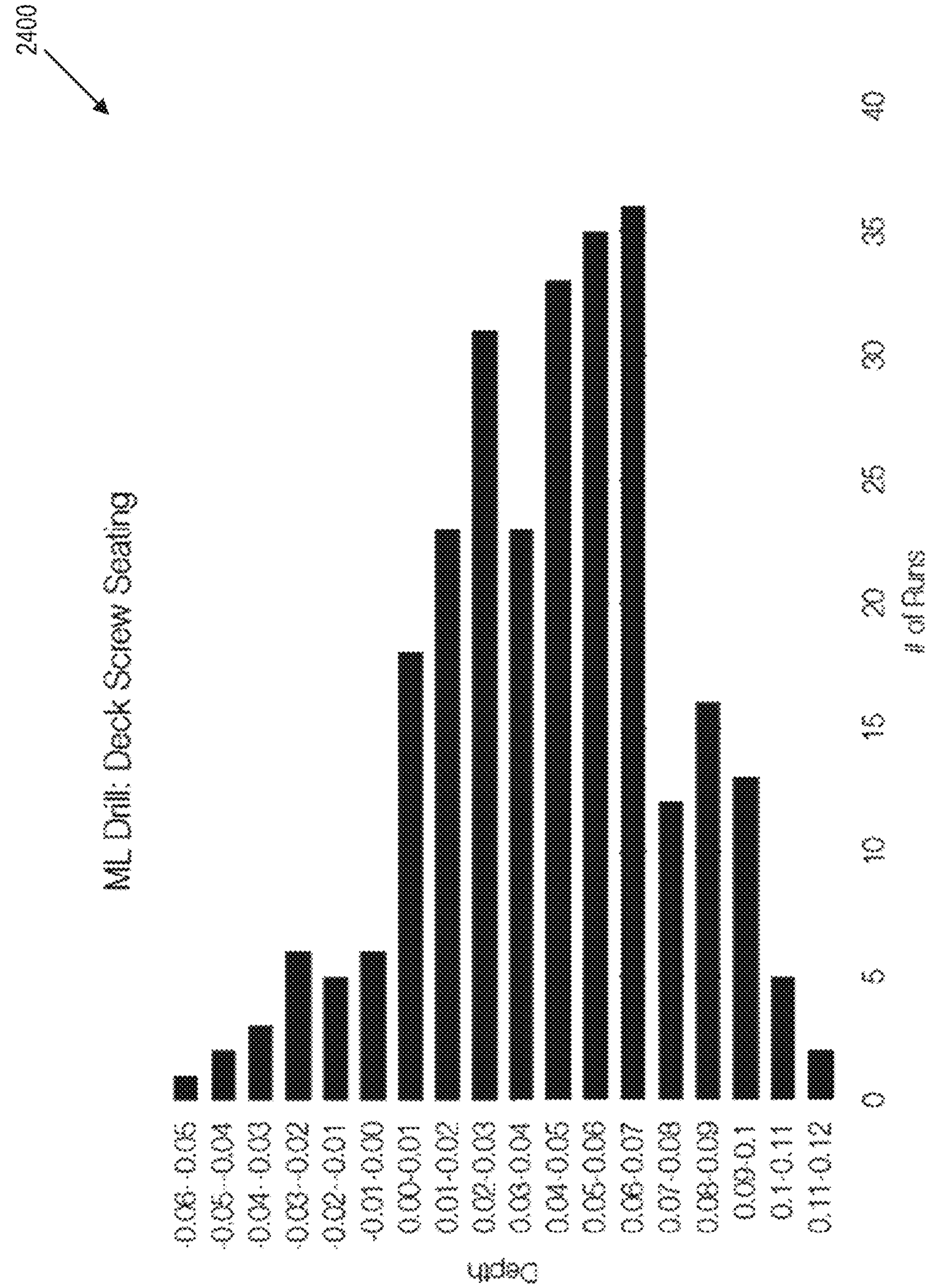
FIG. 24 is a distribution chart illustrating a distance of seated deck screws using a drill and an associated machine learning algorithm, according to some embodiments.

Turning now to FIG. 24, a distribution chart 2400 illustrating the distribution of deck screw variations from a desired seating depth using a powered drill and an associated machine learning algorithm, according to some embodiments. As shown in FIG. 24, the machine learning algorithm was able to seat a majority of the deck screws from within 0 inches of variation, to about 0.07 inches of variation. This outperformed similar operations using a mechanical or electronic clutches (with updating clutch settings across materials). In contrast, no setting were adjusted across the test runs shown in FIG. 24, which still outperformed the other operations using clutches, thereby indicating the success of using machine learning algorithms to seat deck screws.

Thus, embodiments described herein provide, among other things, power tools and related systems including a machine learning controller to control a feature or function of the power tool or related system. Various features and advantages of the embodiments are set forth in the following claims.

What is claimed is:

1. A power tool comprising:
a housing;
a motor supported by the housing;
a sensor supported by the housing and configured to generate sensor data providing information regarding an operation of the power tool;
an electronic controller supported by the housing, the electronic controller including an electronic processor and a memory, the memory including a trained machine learning model implementing a neural network for execution by the electronic processor, the electronic controller configured to:
receive the sensor data,
process the sensor data using the trained machine learning model,
generate, using the trained machine learning model, an output based on the sensor data, the output indicating a seating value associated with a fastening operation of the power tool, wherein the seating value indicates a level of seating of the fastener, and
control the motor based on the generated output.

2. The power tool of claim 1, wherein the neural network is at least one selected from a group of recurrent neural network, a deep neural network, or a convolutional neural network.

3. The power tool of claim 1, wherein the trained machine learning model is generated on an external system device through training based on exemplary sensor data and associated outputs, and is received by the power tool from the external system device.

4. The power tool of claim 1, wherein the trained machine learning model is one of a static machine learning control program and a trainable machine learning control program.

5. The power tool of claim 1, wherein the electronic controller is configured to reduce a speed of the motor based on the seating value indicating that the fastener has started seating.

6. The power tool of claim 1, wherein the electronic controller is configured to stop the motor of the power tool based on the seating value indicating that the fastener is fully seated.

7. The power tool of claim 1, wherein, to control the motor based on the generated output, the electronic controller is configured to:
determine, based on the level of seating, that a subsequent impact or pulse would cause a target torque for the fastener to be exceeded; and
control, based on the determination, the motor to stop or initiate a controlled finish in which a final impact or pulse is applied at a lower speed or force to complete the operation.

8. The power tool of claim 1, wherein, to process the sensor data using the trained machine learning model, the electronic controller is configured to process, using the trained machine learning model, intermediary data derived from raw sensor data output by the sensor.

9. A method of operating a power tool to control fastener fastening, the method comprising:
generating, by a sensor of the power tool, sensor data iteratively over the course of an operation of the power tool to produce a plurality of iterations of sensor data;
for each iteration of sensor data of the plurality of iterations of sensor data,
receiving, by an electronic controller of the power tool, the iteration of sensor data, the electronic controller including an electronic processor and a memory, wherein the memory includes a trained machine learning model for execution by the electronic processor;
processing the iteration of sensor data using the trained machine learning model;
generating, using the trained machine learning model, an output based on the iteration of sensor data, wherein the output indicates a fastening value associated with a fastening operation of the power tool, wherein the fastening value indicates a level of seating of the fastener; and
modifying, by the electronic controller, operation of the power tool based on the output.

10. The method of claim 9, wherein modifying the operation of the power tool based on the output, for each iteration, comprises:
modifying the operation of the power tool proportional to the level of seating indicated by the fastening value.

11. The method of claim 9, wherein modifying the operation of the power tool based on the output, for each iteration, comprises: reducing a speed of the motor based on the level of seating indicating that the fastener is approaching a target fastening torque.

12. The method of claim 9, wherein the trained machine learning model is generated on an external system device based on exemplary sensor data and associated outputs, and is received by the power tool from the external system device.

13. The method of claim 9, wherein the trained machine learning model is one of a static machine learning control program and a trained machine learning control program.

14. The method of claim 9, further comprising stopping the motor based on the fastening value indicating that the fastener is torqued to a target fastening torque.

15. The method of claim 9, wherein the sensor data is indicative of operational parameters of the power tool, and wherein the operational parameters include one or more of a number of rotations, a measured torque, a characteristic speed, a voltage of the power tool, a current of the power tool, a power of the power tool, a selected operating mode, a fluid temperature, and tool movement information.

16. The method of claim 9, wherein, for each iteration, processing the iteration of sensor data using the trained machine learning model includes processing intermediary data derived from raw sensor data output by the sensor.

17. A power tool comprising:

a housing;

a motor supported by the housing;

a sensor supported by the housing and configured to generate sensor data;

an electronic controller, the electronic controller including an electronic processor and a memory, the memory including a trained machine learning model for execution by the electronic processor, the electronic controller configured to:

receive the sensor data, process the sensor data using the trained machine learning model, generate, using the trained machine learning model, an output based on the sensor data and a confidence level associated with the output, the output indicative of a seating level of a fastener, and control a speed of the motor based on the generated output and the confidence level associated with the generated output.

18. The power tool of claim 17, wherein the electronic controller is configured to reduce the speed of the motor based on the output indicating that a fastener is approaching a specified torque value.

19. The power tool of claim 17, wherein, to control the speed of the motor based on the generated output and the confidence level associated with the generated output comprises:

reducing the speed of the motor a first amount when the confidence level is a first level, and reducing the speed of the motor a second amount that is greater than the first amount when the confidence level is at a second level that is greater than the first level.

20. The power tool of claim 17, wherein the trained machine learning model comprises a neural network that is configured to generate multiple outputs corresponding to a desired speed of the motor.

21. The power tool of claim 17, wherein the trained machine learning model is generated on an external system device through training based on exemplary sensor data and associated outputs, and is received by the power tool from the external system device.

22. The power tool of claim 17, wherein the trained machine learning model is one of a static machine learning control program, and a trained machine learning control program.

* * * * *